(12) United States Patent
Choi et al.

(10) Patent No.: US 10,852,909 B2
(45) Date of Patent: Dec. 1, 2020

(54) USER INTERFACE PROVISION METHOD AND ELECTRONIC DEVICE FOR SUPPORTING SAME

(71) Applicant: Samsung Electronics Co., Ltd., Gyeonggi-do (KR)

(72) Inventors: Seung Min Choi, Gyeonggi-do (KR); Woon Geun Kwak, Gyeonggi-do (KR); Kuk Hwan Kim, Seoul (KR); Jung Sik Park, Gyeonggi-do (KR); Jung Hee Yeo, Seoul (KR); Yong Seok Lee, Seoul (KR); Min Su Jung, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/314,952

(22) PCT Filed: Jul. 3, 2017

(86) PCT No.: PCT/KR2017/007043
§ 371 (c)(1),
(2) Date: Jan. 3, 2019

(87) PCT Pub. No.: WO2018/008924
PCT Pub. Date: Jan. 11, 2018

(65) Prior Publication Data
US 2019/0250793 A1 Aug. 15, 2019

(30) Foreign Application Priority Data
Jul. 4, 2016 (KR) .................. 10-2016-0083961

(51) Int. Cl.
G06F 3/0481 (2013.01)
G06F 3/0488 (2013.01)
G06F 3/0484 (2013.01)
H04M 1/725 (2006.01)

(52) U.S. Cl.
CPC ........ *G06F 3/04817* (2013.01); *G06F 3/0488* (2013.01); *G06F 3/04842* (2013.01); *H04M 1/72519* (2013.01); *G06F 2203/04803* (2013.01)

(58) Field of Classification Search
CPC ............... G06F 3/0488; G06F 3/0481; H04M 1/72552; H04M 1/72544; H04W 4/12; H04W 4/50
See application file for complete search history.

(56) References Cited

U.S. PATENT DOCUMENTS

| | | |
|---|---|---|
| 6,868,283 B1 | 3/2005 | Bonansea et al. |
| 7,289,772 B1 | 10/2007 | Bonansea et al. |

(Continued)

FOREIGN PATENT DOCUMENTS

| | | |
|---|---|---|
| KR | 10-2011-0120541 A | 11/2011 |
| KR | 10-2015-0000293 A | 1/2015 |

(Continued)

*Primary Examiner* — Cao H Nguyen
(74) *Attorney, Agent, or Firm* — Cha & Reiter, LLC

(57) ABSTRACT

Disclosed is a portable electronic device including a housing including a first surface and a second surface facing a direction opposite to the first surface, a display including a touchscreen panel exposed through the first surface of the housing and having a substantially rectangular shape, wherein the display has a first side and a third side extending with a first length in a first direction, and a second side and a fourth side substantially perpendicular to the first direction and extending with a second length which is less than the first length, and wherein a ratio of the first length to the second length is x:9, in which the x is equal to or greater than 16, a wireless communication circuit, a processor, and a memory. The memory stores instructions that, when executed, cause the processor to display at least one first icon having a first size on a first region in contact with the second side or the fourth side of the display or adjacent to the second side or the fourth side while longitudinally (Continued)

extending, display at least one second icon having a second size on the first region, based at least partially on an event occurring inside the electronic device or an event received through the wireless communication circuit, receive a user input for selecting the at least one second icon through the first region of the display, and perform a function associated with the event, based on the received user input. Besides, various embodiments understood through the specification are possible.

15 Claims, 43 Drawing Sheets

(56) References Cited

U.S. PATENT DOCUMENTS

| | | |
|---|---|---|
| 8,347,104 B2 | 1/2013 | Pathiyal |
| 9,148,502 B2 | 9/2015 | Choi et al. |
| 9,154,606 B2 | 10/2015 | Tseng et al. |
| 9,191,486 B2 | 11/2015 | Tseng et al. |
| 9,743,278 B2 | 8/2017 | Pathiyal |
| 10,027,793 B2 * | 7/2018 | Tseng ............... H04M 1/72552 |
| 2003/0120957 A1 | 6/2003 | Pathiyal |
| 2009/0249247 A1 | 10/2009 | Tseng et al. |
| 2011/0269506 A1 * | 11/2011 | Choi .................. H04M 1/7253 455/566 |
| 2012/0117507 A1 | 5/2012 | Tseng et al. |
| 2013/0097672 A1 | 4/2013 | Pathiyal |
| 2014/0115516 A1 * | 4/2014 | Ding ..................... G06F 3/0488 715/771 |
| 2014/0229886 A1 | 8/2014 | Ding et al. |
| 2016/0080551 A1 | 3/2016 | Tseng et al. |
| 2019/0297155 A1 * | 9/2019 | Baumgarten ........... H04L 67/22 |

FOREIGN PATENT DOCUMENTS

| | | |
|---|---|---|
| KR | 10-2015-0091422 A | 8/2015 |
| KR | 10-2016-0070844 A | 6/2016 |

* cited by examiner

USER INTERFACE PROVISION METHOD AND ELECTRONIC DEVICE FOR SUPPORTING SAME

CLAIM OF PRIORITY

This application is a National Phase Entry of PCT International Application No. PCT/KR2017/007043, which was filed on Jul. 3, 2017, and claims a priority to Korean Patent Application No. 10-2016-0083961, which was filed on Jul. 4, 2016, the contents of which are incorporated herein by reference.

TECHNICAL FIELD

Embodiments disclosed in the present disclosure relates to a method for providing a user interface and an electronic device supporting the same.

BACKGROUND ART

Electronic devices, such as smartphones, may support various multimedia functions. For example, the electronic devices may support a camera function and a function of reproducing a moving picture. A portable electronic device may include a display that is able to display various pieces of content to support such multimedia functions.

Recently, as a user having a preference for a large screen is increased, studies and researches have been consistently performed to increase the size of the display in an electronic device such as a smartphone. When the size of the display is increased, the internal structure of the electronic device and the arrangement of modules included in the electronic device may be changed.

DISCLOSURE

Technical Problem

The electronic device may have various parts, such as physical keys or cameras, arranged in a front surface region in which the display is disposed. However, when the display occupies most of the front surface region of the electronic device, that is, the electronic device includes a full front display, the electronic device may have the shortage of space to arrange the above-described parts.

Embodiments disclosed in the present disclosure may provide a method for providing a user interface by using a display region and an electronic device supporting the same.

Technical Solution

According to an embodiment disclosed in the present disclosure, a portable electronic device may include a housing including a first surface and a second surface facing a direction opposite to the first surface, a display including a touchscreen panel exposed through the first surface of the housing and having a substantially rectangular shape, wherein the display has a first side and a third side extending with a first length in a first direction, and a second side and a fourth side substantially perpendicular to the first direction and extending with a second length which is less than the first length, and wherein a ratio of the first length to the second length is x:9, in which the x is equal to or greater than 16, a wireless communication circuit included in the housing, a processor included in the housing and electrically connected with the display and the wireless communication circuit, and a memory included in the housing and electrically connected with the processor. The memory may store instructions that, when executed, cause the processor to display at least one first icon having a first size on a first region in contact with the second side or the fourth side of the display or adjacent to the second side or the fourth side while longitudinally extending, to display at least one second icon having a second size on the first region, based at least partially on an event occurring inside the electronic device or an event received through the wireless communication circuit, to receive a user input for selecting the at least one second icon through the first region of the display, and to perform a function associated with the event, based on the received user input.

According to an embodiment disclosed in the present disclosure, a method for providing a user interface of an electronic device including a display may include outputting, to a top end of the display, an indicator bar including at least one first object corresponding to state information of the electronic device, creating at least one second object, based at least partially on an event occurring inside the electronic device or an event received through a wireless communication circuit included in the electronic device, outputting the at least one second object to the indicator bar, receiving a user input for selecting the second object through a region that the indicator bar is output, and performing a function associated with the event, based on the received user input.

Advantageous Effects

According to embodiments disclosed in the present disclosure, the user interface is provided through the object output to the specified region of the display, thereby realizing the display occupying the most part of the front surface region of the electronic device.

MODE FOR INVENTION

Figure 1:
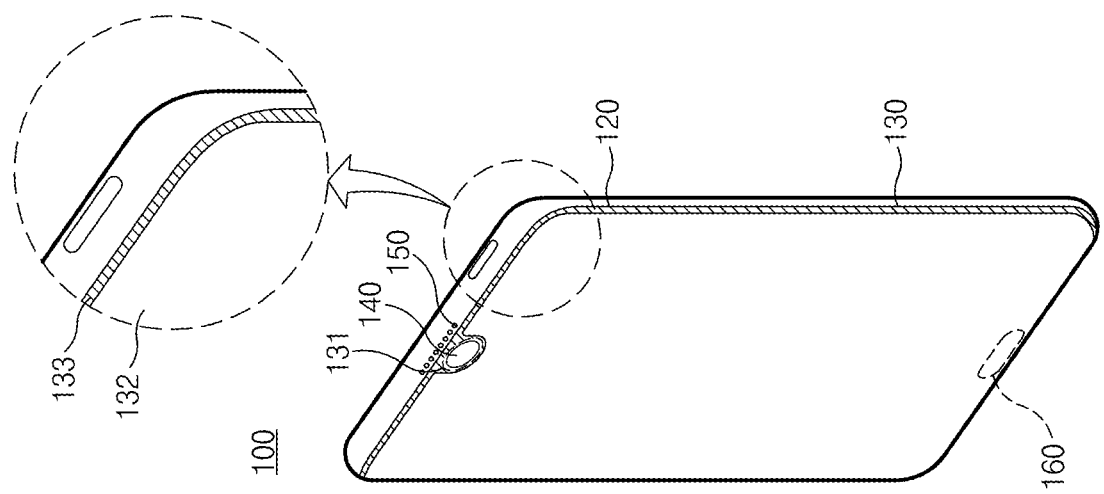
FIG. 1 is a perspective view and a six-sided view of a first type of electronic device, according to an embodiment.
Figure 1:
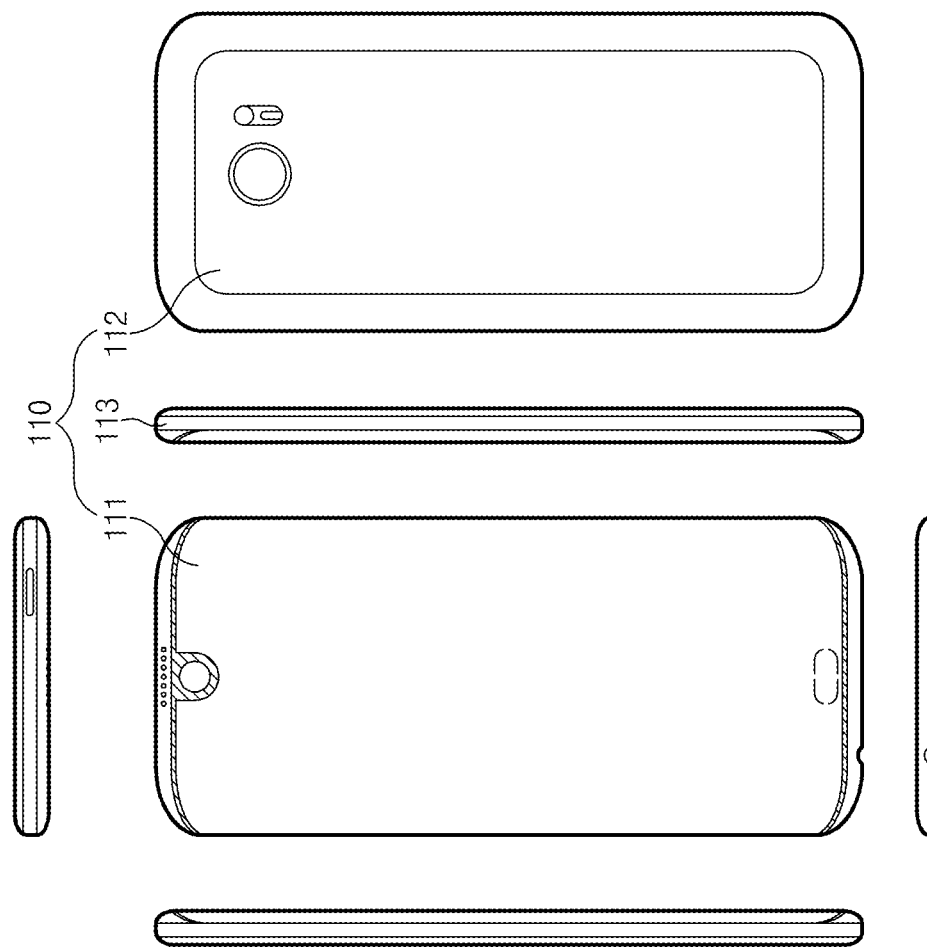

Hereinafter, various embodiments of the present disclosure may be described with reference to accompanying drawings. Accordingly, those of ordinary skill in the art will recognize that modification, equivalent, and/or alternative on the various embodiments described herein can be variously made without departing from the scope and spirit of the present disclosure. With regard to description of drawings, similar components may be marked by similar reference numerals. The terms of a singular form may include plural forms unless otherwise specified. In this disclosure, the expressions "A or B", "at least one of A or/and B", or "one or more of A or/and B", and the like may include any and all combinations of one or more of the associated listed items. The terms, such as "first", "second", and the like may be used to refer to various components regardless of the order and/or the priority and to distinguish the relevant components from other components, but do not limit the components. When an component (e.g., a first component) is referred to as being "(operatively or communicatively) coupled with/to" or "connected to" another component (e.g., a second component), the component may be directly coupled with/to or connected to the other component or an intervening component (e.g., a third component) may be present.

According to the situation, the expression "configured to" used in this disclosure may be used as, for example, the expression "suitable for", "having the capacity to", "adapted to", "made to", "capable of", or "designed to" in hardware or software. The expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

An electronic device according to various embodiments of this disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, medical devices, cameras, or wearable devices. According to various embodiments, the wearable device may include at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), or a bio-implantable type (e.g., an implantable circuit). According to various embodiments, the electronic device may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, media boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), a computed tomography (CT), scanners, and ultrasonic devices), navigation devices, Global Navigation Satellite System (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, drones, automatic teller's machines (ATMs), points of sales (POSs) of stores, or internet of things (e.g., light bulbs, various sensors, sprinkler devices, fire alarms, thermostats, street lamps, toasters, exercise equipment, hot water tanks, heaters, boilers, and the like). According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to various embodiments, the electronic device may be a flexible electronic device or a combination of two or more above-described devices. Furthermore, an electronic device according to an embodiment of this disclosure may not be limited to the above-described electronic devices. In this disclosure, the term "user" may refer to a person who uses an electronic device or may refer to a device (e.g., an artificial intelligence electronic device) that uses the electronic device.

FIG. 1 is a perspective view and a six-sided view of a first type of electronic device, according to an embodiment.

Referring to FIG. 1, according to an embodiment, an electronic device 100 may include a housing 110, a cover glass 120, a display panel 130, a camera module 140, a receiver hole 150, and a home key 160. For example, the housing 110 may include a first surface 111 (hereinafter, referred to as "front surface") facing a first direction, a second surface 112 (hereinafter, referred to as "rear surface") facing a second direction opposite to the first direction, a side surface 113 surrounding a space between the first surface 111 and the second surface 112. In the present disclosure, the side surface 113 refers to a surface that is visually viewed when the thinner surface of the electronic device 100 is viewed, the front surface 111, which is a surface excluding the side surfaces 113, is a surface to expose a screen output through the display panel 130 to the outside, and the rear surface 112 refers to a surface opposite to the front surface 111. According to an embodiment, although a partial screen of the display panel 130 may be exposed to the outside through the rear surface 112 and/or the side surface 113, the front surface 111 may be provided such that the most region of the front surface 111 outputs the screen of the display panel 130, which is different from the rear surface 112 and/or the side surface 113.

According to one embodiment of the present invention, the cover glass 120 may protect, from the outside, at least one component (e.g., the display panel 130, or the like) seated on the housing 110 while covering at least a portion of the outer appearance of the electronic device 100. For example, the cover glass 120 may be coupled to the housing 110 with a space in which the components of the electronic device 100 are received inside the housing 110. The cover glass 120 may constitute at least a portion of the front surface of the electronic device 100. For example, the cover glass 120 may constitute an entire portion of the front surface of the electronic device 100. For another example, the cover glass 120 may constitute portions of the front surface and the side surface of the electronic device 100. The cover glass 120 may be substantially provided in the form of a plane surface. The cover glass 120 may be provided in the form of a curved surface that at least a part of the top, bottom, left, and/or right end of the cover glass 120 is bent. At least a partial region of the cover glass 120 may be provided with transparent material (e.g., glass), and a screen output through the display panel 130 may be displayed on an outer portion through a transparent region of the cover glass 120. The cover glass 120 may be formed of a material such as a tempered glass, plastic (e.g., PET), or aluminum oxide.

According to an embodiment of the present invention, the display panel 130 may be disposed under the cover glass 120. The display panel 130 may be bent such that at least a part of the left, right, top and/or bottom end of the display panel 130 constitute a curved surface, and may be seated inside the housing 110. The display panel 130 may constitute a full front display occupying the most portion of the front surface of the electronic device 100.

As the display panel 130 occupies the most portion of the front surface of the electronic device 100, other components of the electronic device 100 may be disposed at the periphery of the electronic device 100. For example, the camera module 140 may be disposed at the outermost top end of the front surface 111 of the housing 110.

According to an embodiment of the present invention, the display panel 130 may include an active region 132, an inactive region 133, and a printed circuit board (PCB) connection part (not illustrated). The active region 132 may be exposed through a transparent region of the cover glass 120. The active region 132 may output light depending on an electrical signal supplied through the scan line and the data line. The aspect ratio of the active region 132 may be, for example, 19:9.

According to one embodiment, the active region 132 may occupy the front surface 111 and at least a portion of the side surface 113. For example, the active region 132 may be arranged in the form of surrounding the front surface 111 and the side surface 113. According to an embodiment, the active region 132 of the electronic device 100 may be closer to the side surface 113 than a typical active region. The side surface 113 of the active region 132 may perform a function as a soft key for adjusting a volume.

The soft key, which is an object implemented in software, may support and perform a specified function in response to a user input for selecting the soft key. For example, when the soft key is selected, a command (or input signal) corresponding to the specified function may be transmitted to the associated module (e.g., processor). The soft key may include, for example, a home key 160, a cancel key, a menu key, or the like, which is configured to perform a screen control function. The home key 160 may support a home screen to be output in response to a user input. The cancel key may cancel the output of the current screen and support the previous screen to be output, in response to the user input. The menu key may support a menu screen to be output in response to a user input. The position of the soft key may be changed based on a grip state of a user or a user history of the soft key. For example, the soft key may be output in a region adjacent to the lower edge of the front surface 111 of the active region 132. The active region 132 may occupy the most part of the front surface 111, for example, about 90% or more of the region of the front surface 111.

According to various embodiments, the periphery of the active region 132 may be a black matrix (BM) region. According to an embodiment, a light emitting layer may be arranged under the BM region of the display panel 130. The color of the BM region may be changed according to the operation of the light emitting layer under the BM region.

According to an embodiment, the color of the BM region may be changed depending on the surrounding environment. For example, the color of the BM region may be changed depending on the color of the opaque region printed on the periphery of the cover glass 120. When the color of the opaque region is white, the color of the BM region may be changed to white, and when the color of the opaque region is black, the color of the BM region may be changed to black.

According to one embodiment, the BM region may be the remaining region that the image is not output in the active region 132. For example, when a picture is output at a specific ratio (e.g., 4:3), the top and bottom ends of the active region 132 that no picture is displayed may be the BM region. For another example, when a moving picture is output at a specific ratio (e.g., 16:9), the top and bottom ends of the active region 132 that no moving picture is displayed may be the BM region. The color of the BM region may be changed depending on the color of the surrounding environment, for example, the opaque region.

According to one embodiment of the present invention, the inactive region 133 may be a region surrounding the active region 132. According to one embodiment, the inactive region 133 of the electronic device may be formed to be narrower than the inactive region 133 of a typical electronic device. At least a portion of the inactive region 133 may be exposed through the cover glass 120. The inactive region 133 may be, for example, a region covered by an opaque masking layer as the periphery of the display panel 130. The opaque masking layer may be formed by printing a layer on the cover glass 120. The ratio of the thickness of the inactive region 133 in the widthwise direction to the thickness of the inactive region 133 in the lengthwise direction may be, for example, 1:1, 2:1 or 3:1. For another example, the ratio of the thicknesses of the top end of the inactive region 133, the side end of the inactive region 133, to the bottom end of the inactive region 133 may be, for example, 2:1:4.

According to an embodiment of the present invention, the PCB connection part may be connected with one end of the inactive region 133. Scan lines and data lines disposed in the active region 132 may be connected with the PCB through the PCB connection part. The display panel 130 may include one or more opening parts (or openings) or one or more cutouts. For example, the display panel 130 may include one opening 131 formed at the top end of the active region 132. The display panel 130 may be bent such that the opening 131 is positioned at the corner and may be disposed inside the housing 110. For example, the display panel 130 may be bent and disposed along the diameter of the opening 131. When the display panel 130 is bent and disposed along the diameter of the opening 131, as illustrated in FIG. 1, the opening 131 may have a U-shaped space whens viewed from the front surface 111. At least one component (e.g., the camera module 140) of the electronic device 100 may be exposed to the outside through the space formed by the opening 131.

According to an embodiment of the present invention, when the opening 131 is formed in the display panel 130, the active region 132 that outputs light may be lost. The size of the opening 131 formed in the display panel 130 may be larger than a specified size. When the opening 131 is formed in the display panel 130, the diameter of the active region 132 lost by the opening 131 may be, for example, about 8.34 mm or more. When the display panel 130 is bent such that the opening 131 is positioned at the corner, the region of the opening 131 viewed from the front surface 111 may be reduced. For example, when the diameter of the active region 132 lost by the shape of the opening 131 is about 8.34 mm, the diameter of a space defined by the opening 131 viewed from the front surface 111 may be about 4.95 mm. As described above, the opening 131 is formed in the display panel 130 and then the display panel 130 is disposed such that the opening 131 is positioned at the corner, thereby reducing the size of the opening 131 exposed through the front surface 111. The display panel 130 may constitute a touchscreen display together with the cover glass 120, the touch panel (not illustrated), and/or a polarizer (not illustrated).

According to one embodiment of the present invention, the camera module 140 may be arranged and disposed in one or more openings or in one or more cutouts. For example, the camera module 140 may be disposed in a space defined by one or more openings or one or more cutouts. For example, the camera module 140 may be disposed in a space defined by the opening 131 formed in the top end of the active region 132. The camera module 140 may be exposed to the outside through the cover glass 120. For example, the camera module 140 may be viewed from the outside through the cover glass 120 in a state that the camera module 140 is disposed under the cover glass 120. The camera module 140 may obtain an image by sensing light incident thereto from the outside through the cover glass 120.

According to one embodiment, the camera module 140 may be disposed to be exposed to the outside through the central region of the top end of the cover glass 120. As the camera module 140 is disposed at the central region of the electronic device 100, it is easy to set a focal point while taking an image using the front camera, and the aesthetics of the electronic device 100 may be improved. According to an embodiment, the camera module 140 may be disposed adjacent to the periphery of the front surface 111 to reduce the influence on the appearance of the front surface 111 of the housing 110.

According to an embodiment of the present invention, the receiver hole 150 may transmit sound generated by a receiver (not illustrated) disposed inside the housing 110 to the outside. The receiver hole 150 may be formed in the side surface 113 of the housing 110. For example, the receiver hole 150 may be formed in the metal frame of the side surface 113. As illustrated in FIG. 1, the electronic device 100 may include a plurality of receiver holes 150. The sound generated by the receiver may be transmitted to the outside without affecting the display panel 130 occupying the front surface 111 by providing the receiver hole 150 in the side surface 113. Although FIG. 1 illustrates that the receiver hole 150 is formed in the side surface 113 of the housing 110, the present invention is not limited thereto. For example, the receiver hole 150 may be formed in the top end of the front surface 111 of the housing 110. In addition, when the receiver of electronic device 100 includes a piezo-speaker, the electronic device 100 may not include the receiver hole.

According to one embodiment of the present invention, the home key 160 may be disposed at the bottom end of the front surface 111 of the electronic device 100. The home key 160 may be a physical key or a soft key. When the home key 160 is a physical key, the display panel 130 may include the opening 131 or a cutout formed in the bottom end of the active region 132 to dispose the home key 160. The home key 160 may be disposed in the space formed by the opening 131 or the cutout.

According to one embodiment of the present invention, the home key 160 may be implemented as a soft key at the bottom end of the front surface 111 of the electronic device 100. When the home key 160 is a soft key, a fingerprint sensor may be disposed under the region for the home key 160 of the display panel 130. The cover glass 120 may include a recess formed on the position where the fingerprint sensor is disposed.

According to one embodiment, the electronic device 100 may include the display panel 130 exposed through the front surface 111 of the electronic device 100 and the camera module 140 positioned inside the display panel 130. For example, the active region 132 of the display panel 130, at least a portion of the inactive region 133, and the camera module 140 may be exposed to the outside through the front surface 111. For another example, the active region 132 of the display panel 130 and the camera module 140 are exposed through the front surface 111, and the inactive region 133 of the display panel 130 is disposed under the side surface 113 or the rear surface 112.

Figure 2:
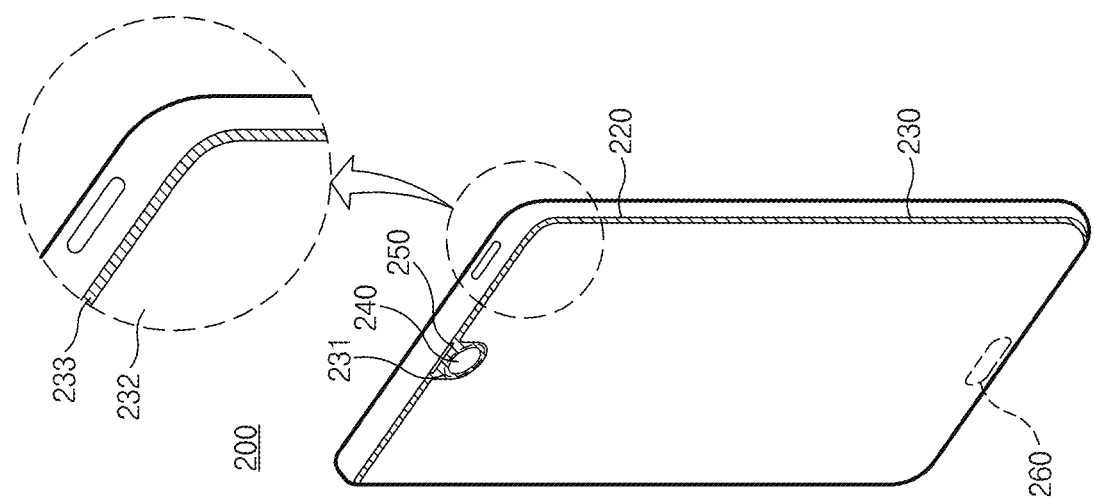
FIG. 2 is a perspective view and a six-sided view of a second type of an electronic device, according to an embodiment.
Figure 2:
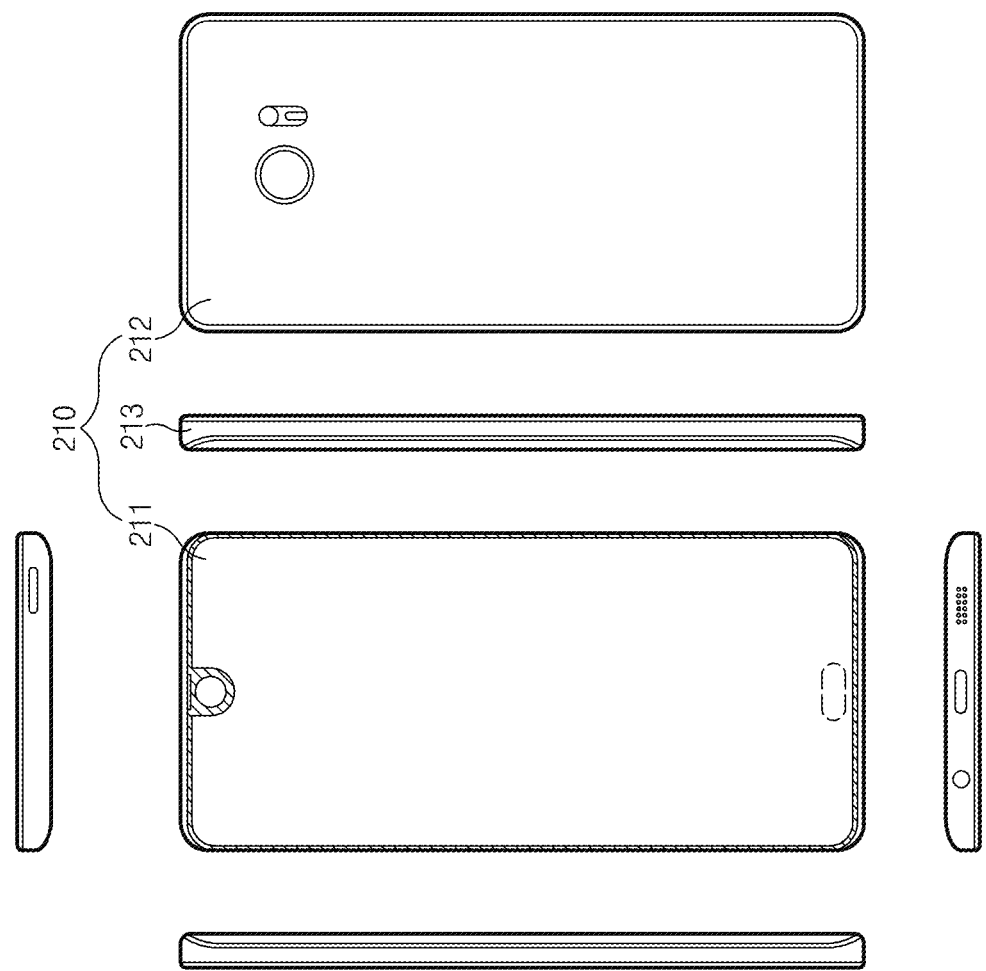

FIG. 2 is a perspective view and a six-sided view of a second type of an electronic device, according to an embodiment.

Referring to FIG. 2, according to an embodiment, an electronic device 200 may include a housing 210, a cover glass 220, a display panel 230, a camera module 240, a receiver hole 250, and a home key 260. The housing 210 may include a front surface 211, a rear surface 212, and a side surface 213. The housing 210 may have the small radius of curvature in the edge portion thereof. In addition, the housing 210 may have the side surface 213 which is flat.

According to one embodiment of the present invention, the cover glass 220 may occupy the most part of the front surface 211 of the electronic device 200. The cover glass 220 may be provided in the form of a flat surface and/or provided in the form of a curved surface bent at the left end and/or the right end thereof.

According to an embodiment of the present invention, the display panel 230 may be disposed under the cover glass 220. The display panel 230 may be bent such that the left end and/or right end of the display panel 230 constitute a curved surface, and may be seated inside the housing 210. The display panel 230 may include the same or similar configuration as the display panel 130 of FIG. 1. In other words, the display panel 230 may include an active region 232, an inactive region 233, and a PCB connection part (not illustrated).

According to an embodiment of the present invention, the camera module 240 may be disposed in a space defined by, for example, an opening 231 provided at the top end of the active region 232. The camera module 240 may be exposed to the outside through the cover glass 220. The camera module 240 may obtain an image by sensing light incident thereto from the outside through the cover glass 220.

According to an embodiment of the present invention, the receiver hole 250 may transmit sound generated by a receiver (not illustrated) disposed inside the housing 210 to the outside. The receiver hole 250 may be formed in the top end of the housing 210. Although FIG. 2 illustrates that the receiver hole 250 is formed in the top end of the front surface 211 of the housing 210, the present invention is not limited thereto. For example, the receiver hole 250 may be formed in the side surface 213 of the housing 210. In addition, when the receiver of electronic device 200 includes a piezo-speaker, the electronic device 200 may not include the receiver hole.

The home key 260 may be disposed adjacent to the edge region of the bottom end of the front surface 211 of the electronic device 200. The home key 260 may be a physical key or a soft key.

Figure 3:
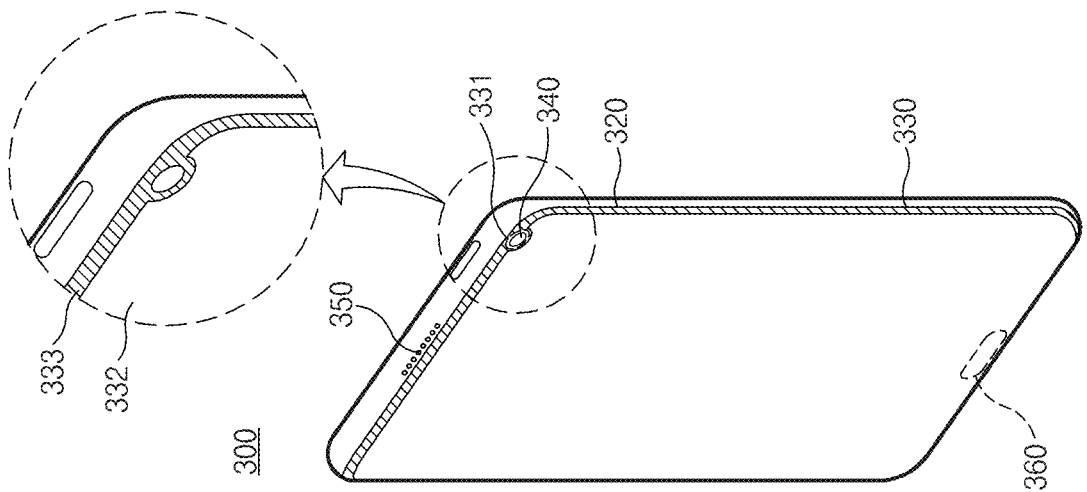
FIG. 3 is a perspective view and a six-sided view of a third type of an electronic device, according to an embodiment.
Figure 3:
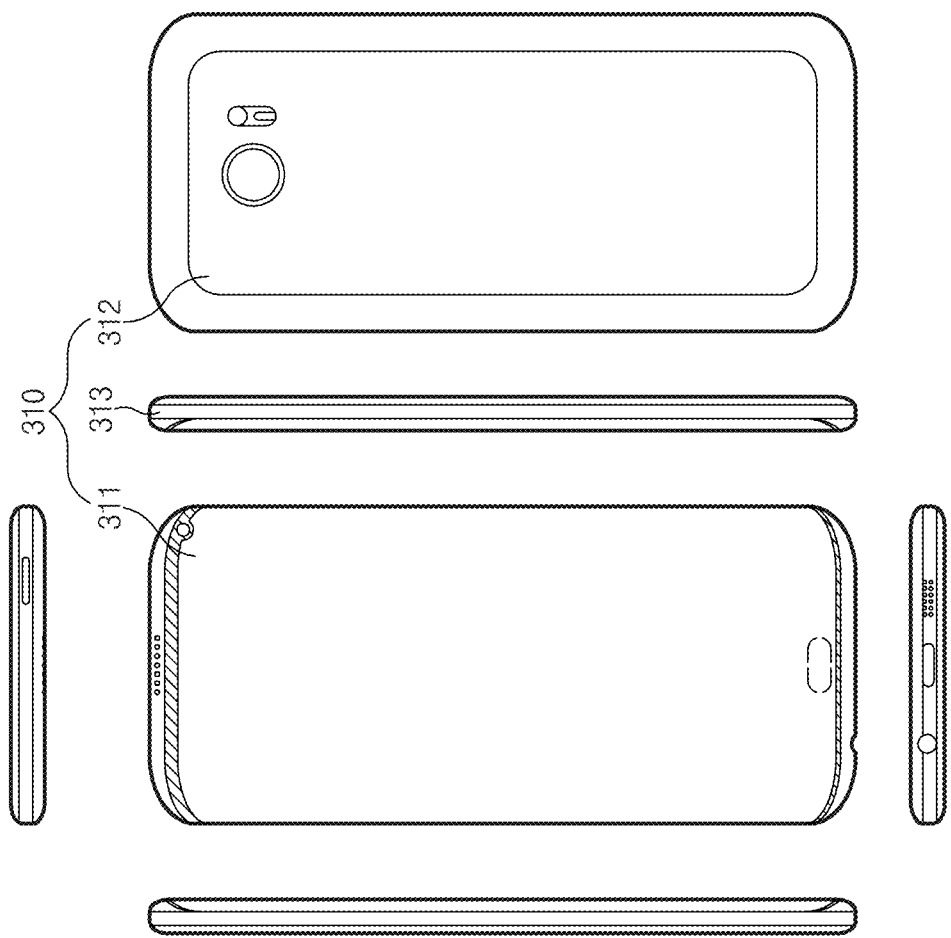

FIG. 3 is a perspective view and a six-sided view of a third type of an electronic device, according to an embodiment.

Referring to FIG. 3, according to an embodiment, an electronic device 300 may include a housing 310, a cover glass 320, a display panel 330, a camera module 340, a receiver hole 350, and a home key 360. The housing 310, the cover glass 320, the receiver hole 350 and the home key 360 of FIG. 3 may be components the same as or similar to the housing 110, the cover glass 120, the receiver hole 150, and the home key 160 illustrated in FIG. 1.

According to an embodiment of the present invention, the display panel 330 may be disposed under the cover glass 320. The display panel 330 may be bent such that at least one of the top end, the bottom end, the left end and/or right end of the display panel 230 constitutes a curved surface, and may be seated inside the housing 110. The display panel 330 may include an active region 332, an inactive region 333, and a PCB connection part (not illustrated).

According to an embodiment of the present invention, the display panel 330 according to an embodiment may include one cutout 331 such that a recess is formed in a corner of the active region 332. For example, the display panel 330 may include the cutout 331 formed at a left top end or a right top end of the active region 332. The display panel 330 may be bent such that the cutout 331 is positioned at the corner and may be disposed inside the housing 310. For example, the display panel 330 may be bent and disposed along the center of the cutout 331. When the display panel 330 is bent and disposed along the center of the cutout 331, as illustrated in FIG. 3, the cutout 331 may have an L-shaped space whens viewed from a front surface 311 of the electronic device 300. At least one module of the electronic device 300 may be exposed through the space defined by the cutout 331. For example, the camera module 340 may be disposed in a space defined by the cutout 331.

According to an embodiment of the present invention, when the cutout 331 is formed in the display panel 330, the active region 332 that outputs light may be damaged, which affects the design of the electronic device 300. In addition, the size of the cutout 331 formed in the display panel 330 may be larger than a specified size. When the display panel 330 is bent such that the cutout 331 is positioned at the corner, the region of the cutout 331 viewed from the front surface 311 may be reduced. As described above, the cutout 331 is formed in the display panel 330 and then the display panel 330 is bent and disposed such that the cutout 331 is positioned at the corner, thereby reducing the size of the cutout 331 exposed through the front surface 311.

According to an embodiment, the display panel 330 may include a first opening formed in the active region 332 and a second opening formed in the inactive region 333 or the PCB connection part. The display panel 330 may be disposed inside the housing 310 by being bent so that the first opening and the second opening overlap each other. When the display panel 330 may be bent and disposed such that the first opening overlaps with the second opening, the first opening and the second opening may form an O-shaped space when viewed from the front surface 311 of the electronic device 300. At least one module of the electronic device 300 may be exposed through the space defined by the first opening and the second opening. For example, the camera module 340 may be disposed in a space defined by the first opening and the second opening. As illustrated in FIG. 3, when the camera module 340 is exposed to the outside through the left top end or the right top end of the cover glass 320, a user-familiar physical user interface (PUI) may be provided.

Figure 4:
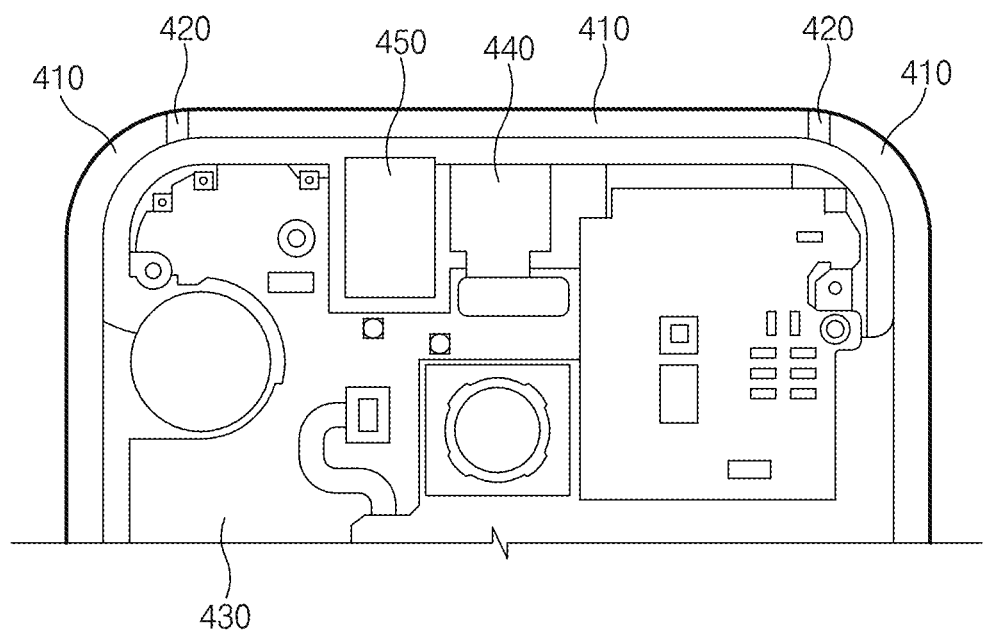
FIG. 4 is a view illustrating an internal structure of an upper portion of an electronic device, according to an embodiment.

FIG. 4 is a view illustrating an internal structure of an upper portion of an electronic device, according to an embodiment.

Referring to FIG. 4, according to one embodiment, an electronic device 400 may include a metal frame 410, a segment 420, a PCB 430, a camera module 440, and a receiver 450. The metal frame 410 may constitute at least a portion of the side surface of the electronic device 400. The left end and the right end of the metal frame 410 may be formed to have a thickness thinner than thicknesses of the top end and the bottom end of the metal frame 410. The metal frame 410 may be a side-surface housing of the electronic device 400. The metal frame 410 may perform as an antenna radiator of the electronic device 400. The metal frame 410 may be formed of a plurality of conductors. The metal frame 410 may be segmented by one or more segments 420.

According to one embodiment of the present invention, the segment 420 may be interposed between a plurality of conductors included in the metal frame 410. For example, the segment 420 may be located at the left top end and the right top end of the metal frame 410. The segment 420 may constitute a portion of the side surface of the electronic device 400. The segment 420 may be made of an insulator to prevent electricity from being conducted.

In accordance with one embodiment of the present invention, the camera module 440 may be disposed, for example, in the central region of the top end of the PCB 430. The receiver 450 may have a rectangular shape when viewed from the front. The receiver 450 may be disposed at the top end of the PCB 430. When the camera module 440 is disposed at the central region of the top end of the PCB 430, the receiver 450 may be arranged such that the long edge thereof faces the longitudinal direction. The receiver 450 may include a piezo-speaker. When the receiver 450 includes a piezo-speaker, the sound generated by the receiver 450 may be transmitted to the outside even if a receiver hole is not formed in the housing of the electronic device 400.

Figure 5:
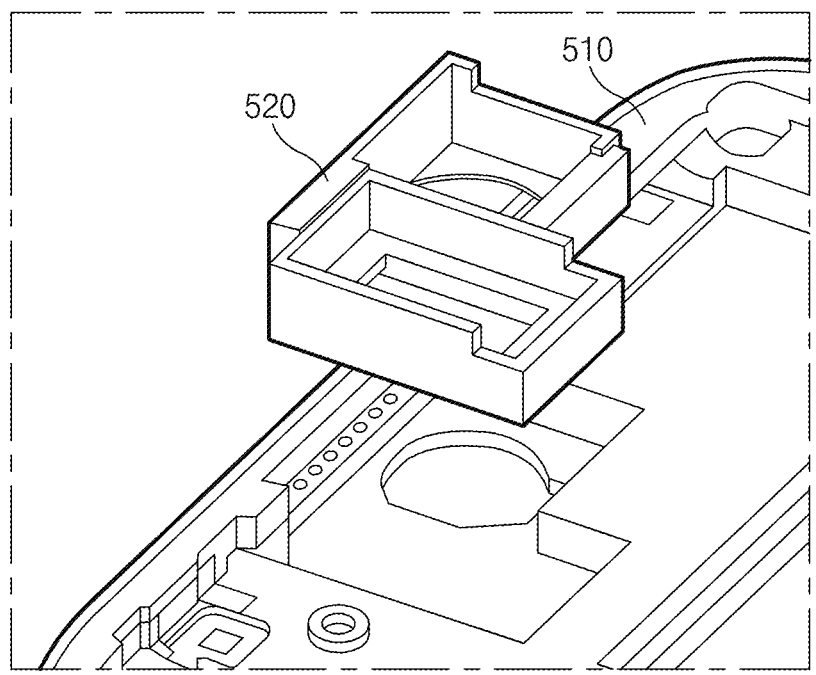
FIG. 5 is a view of a bracket of some modules, according to an embodiment.

FIG. 5 is a view of a bracket of some modules, according to an embodiment.

Referring to FIG. 5, according to one embodiment, an electronic device 500 may include a metal frame 510 and a bracket 520. The metal frame 510 may include one or more receiver holes formed in the central region of the top end of the metal frame 510.

According to one embodiment of the present invention, the bracket 520 may be provided to receive at least one module. For example, the bracket 520 may be provided to receive the camera module and the receiver. The bracket 520 may be provided to receive the camera module on the left side thereof and to receive the receiver on the right side thereof. The bracket 520 may include holes for mounting the camera module and the receiver. The bracket 520 may be seated in the housing such that the camera module is disposed at the center of the top end of the electronic device 500.

According to one embodiment of the present invention, the bracket 520 may perform a function of a duct for guiding the sound generated by the receiver to the receiver hole. As the camera is disposed, the length of the duct according to one embodiment may be longer than the length of a duct typically employed. The sound generated by the receiver may be transmitted to the receiver hole along the bracket 520 and then may be output to the outside.

Figure 6:
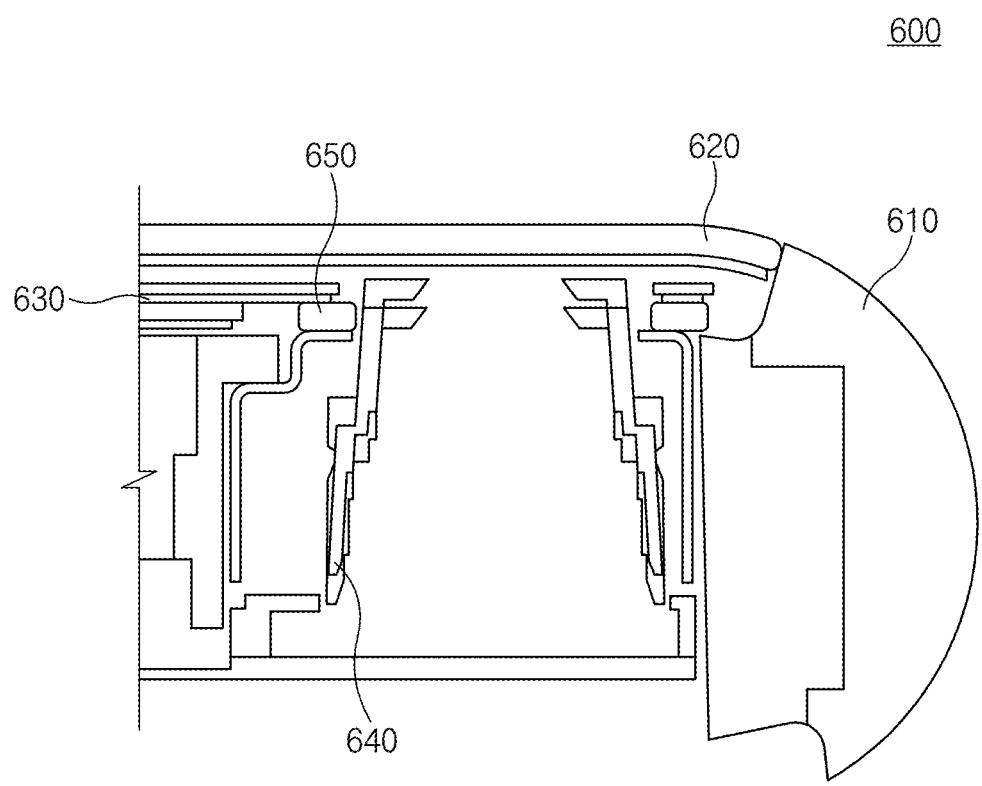
FIG. 6 is a view illustrating a mounting structure of a camera module, according to an embodiment.

FIG. 6 is a view illustrating a mounting structure of the camera module, according to an embodiment.

Referring to FIG. 6, according to an embodiment, an electronic device 600 may include a metal frame 610, a cover glass 620, a display panel 630, a camera module 640, and a buffer member 650. The metal frame 610 may constitute at least a portion of the side-surface housing of the electronic device 600. The metal frame 610 may be laterally adjacent to the cover glass 620, the display panel 630, and the camera module 640.

According to one embodiment of the present invention, the cover glass 620 may be disposed adjacent to the metal frame 610. The cover glass 620 may constitute at least a portion of the front-surface housing of the electronic device 600. The display panel 630 may be disposed under the cover glass 620. The display panel 630 may include an opening or a cutout.

According to an embodiment of the present invention, the camera module 640 may be disposed in a space defined by the opening or the cutout provided in the display panel 630. As the camera module 640 in a space defined by the opening or the cutout is arranged, the camera module 640 may be exposed to the outside through the cover glass 620 and the light may be introduced into the camera module 640 from outside.

According to one embodiment of the present invention, the buffer member 650 may be interposed between the camera module 640 and the display panel 630. The buffer member 650 may mitigate the impact to be applied between the camera module 640 and the display panel 630. The buffer member 650 may prevent dust, moisture, and the like from being introduced into the camera module 640. The buffer member 650 may be formed through, for example, sponge, tape, bonding or the like.

Figure 7A:
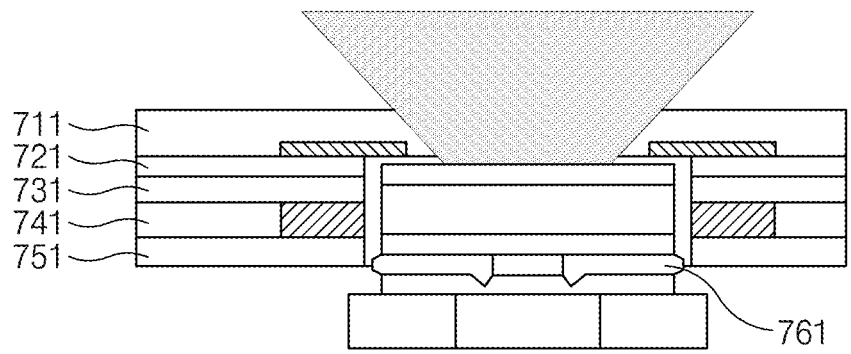
FIG. 7A is a cross-sectional view illustrating a first type of stack structure for an upper portion of an electronic device, according to an embodiment.
Figure 7B:
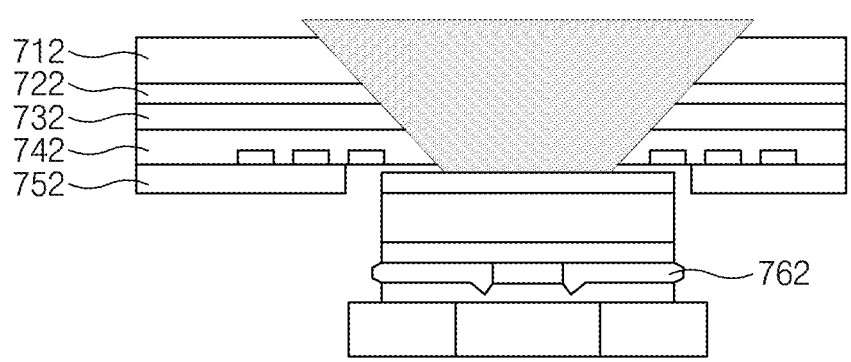
FIG. 7B is a cross-sectional view illustrating a second type of stack structure for an upper portion of an electronic device, according to an embodiment.
Figure 7C:
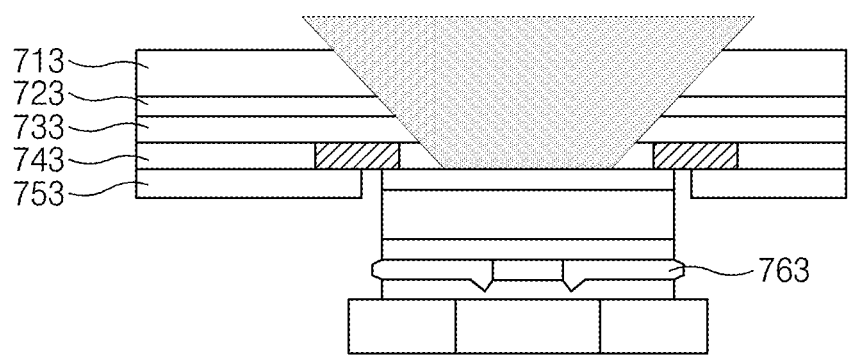
FIG. 7C is a cross-sectional view illustrating a third type of stack structure for an upper portion of an electronic device, according to an embodiment.

FIG. 7A is a cross-sectional view illustrating a first type of stack structure for an upper portion of the electronic device according to an embodiment, FIG. 7B is a cross-sectional view illustrating a second type of stack structure for an upper portion of the electronic device according to an embodiment, and FIG. 7C is a cross-sectional view illustrating a third type of stack structure for the upper portion of the electronic device, according to one embodiment.

Referring to FIGS. 7A to 7C, electronic devices 701, 702 and 703 are provided with cover glasses 711, 712 and 713, optical clear adhesives (OCA) 721, 722 and 723, polarizing plates 731, 732 and 733, display panels 741, 742, and 743, rear-surface members 751, 752, and 753, and camera modules 761, 762, and 763.

According to one embodiment, the camera module 761 may be disposed in the form that the camera module 761 is inserted in an opening formed in the OCA 721, the polarizing plate 731, the display panel 741, and the rear-surface member 751, as illustrated in FIG. 7A. In addition, the camera module 761 may be exposed to the outside through the cover glass 711.

According to one embodiment, the camera module 762 may be disposed in the form that the camera module 762 is inserted into an opening formed in the rear-surface member 752 (or rear-surface adhesive layer), as illustrated in FIG. 7B. In this case, a light emitting device and/or a driving device disposed adjacent to the camera module 762 may be removed from the display panel 742. The camera module 762 may be exposed to the outside through the cover glass 712, the OCA 722, the polarizing plate 732, and the display panel 742.

According to one embodiment, the camera module 763 may be disposed in the form that the camera module 763 is inserted into an opening formed in the rear-surface member 753 (or rear-surface adhesive layer), as illustrated in FIG. 7C. In this case, a partial region of the display panel 743 adjacent to the camera module 763 may be excluded to ensure the transparency. The camera module 763 may be exposed to the outside through the cover glass 713, the OCA 723, and the polarizing plate 733.

Figure 8:
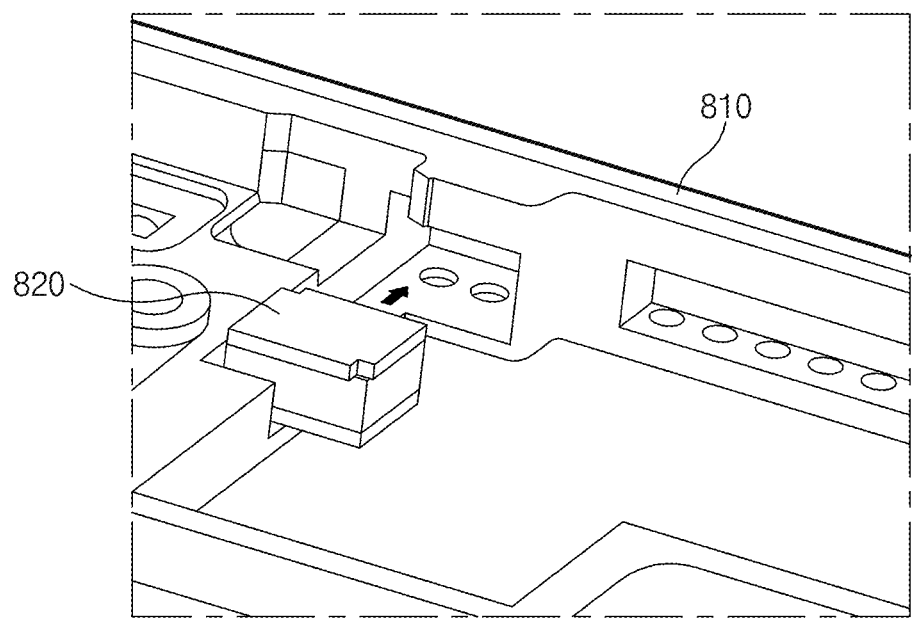
FIG. 8 is a view illustrating a mounting structure of a sensor module, according to an embodiment.

FIG. 8 is a view illustrating a mounting structure of a sensor module, according to an embodiment.

Referring to FIG. 8, according to one embodiment, an electronic device 800 may include a housing 810 and a sensor module 820. According to one embodiment, the housing 810 may include at least one hole such that the sensor module 820 is exposed to the outside. The housing 810 may include at least one hole formed in the outer portion of the display panel. For example, the housing 810 may include at least one hole formed in a position corresponding to an opening or a cutout provided in the display panel. For another example, the housing 810 may include at least one hole formed in a side surface of the housing 810. For another example, the housing 810 may include at least one hole formed in an outer portion of a front surface of the housing 810. The housing 810 may be provided such that the sensor module 820 may be mounted. For example, the housing 810 may have a space allowing the sensor module 820 to be inserted therein and seated thereon.

According to one embodiment of the present invention, the sensor module 820 may be mounted to the housing 810. When the sensor module 820 is mounted on the housing 810, the sensor module 820 may perform sensing through a hole formed in the housing 810. The sensor module 820 may include, for example, a proximity sensor and/or an illumination sensor. The sensor module 820 may sense the illuminance and sense the proximity of an object through a hole formed in the housing 810.

Figure 9:
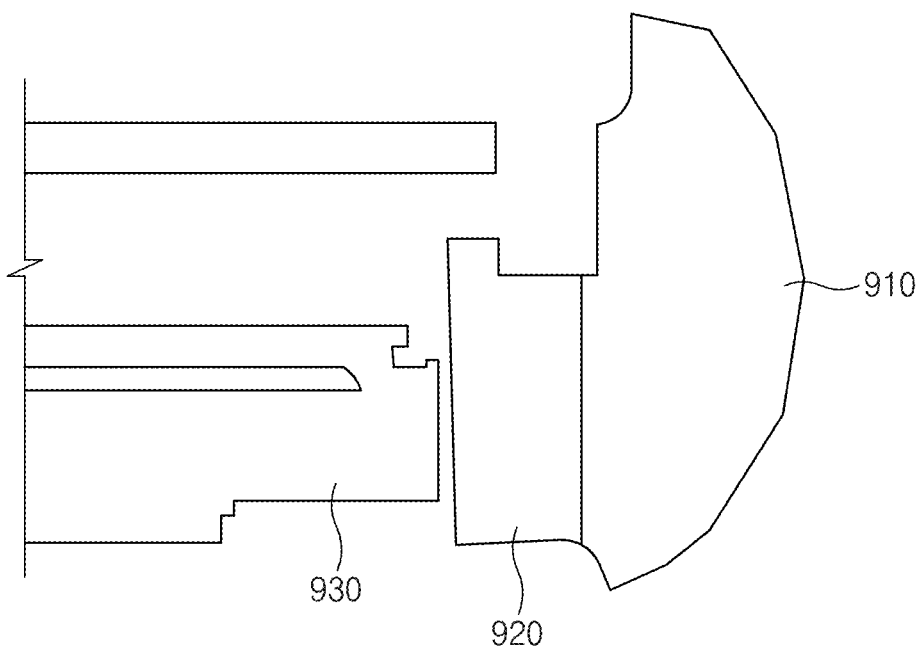
FIG. 9 is a cross-sectional view illustrating an upper portion of an electronic device, according to one embodiment.

FIG. 9 is a cross-sectional view illustrating an upper portion of an electronic device according to one embodiment.

Referring to FIG. 9, according to one embodiment, an electronic device 900 may include a metal frame 910, an internal housing 920, and a receiver 930. The metal frame 910 may constitute at least a portion of the side-surface housing of the electronic device 900. The metal frame 910 may be laterally adjacent to the internal housing 920. The internal housing 920 may be laterally adjacent to the metal frame 910. The internal housing 920 may receive the receiver 930.

According to one embodiment of the present invention, the metal frame 910 and/or the internal housing 920 may include a receiver hole formed in the direction that the metal frame 910 and/or the internal housing 920 extends. The receiver hole may be formed between the metal frame 910 and the cover glass. The sound generated by the receiver 930 may be output to the outside by being transmitted to the receiver hole.

According to one embodiment of the present invention, the receiver 930 may be mounted inside the internal housing 920. The receiver 930 may be disposed at a position that the sound generated by the receiver 930 is transmitted to the receiver hole.

Figure 10:
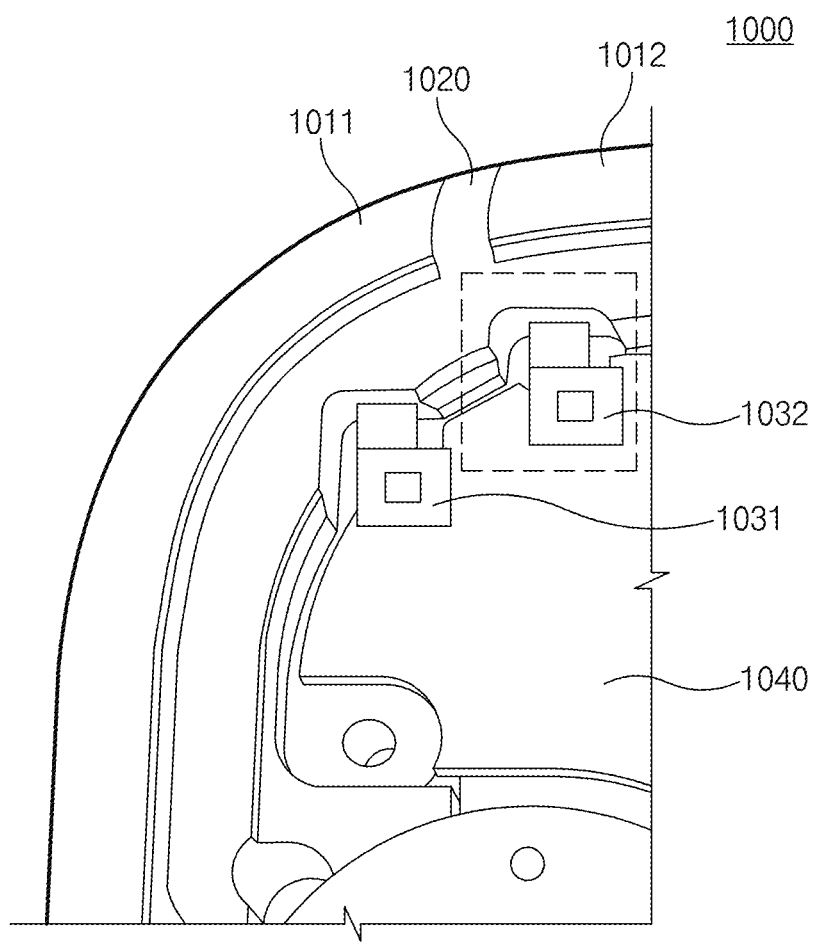
FIG. 10 is a view illustrating an internal structure of a left top end of an electronic device, according to an embodiment.

FIG. 10 is a view illustrating an internal structure of a left top end of an electronic device, according to an embodiment.

Referring to FIG. 10, according to an embodiment, an electronic device may include metal frames 1011 and 1012, a segment 1020, connection members 1031 and 1032, and a substrate 1040. The metal frames 1011 and 1012 may constitute at least a portion of the side-surface housing of the electronic device. The metal frames 1011 and 1012 may perform as an antenna radiator of the electronic device. The metal frames 1011 and 1012 may be formed of a plurality of conductors. The metal frames 1011 and 1012 may be segmented by at least one segment 1020.

According to one embodiment of the present invention, the segment 1020 may be interposed between a plurality of conductors included in the metal frames 1011 and 1012. For example, the segment 1020 may be located at the left top end of the metal frames 1011 and 1012. The segment 1020 may be made of an insulator to prevent electricity from being conducted. The segment 1020 may include a reinforcing protruding structure for improving the strength of the segment 1020.

According to an embodiment of the present invention, the connection members 1031 and 1032 may connect the metal frames 1011 and 1012 and the substrate 1040. For example, the connection members 1031 and 1032 may be in contact with the metal frames 1011 and 1012. The connection members 1031 and 1032 may be in contact with the exposed portions of the metal frames 1011 and 1012 to be utilized contacts with an antenna radiator. The connection members 1031 and 1032 may be fixed on the substrate 1040.

Figure 11:
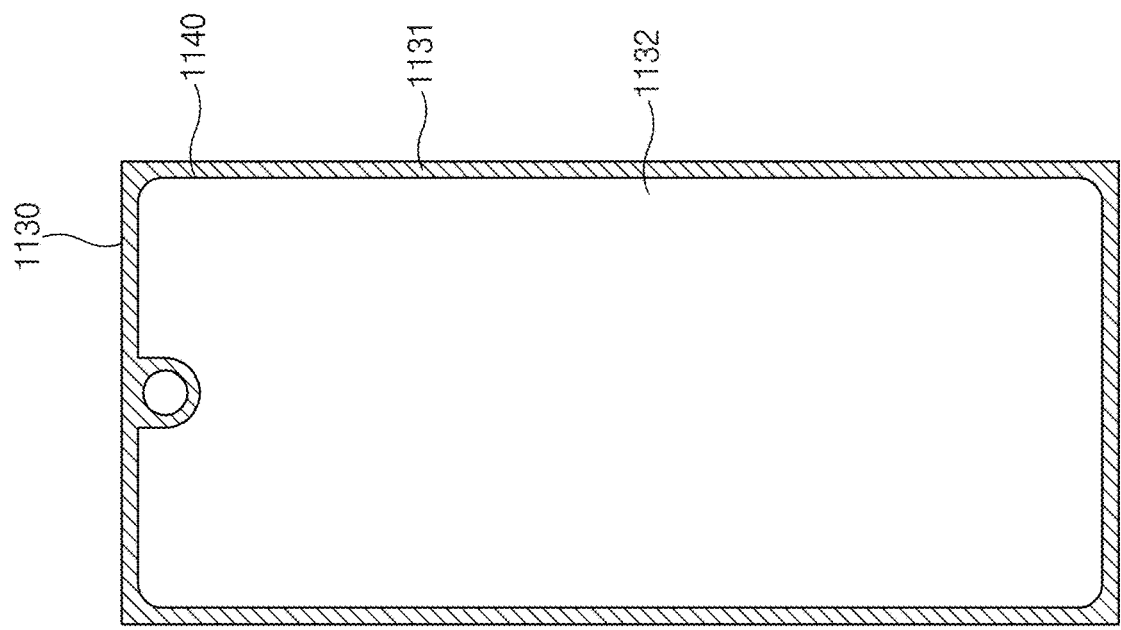
FIG. 11 is a view illustrating a cover glass, according to one embodiment.
Figure 11:
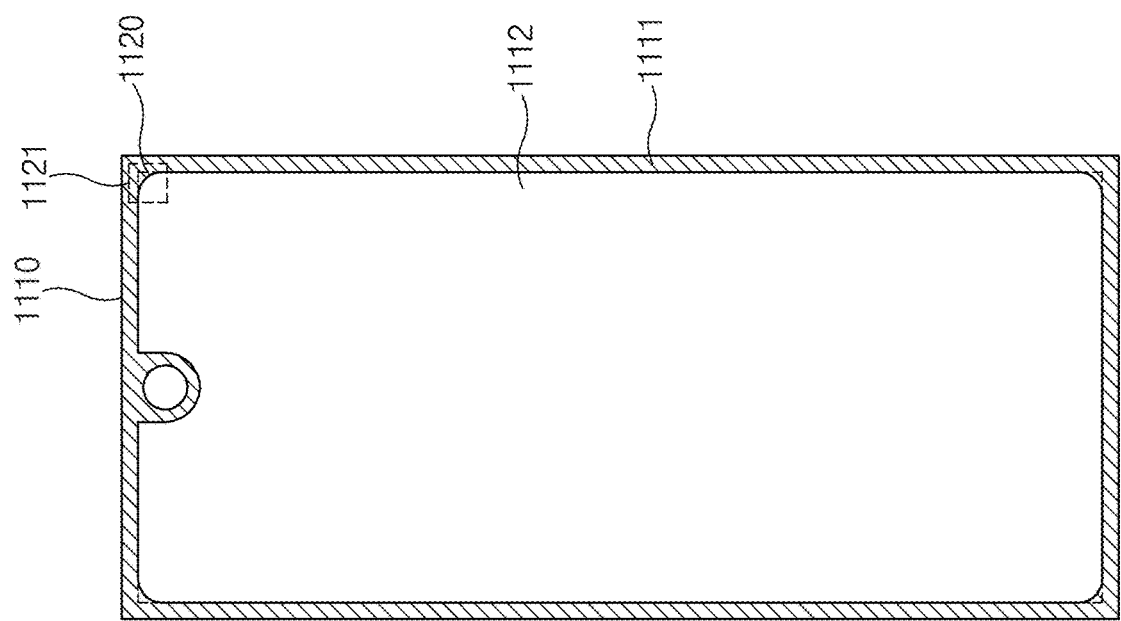

FIG. 11 is a view illustrating a cover glass according to one embodiment.

Referring to FIG. 11, according to an embodiment, a cover glass 1110 may include a layer 1111 (e.g., black masking) opaquely printed on one side to cover the apex of an active region 1112 of a display panel 1120. The layer 1111, which is opaque, may be roundly printed on the region of the cover glass 1110 corresponding to a corner part 1121 of the active region 1112 so that the corner part 1121 of the active region 1112 is viewed to be rounded.

According to one embodiment, an active region 1132 of a display panel 1140 may be formed to be rounded. In this case, a layer 1131, which is opaque, may be roundly printed along the active region 1132 of the display panel 1140 at the corner part of a cover glass 1130.

Figure 12:
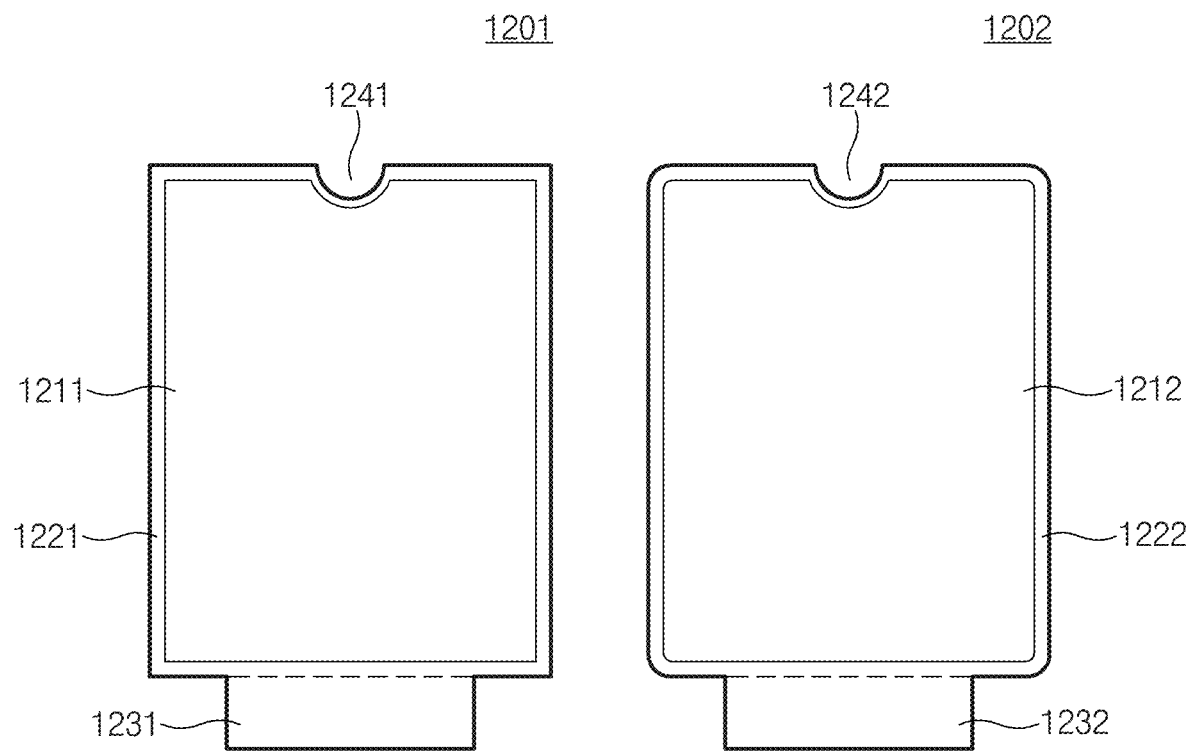
FIG. 12 is a view illustrating a display panel, according to an embodiment of the present invention.

FIG. 12 illustrates a display panel of an electronic device according to an embodiment.

Referring to FIG. 12, according to an embodiment, a display panel 1201 may include an active region 1211, an inactive region 1221, and a PCB connection part 1231. The display panel 1201 may include a cutout 1241 formed in the center region of the top end of the active region 1211. The cutout 1241 may be formed by concavely cutting the display panel 1201. In the active region 1211, light emitting devices may be arranged. A screen may be output to the active region 1211 depending on the operation of the light emitting device. The active region 1211 may have the shape of a rectangle. The inactive region 1221 may be a region surrounding the active region 1211. The PCB connection part 1231 may be connected to one end of the inactive region 1221. For example, the PCB connection part 1231 may be connected to a bottom end of the inactive region 1221. A PCB connection part 1231 may connect lines extending from an active region 1231 to a PCB.

According to an embodiment, a display panel 1202 may include an active region 1212, an inactive region 1222, and a PCB connection part 1232. The corner part of the active region 1212 may be formed to be rounded. In this case, the corner part of the inactive region 1222 may be rounded with the same or similar curvature as that of the corner part of the active region 1212.

According to various embodiments, the display panels 1201 and 1202 may be provided in the electronic device in the state that the active regions 1211 and 1212 are flat, or may be provided in the electronic device in the state that at least one of top, bottom, left, and/or right ends of the active regions 1211 and 1212 is bent such that the active regions 1211 and 1212 constitute the curved surface.

Figure 13A:
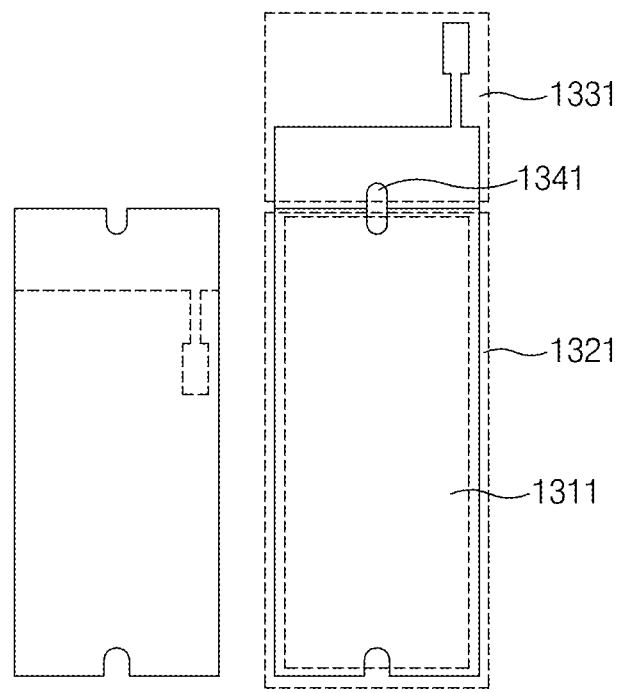
FIG. 13A is a view illustrating a first type of display panel, according to an embodiment.
Figure 13B:
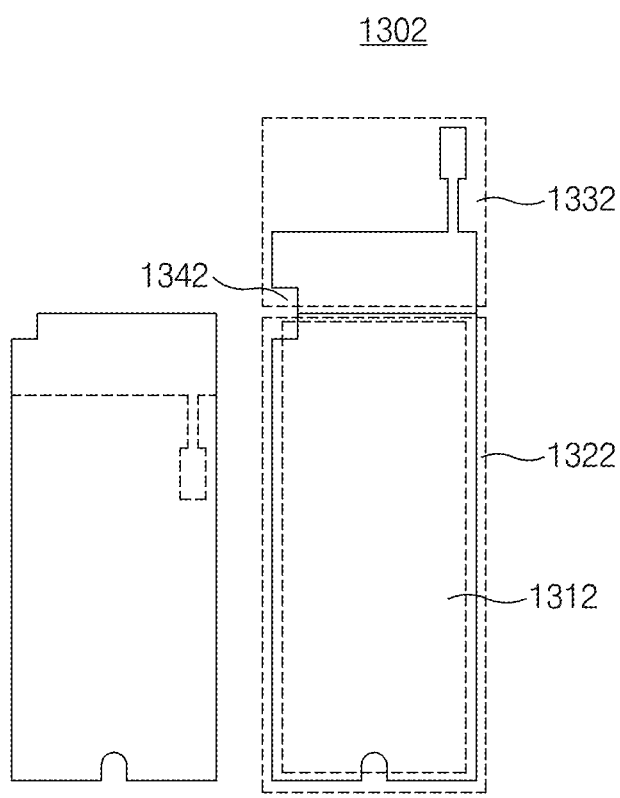
FIG. 13B is a view illustrating a second type of display panel, according to an embodiment.
Figure 13C:
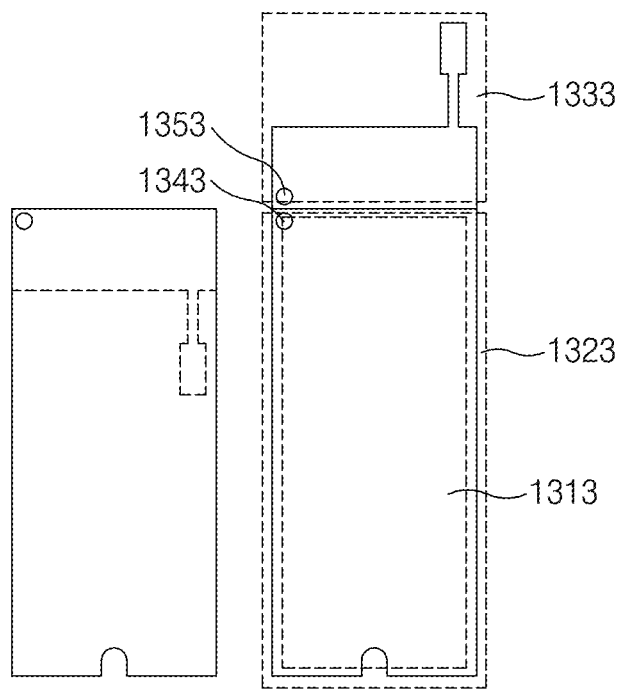
FIG. 13C is a view illustrating a third type of display panel, according to an embodiment.

FIG. 13A is a view illustrating a first type of a display panel, according to an embodiment, FIG. 13B is a view illustrating a second type of a display panel, according to an embodiment, and FIG. 13C is a view illustrating a third type of a display panel, according to an embodiment.

Referring to FIG. 13A, according to an embodiment, a display panel 1301 may include an active region 1311, an inactive region 1321, and a PCB connection part 1331. The display panel 1301 may include an opening 1341 formed in the center region of the top end of the active region 1311. The opening 1341 may be formed throughout the active region 1311, the inactive region 1321, and the PCB connection part 1331. When the display panel 1301 is bent and disposed along the center of the opening 1341, the opening 1341 may form a U-shaped space when viewed from the front of the electronic device. In this case, a part of the active region 1311 may overlap with the PCB connection part 1331. Various modules such as a camera module may be disposed in the space formed by the opening 1341. The display panel 1301 may include a U-shaped cutout formed at the bottom end thereof. Although FIG. 13A illustrates that the cutout is formed in the bottom end of the display panel 1301, the present invention is not limited thereto, and the display panel 1301 may not include the cutout at the bottom end thereof. The inactive region 1321 may surround the active region 1311. The PCB connection part 1331 may be connected with one end of the inactive region 1321. For example, the PCB connection part 1331 may be connected with a top end of the inactive region 1321. The PCB connection part 1331 may connect lines extending from an active region 1311 with a PCB.

Referring to FIG. 13B, according to an embodiment, a display panel 1302 may include an active region 1312, an inactive region 1322, and a PCB connection part 1332. The display panel 1302 may include a cutout 1342 formed in the left top end of the active region 1312. When the display panel 1302 is bent and disposed along the center of the cutout 1342, the cutout 1342 may form an L-shaped space when viewed from the front of the electronic device. In this case, a part of the active region 1312 may overlap with the PCB connection part 1332. Various modules, such as a camera module, may be disposed in the space formed by the cutout 1342.

Referring to FIG. 13C, according to an embodiment, a display panel 1303 may include an active region 1313, an inactive region 1323, and a PCB connection part 1333. The display panel 1303 may include a first opening 1343 formed at the left top end of the active region 1313 and a second opening 1353 formed in the PCB connection part 1333. When the display panel 1303 is bent and disposed such that the first opening 1343 overlaps with the second opening 1353, the first opening 1343 and the second opening 1353 may form an O-shaped space when viewed from the front surface of the electronic device. In this case, a part of the active region 1313 may overlap with the PCB connection part 1333. Various modules, such as a camera module, may be disposed in a space defined by the first opening 1343 and the second opening 1353.

Figure 14:
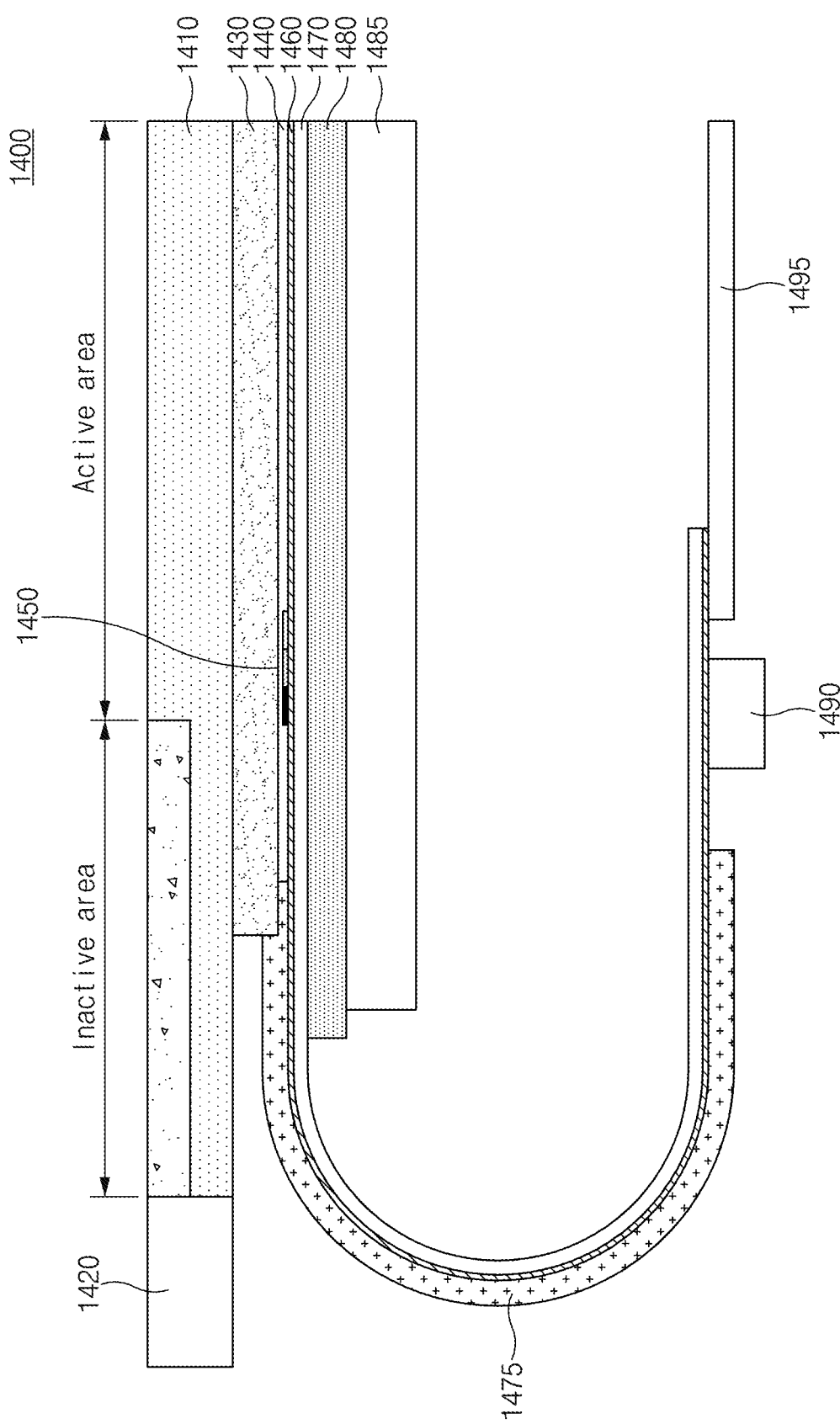
FIG. 14 is a cross-sectional view illustrating a portion of an electronic device, according to one embodiment.

FIG. 14 is a cross-sectional view illustrating a portion of an electronic device, according to one embodiment.

Referring to FIG. 14, according to an embodiment, an electronic device 1400 may include a cover glass 1410, a housing 1420, a polarizing plate 1430, an encapsulating layer 1440, a light emitting layer 1450, a thin film transistor (TFT) 1460, a substrate 1470, a buffer member 1475, a copper/graphite layer 1480, a cushion layer 1485, a display driver IC 1490, and a flexible printed circuit board (FPCB) 1495.

According to an embodiment of the present invention, the polarizing plate 1430 may be disposed under the cover glass 1410. The polarizing plate 1430 may polarize light generated in the light emitting layer 1450 to realize a desired color.

According to one embodiment of the present invention, the encapsulating layer 1440 may prevent moisture from being infiltrated into the light emitting layer 1450. The encapsulating layer 1440 may be formed to surround the light emitting layer 1450. The encapsulating layer 1440 may include inorganic materials and organic materials, and may be formed as a thin film.

According to an embodiment of the present invention, the light emitting layer 1450 may generate light. The light emitting layer 1450 may include various types of light emitting devices According to an embodiment of the present invention, the TFT 1460 may transmit an electrical signal to the light emitting layer 1450 such that light is generated from the light emitting layer 1450.

According to one embodiment of the present invention, the substrate 1470 may support the TFT 1460, the light emitting layer 1450, the encapsulating layer 1440, and the polarizing plate 1430. The substrate 1470 may include, for example, polyamide.

According to one embodiment of the present invention, the buffer member 1475 may be disposed outside the bending portions of the TFT 1460 and the substrate 1470. The buffer member 1475 may reduce the pressure applied to the substrate 1470 when the substrate 1470 is bent. The buffer member 1475 may be, for example, a stress neutralization layer (SNL).

According to one embodiment of the present invention, the copper/graphite layer 1480 may be disposed under the substrate 1470. The copper/graphite layer 1480 may block the noise of the TFT 1460 and help heat radiation.

According to one embodiment of the present invention, the cushion layer 1485 may be disposed under the copper/graphite layer 1480. The cushion layer 1485 may have a function of relieving the pressure applied from the housing 1420.

According to one embodiment of the present invention, the display driver IC 1490 may drive a display module. The display driver IC 1490 may drive or control, for example, the TFT 1460.

According to one embodiment of the present invention, the FPCB 1495 may connect the display with a main PCB of the electronic device 1400. The FPCB 1495 may be omitted depending on the implementation forms of the present invention. In this case, the display and the main PCB of the electronic device 1400 may be directly connected with each other through a connector.

Figure 15:
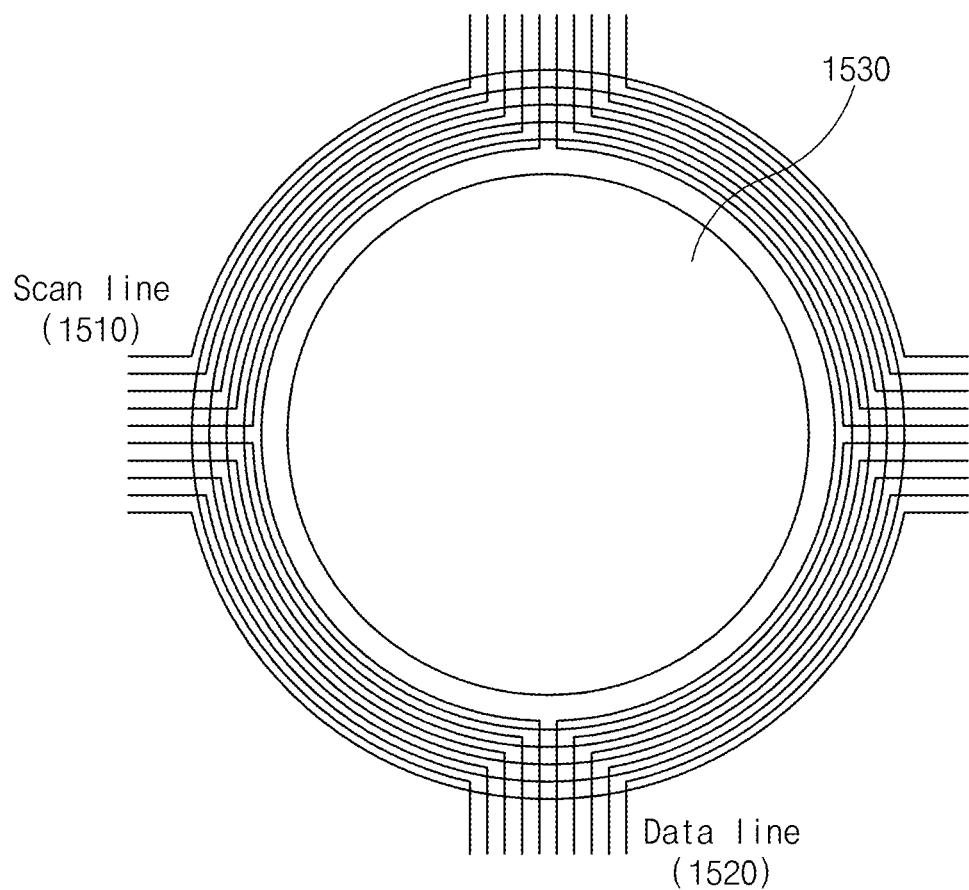
FIG. 15 is a view illustrating a wiring structure around an opening formed in the display panel, according to the embodiment.

FIG. 15 is a view illustrating a wiring structure around the opening formed in the display panel according to an embodiment.

Referring to FIG. 15, the display panel may include a scan line 1510 and a data line 1520. Typically, the scan line 1510 extends in a widthwise direction of the display panel, and the data line 1520 extends in a lengthwise direction of the display panel. The path of the scan line 1510 and the data line 1520 needs to be changed when an opening 1530 is formed in the display panel. When scan lines 1510 meets the opening 1530, the scan lines 1510 may be arranged to be bent upward and downward, respectively, along the periphery of the opening 1530. When the scan lines 1510 bent upward and downward extend along the periphery of the opening 1530 and meet with each other, the scan lines 1510 may again extend in the widthwise direction of the display panel. When data lines 1520 meets the opening 1530, the data lines 1520 may be arranged to be bent leftward and rightward along the periphery of the opening 1530. When the data lines 1520 bent leftward and rightward extend along the periphery of the opening 1530 and meet with each other, the data lines 1520 may again extend in the lengthwise direction of the display panel.

Figure 16:
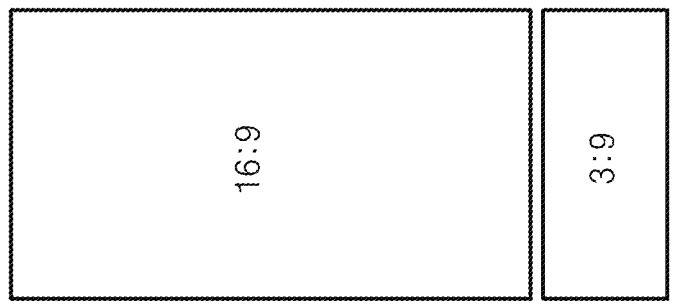
FIG. 16 is a view for explaining a ratio of a screen output through a display panel, according to an embodiment.
Figure 16:
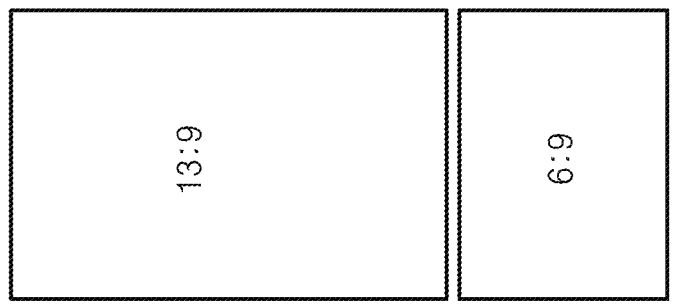
Figure 16:
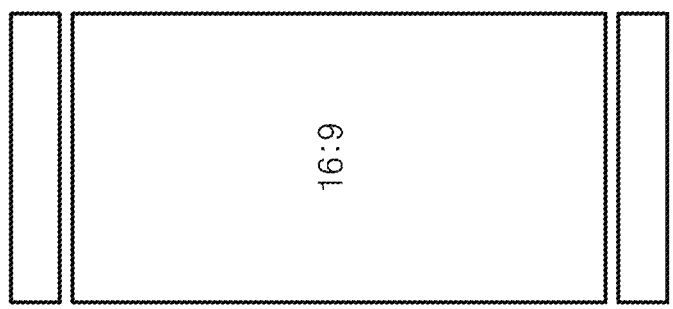
Figure 16:
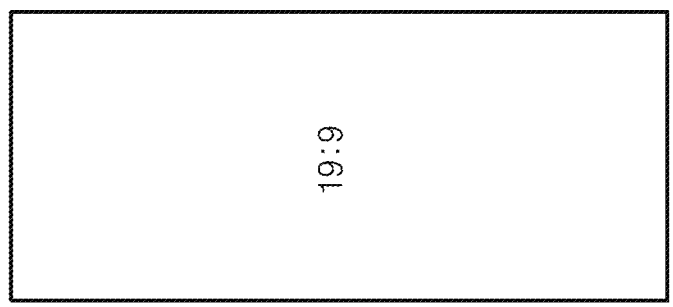

FIG. 16 is a view for explaining a ratio of a screen output through a display panel according to an embodiment.

Referring to FIG. 16, according to an embodiment, the aspect ratio of a screen output by the display panel may be 19:9. According to an embodiment, the aspect ratio of the screen may be, at the ratio in the vertical direction, greater than a typical screen having the aspect ratio of 16:9. The display panel may output one image at an aspect ratio of 19:9.

According to one embodiment, the display panel may output an image split into three regions. In this case, for example, the display panel may output an image having an aspect ratio of 1.5:9 at the top end and the bottom end, and an image having an aspect ratio of 16:9 in the central region. The aspect ratio between the top end and the bottom end may be variously changed. The top end may output, for example, an indicator bar that provides a communication state, a remaining battery level, a current time, and/or a notification icon. The bottom end may output, for example, a soft key that may perform functions such as menu calls and/or cancellations. The central region may output one image at an aspect ratio of 16:9. When reproducing an image having an aspect ratio of 16:9, for example, an HD (high-definition) image, the display panel displays an image on the central region, simultaneously displays the indicator bar on the top end, and may output the soft key associated with the reproduction of the image on the bottom end. Since the content output through the display represents the highest frequency in the content aspect ratio of 16:9, a convenient user interface may be provided when outputting normal content according to the above-described screen configuration.

According to one embodiment, the display panel may output an image split into two parts. In this case, the display panel may output, for example, an image having an aspect ratio of 13:9 on the upper region and an image having an aspect ratio of 6:9 on the lower region. For another example, the display panel may output an image having an aspect ratio of 16:9 on the upper region and an image having an aspect ratio of 3:9 on the lower region. According to various embodiments, the aspect ratio of the upper region and the aspect ratio of the lower region may be varied. The display panel may output the execution screen of the first application in the upper region and output the execution screen of the second application on the lower region. According to various embodiments, the display panel may output two or more split images such as three or four split images.

Figure 17:
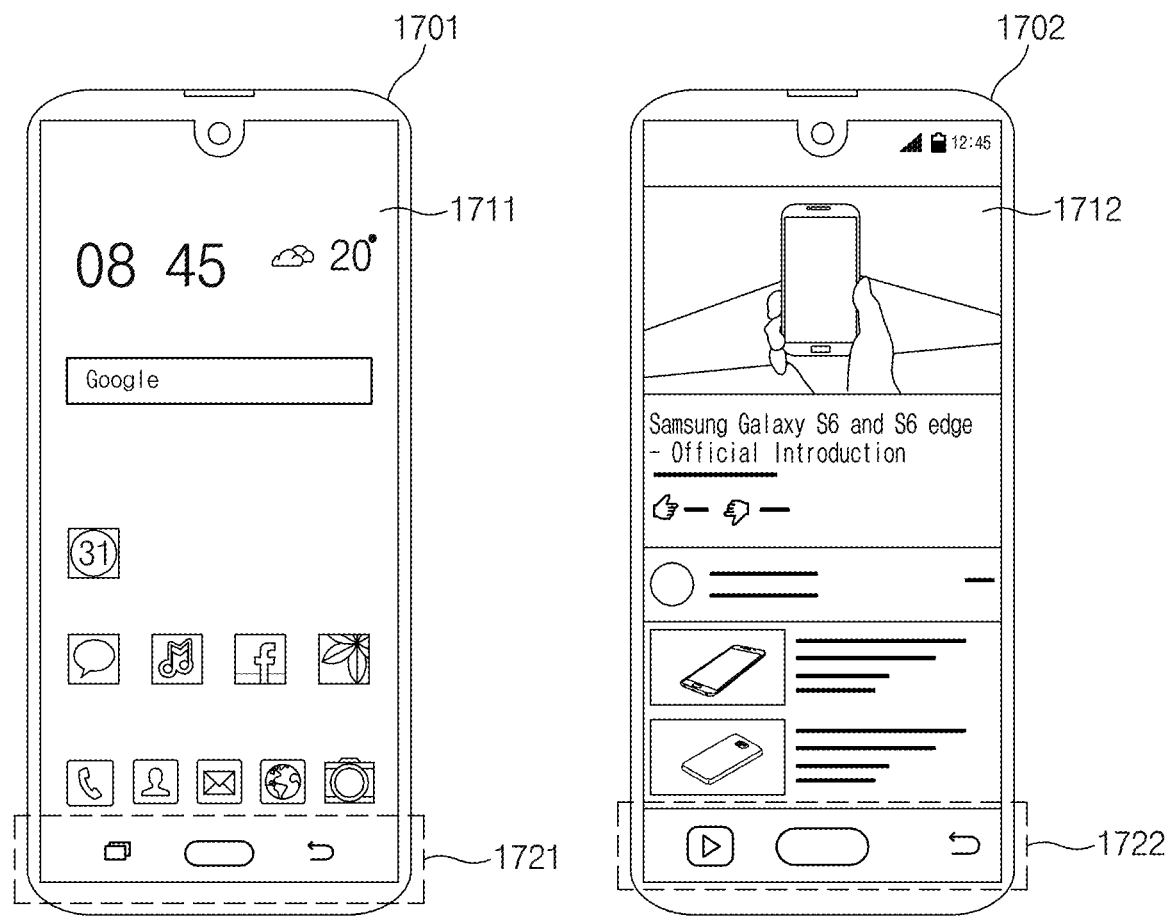
FIG. 17 is a view illustrating a soft key output differently depending on an application type, according to an embodiment.

FIG. 17 is a view illustrating a soft key output differently depending on an application type according to an embodiment. According to various embodiments, electronic devices 1701 and 1702 may display soft keys associated with an executed application in bottom ends 1721 and 1722 of display panels 1711 and 1712.

Referring to FIG. 17, the electronic device 1701 may display, for example, a home screen on the display panel 1711. The user may perform a function for changing the state or setting of the electronic device 1701 on the home screen. When a home screen is displayed on the display panel 1711, the electronic device 1701 displays a menu key for supporting the change in the state or the setting of the electronic device on the bottom end 1721 of the display panel 1711, together with a home key and a cancel key. The home key, the cancel key, and the menu key may be provided through soft keys.

For another example, the electronic device 1702 may execute a multimedia reproduction application capable of searching for and reproducing an image. When the multimedia reproduction application is executed, the electronic device 1702 may display the execution screen of the multimedia reproduction application on the display panel 1712. The user may perform functions such as playing back, pausing, stop, rewinding, or fast forwarding of a moving picture when the multimedia reproduction application is executed. When the execution screen of the multimedia reproduction application is displayed on the display panel 1712, the electronic device 1702 displays a moving picture control key for supporting a control function of the moving picture together with a home key and a cancel key on the bottom end 1722 of the display panel 1712.

Figure 18:
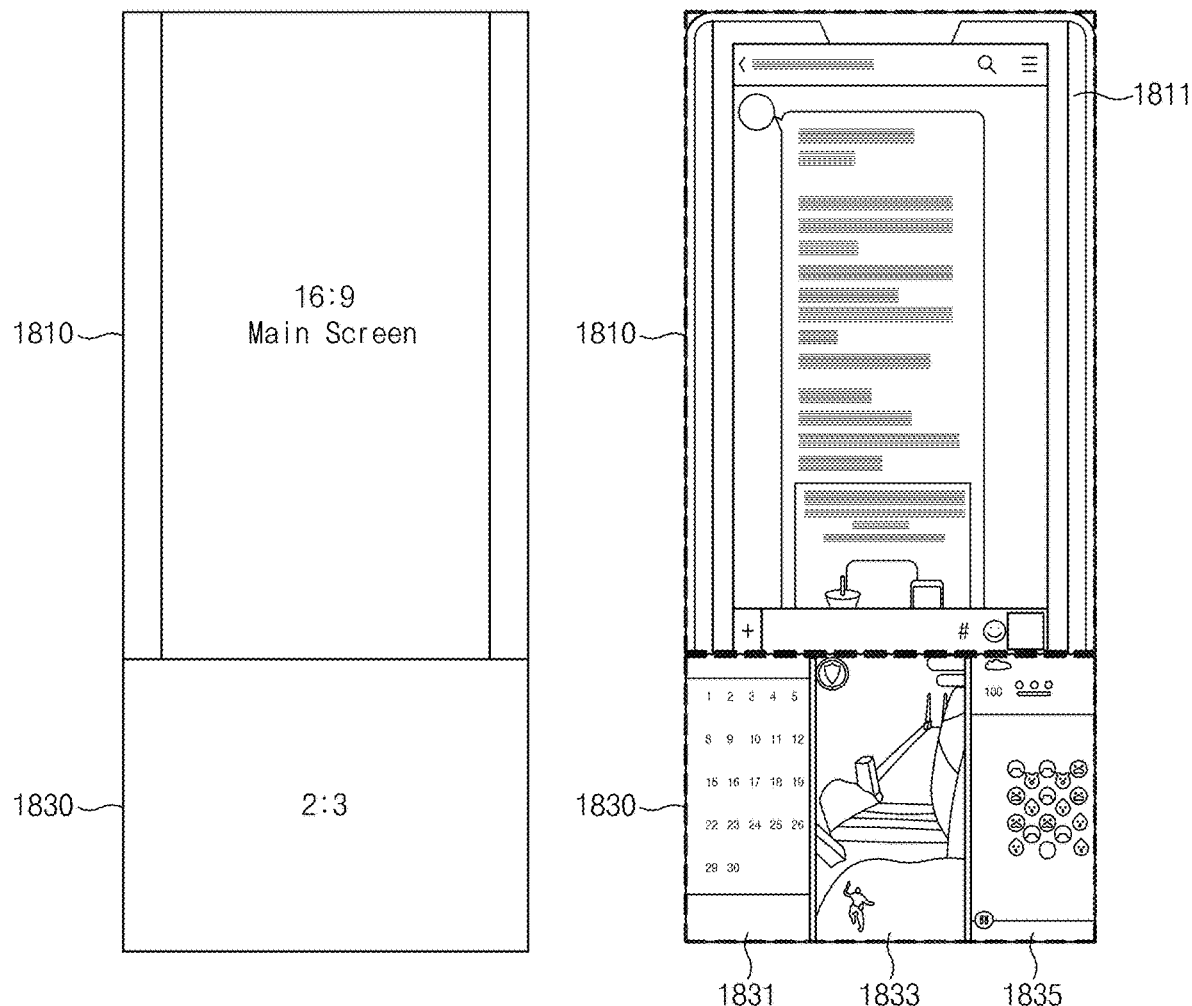
FIG. 18 is a view illustrating that the screen of a display is split, according to an embodiment.

FIG. 18 is a view illustrating that the screen of a display is split, according to an embodiment.

Referring to FIG. 18, according to an embodiment, a screen of a display may include a first screen region 1810 and a second screen region 1830. The first screen region 1810 may occupy a top end of the display, and may have the aspect ratio of, for example, 16:9. The first screen region 1810, which serves as a main screen region, may be the region on which an execution screen 1811 of the first application activated is output. For example, the execution screen 1811 of the first application executed in foreground may be output to the first screen region 1810.

According to one embodiment of the present invention, the second screen region 1830 may occupy the bottom end of the display, and may have the aspect ratio of, for example, 2:3. The second screen region 1830, which serves a sub-screen region, may be a region that a list of applications is output such that at least one of an application running in background or an executable application is selected. For example, an execution screen 1831 of the second application, an execution screen 1833 of the third application, and an execution screen 1835 of the fourth application may be output together on the second screen region 1830. According to one embodiment, the second screen region 1830 may be split by the number of execution screens of the application to be output, and the execution screen of each application may be output to the split regions.

According to one embodiment, when a designated user input occurs for the execution screen of the application output to the second screen region 1830, the display may output the execution screen of the selected application to the first screen region 1810, and may output the execution screen of the application, which is previously output in the first screen region 1810, on the second screen region 1830. For example, when an input for dragging the execution screen 1831 of the second application output to the second screen region 1830 to the first screen region 1810 occurs, the display may output the execution screen 1831 of the second application to the first screen region 1810 and output the execution screen 1811 of the first application, which is previously output in the first screen region 1810, to the second screen region 1830. In this case, the electronic device may activate (e.g., switch to foreground) the second application moved to the first screen region 1810 and deactivate (switch to background) the first application moved to the second screen region 1830.

Figure 19:
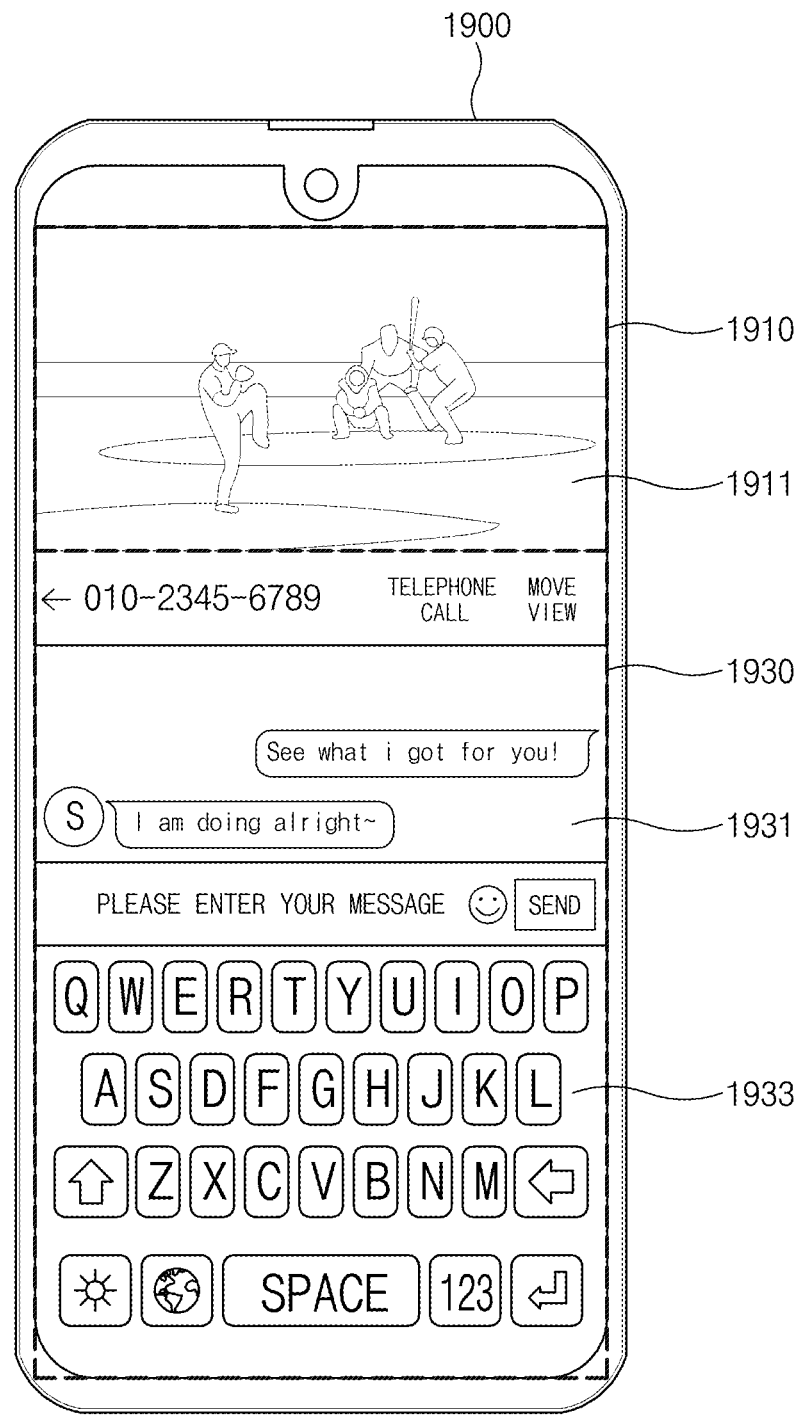
FIG. 19 is a view illustrating a screen that is split differently depending on an application type, according to an embodiment.

FIG. 19 is a view illustrating a screen that is split differently depending on an application type, according to an embodiment.

Referring to FIG. 19, according to an embodiment, an electronic device 1900 may output an execution screen for a plurality of applications through split screen regions of a display. According to various embodiments, the electronic device 1900 may split the screen based on at least one of the type and number of applications to be output on the screen, the type and the characteristic of the content to be output on the execution screen of the application, and specified user information.

For example, the electronic device 1900 may split the screen region to correspond to the number of applications to be displayed on the screen. In the drawing, the electronic device 1900 splits the screen region into two parts and outputs an execution screen 1911 of the first application to a first screen region 1910, and an execution screen 1931 of the second application to a second screen region 1930.

For another example, the electronic device 1900 may designate the ratios of the split screen regions to different values depending on the type of application, and the type and characteristic of the content to be displayed on the execution screen of the application. As illustrated in the drawing, the electronic device 1900 may designate the ratio of the first screen region 1910 to correspond to the ratio of content (e.g., an image, a moving picture, or the like) to be output on the execution screen 1911 of the first application. In addition, the electronic device 1900 may fully output the content on the execution screen 1911 of the first application when the execution screen 1911 of the first application is output to the first screen region 1910. For example, the electronic device 1900 may exclude regions of a letterbox and a pillarbox associated with the content when specifying the ratio of the first screen region 1910. Accordingly, the content may be fully output to the first screen region 1910.

According to one embodiment, when the first screen region 1910 is designated depending on the execution screen 1911 of the first application, the electronic device 1900 may designate the remaining region of the display as the second screen region 1930. In the drawing, the execution screen 1931 of the message application is output to the second screen region 1930. If the second screen region 1930 is designated, the ratio of the second screen region 1930 may not be changed even if a soft input panel 1933 for inputting a message is output during the execution of the message application. For example, the electronic device 1900 may output the soft input panel 1933 only within the second screen region 1930. Accordingly, the electronic device 1900 may maintain the ratio of the first screen region 1910 even if the soft input panel 1933 is output.

Figure 20:
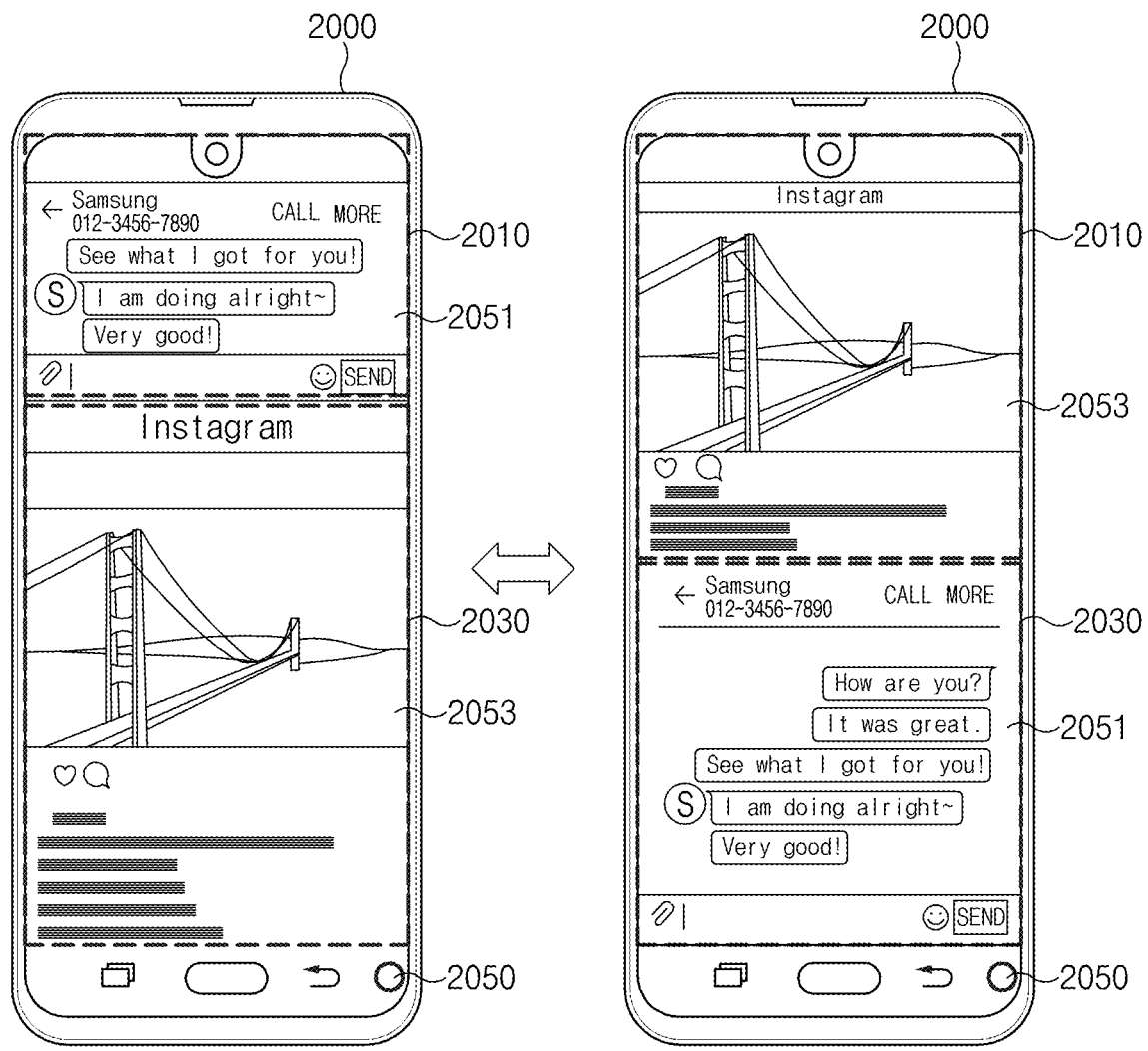
FIG. 20 is a view illustrating the switching of a screen split, according to an embodiment.

FIG. 20 is a view illustrating the switching of a screen split, according to an embodiment.

Referring to FIG. 20, according to an embodiment, an electronic device 2000 may output an execution screen of a plurality of applications through split screen regions of a display. In the left part of the drawing, the electronic device 2000 outputs an execution screen 2051 of the first application to a first screen region 2010, and an execution screen 2053 of the second application to a second screen region 2030. According to one embodiment, when a screen switching key 2050 output to the bottom end of the screen of a display is selected, the electronic device 2000 switch the execution screens of applications output to the first screen region 2010 and the second screen region 2030. For example, the electronic device 200 outputs an execution screen 2053 of the second application to the first screen region 2010 and outputs the execution screen 2051 of the first application to the second screen region 2030, as illustrated in the right side of the drawing. According to one embodiment, the screen switching key 2050 may be output, as a soft key, adjacent to another soft key (e.g., a home key or the like) output to the bottom end of the display.

According to one embodiment, the electronic device 2000 may designate the ratios of the screen regions to different values depending on the type of an application to be output, and the type and characteristic of the content to be displayed on the execution screen of the application when the screen is switched. Alternatively, the electronic device 2000 may switch the execution screen of the application while maintaining the ratio of the screen area. When switching the execution screen of an application while maintaining the ratio of the screen region, the electronic device 2000 may resize the execution screen of the application to prevent the execution screen of the application from being cut off. For example, an execution screen of an application for reproducing a moving picture may be resized to correspond to a ratio of the moving picture, and an execution screen of a message application may be cropped in some regions.

Figure 21:
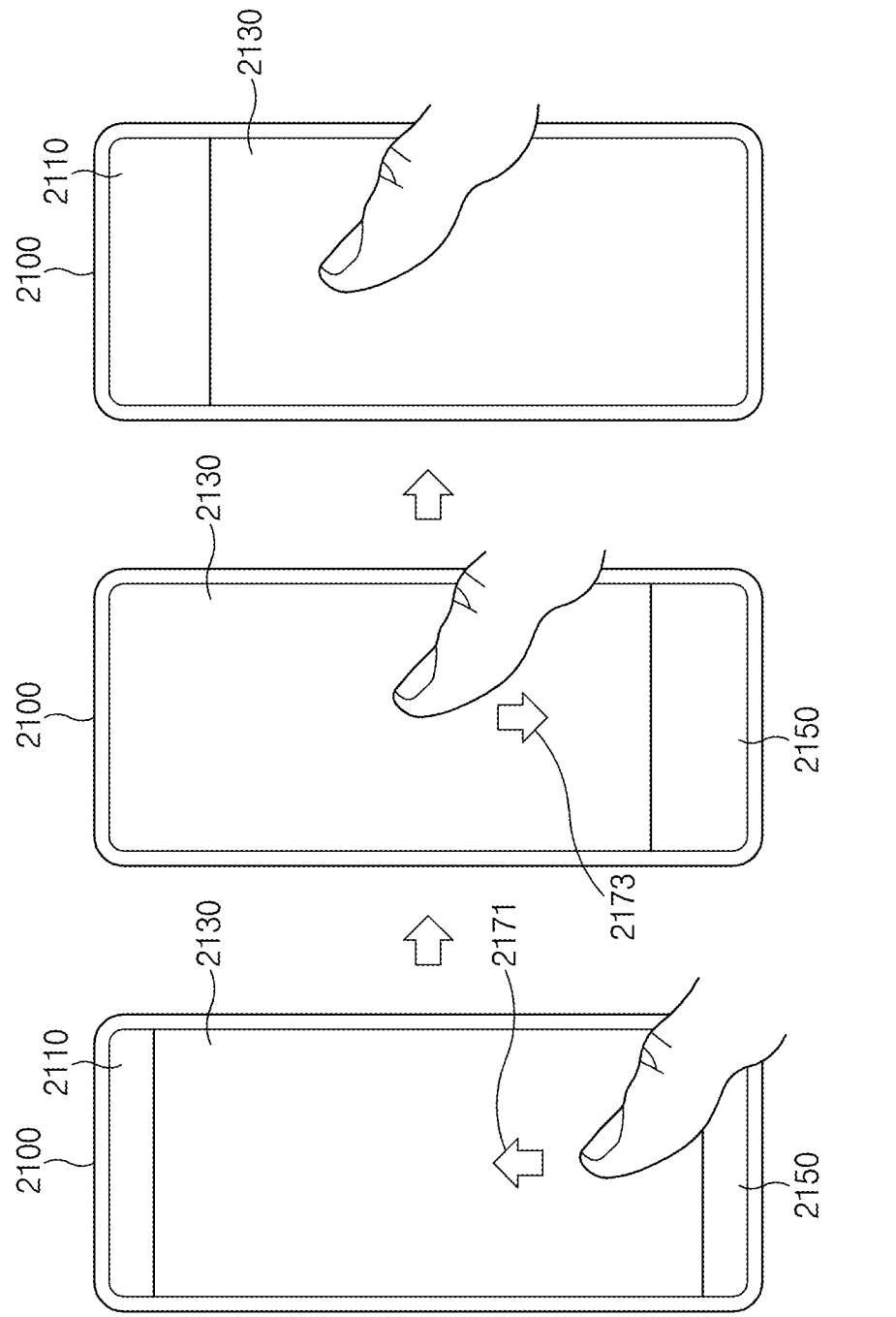
FIG. 21 is a view illustrating a method for splitting a screen, according to an embodiment.

FIG. 21 is a view illustrating a method for splitting a screen, according to an embodiment.

Referring to FIG. 21, according to an embodiment, an electronic device 2100 may split a display into a first screen region 2110, a second screen region 2130, and a third screen region 2150, as in a first state 2101. The first screen region 2110 may occupy the top end of the display, the second screen region 2130 may occupy the central region of the display, and the third screen region 2150 may occupy the bottom end of the display According to various embodiments, the electronic device 2100 may change the ratio of the split screen region of the display to correspond to a designated user input (e.g., a gesture input). For example, when an input 2171 causing the second screen region 2130 to slide in the upper direction of the display occurs as in the first state 2101, the electronic device 2100 may reduce the first screen region 2110 and may enlarge the third screen region 2150 as in the second state 2103. For another example, when an input 2173 causing the second screen region 2130 to slide in the lower direction of the display occurs as in the second state 2103, the electronic device 2100 may enlarge the first screen region 2110 and may reduce the third screen region 2150 as in the third state 2105. In the second state 2103 and third state 2105, as the inputs 2171 and 2173 to slide continuously occur to move the upper and lower edges of the second screen region 2130 to the upper and lower edges of the display, the first screen region 2110, and the third screen region 2150 are completely reduced and disappeared.

Figure 22A:
FIG. 22A is a view illustrating a notification provided using an object output on a screen, according to an embodiment.
Figure 22B:
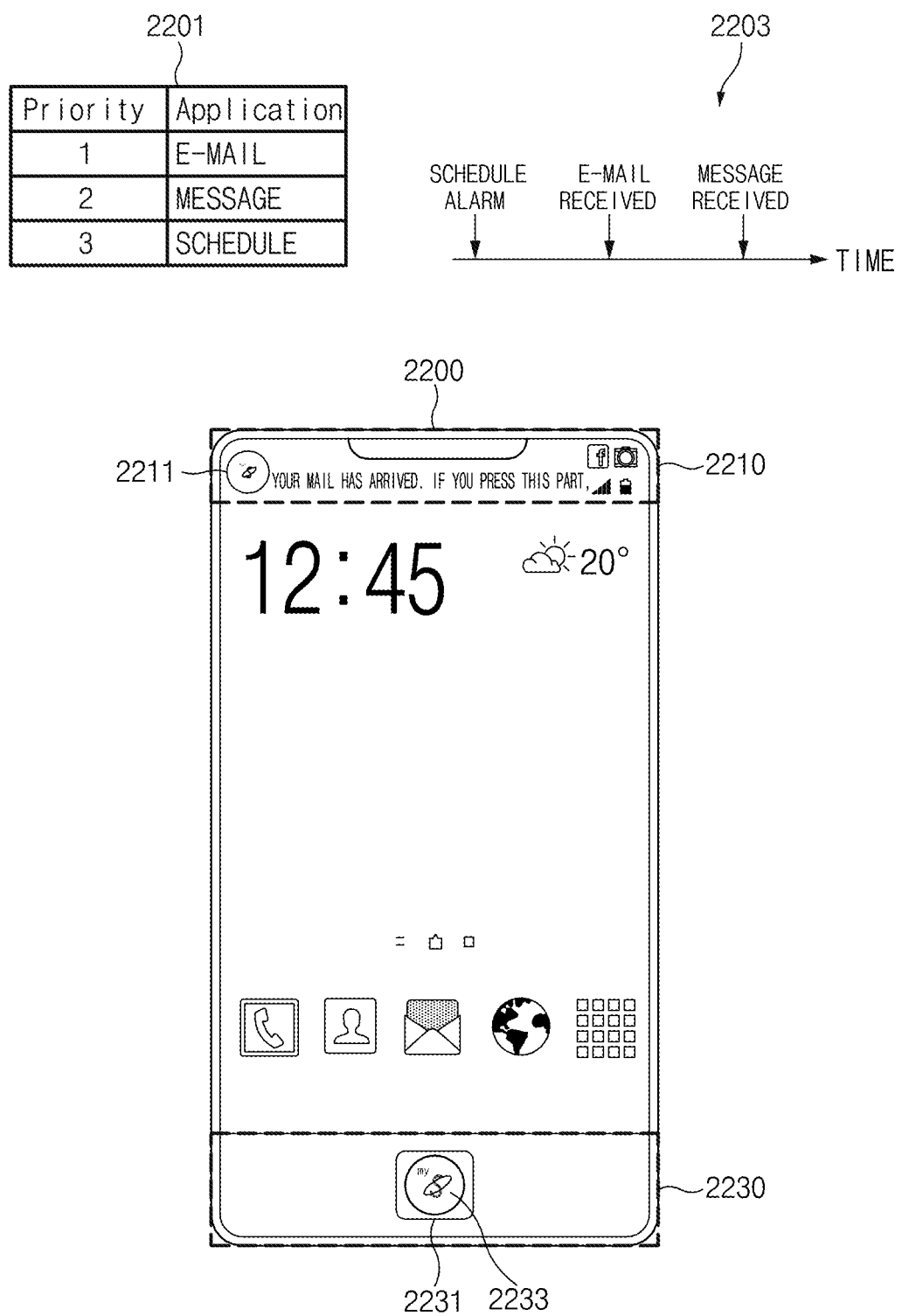
FIG. 22B is a view illustrating a plurality of notifications provided, according to an embodiment.
Figure 22C:
FIG. 22C is a view illustrating the shape of a notification object, according to an embodiment.
Figure 22D:
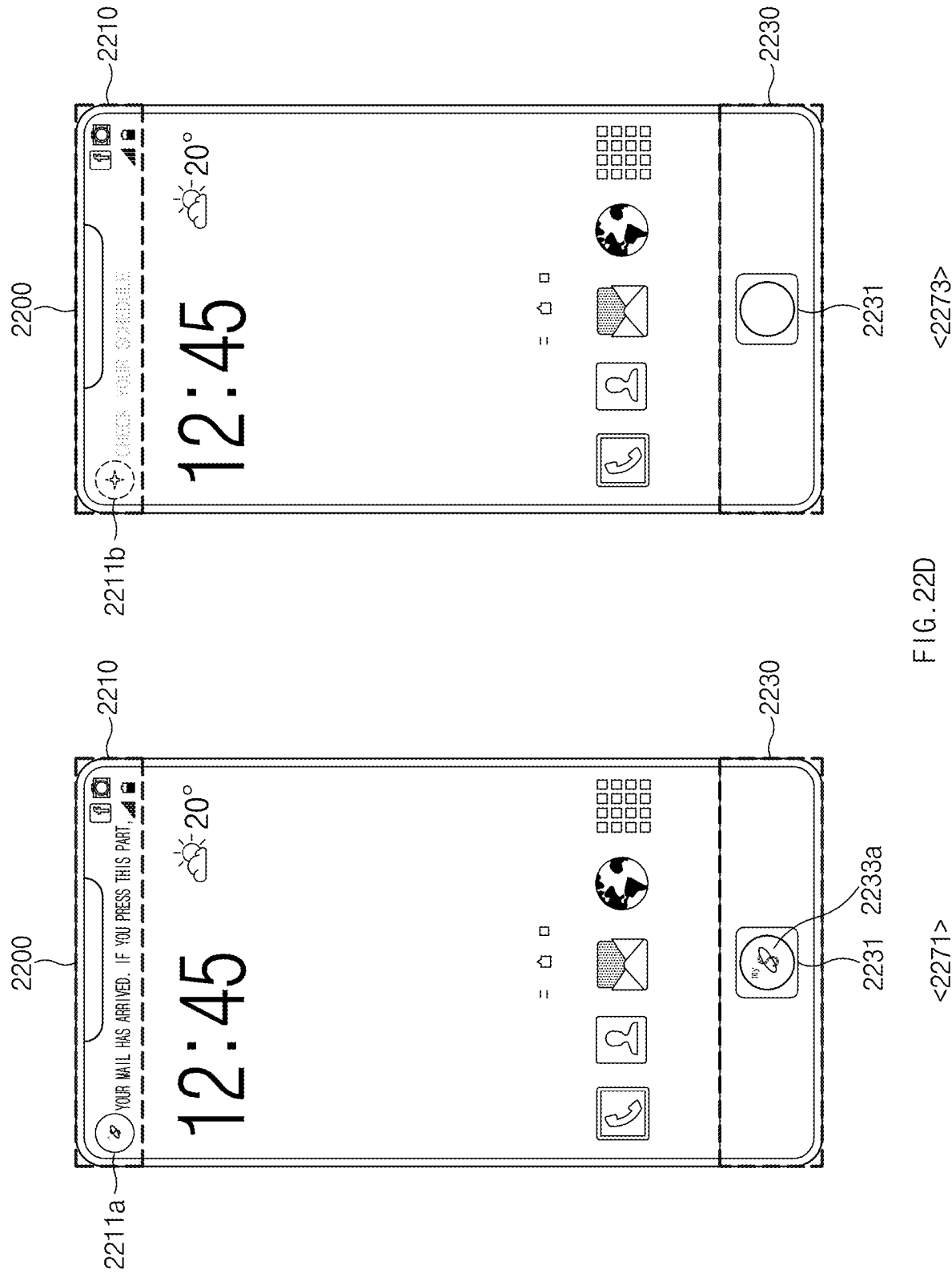
FIG. 22D is a view illustrating activation and deactivation of an output region of a notification object, according to an embodiment.
Figure 22E:
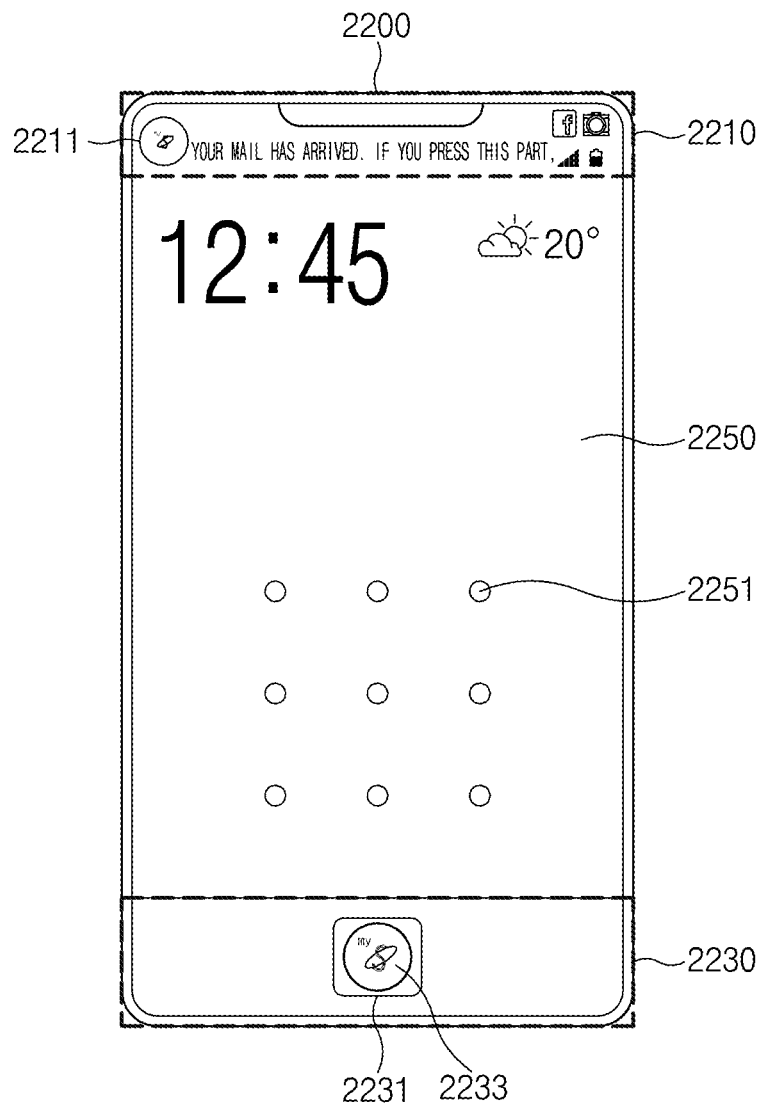
FIG. 22E is a view illustrating that a notification is provided in a lock screen, according to an embodiment.

FIG. 22A is a view illustrating a notification provided using an object output on a screen, according to an embodiment, FIG. 22B is a view illustrating a plurality of notifications provided, according to an embodiment, FIG. 22C is a view illustrating the shape of a notification object, according to an embodiment, FIG. 22D is a view illustrating activation and deactivation of an output region of a notification object, according to an embodiment, and FIG. 22E is a view illustrating that a notification is provided in a lock screen, according to an embodiment.

Referring to FIGS. 22A to 22E, an electronic device 2200 may output a notification object, which is used to provide the notification, to a top end 2210 of the display, in response to occurrence of the notification. The notification may include, for example, a system notification, a user setting notification, or a communication notification with an external electronic device. The system notification may be a notification occurring from a system (e.g., a processor) of the electronic device 2200 and may include a status notification of the electronic device 2200 (e.g., a communication connection state notification or a low battery state notification). The user setting notification may be a notification that occurs when a specified condition is satisfied based on information set by a user, and may include, for example, a schedule notification. The communication notification with the external electronic device is a notification occurring through communication with the external electronic device connected with the electronic device 2200 through wired/wireless communication. The notification includes a telephone reception notification, a message reception notification, an e-mail reception notification, or a data reception notification.

According to one embodiment, the electronic device 2200 may output the notification object to an indicator bar including state information (e.g., communication connection state information, current time information, or remaining battery level amount information, or the like) of the electronic device 2200. For another example, the electronic device 2200 may output, to the indicator bar, an execution icon 2211 for an application supporting output of detailed information of the notification object. For example, the execution icon 2211 supporting the execution of the application may be output to the indicator bar together with an image (or an icon) representing state information of the electronic device 2200. The drawing illustrates that, as a new e-mail is received, the electronic device 2200 outputs a text for informing the reception of the new e-mail and the execution icon 2211 for an e-mail application to the indicator bar, together with the status information image (or icon) of the electronic device 2200. Accordingly, when the execution icon 2211 for the e-mail application is selected, the electronic device 2200 may execute the e-mail application and may output an execution screen of the e-mail application for displaying detailed information of the received e-mail on a specific region (e.g., a central region) of the display.

According to various embodiments, the electronic device 2200 may change and output graphical properties (e.g., color, background color, edge thickness, brightness, or transparency) of an execution icon 2211 for an application that supports the output of detailed information of the notification object, thereby supporting the user to intuitively recognize the occurrence of the notification. For another example, the electronic device 2200 may output the execution icon 2211 for the application to the upper layer of the indicator bar. In other words, the electronic device 2200 may output a layer including the execution icon 2211 for the application above the layer including the indicator bar. Accordingly, even if a touch input to the indicator bar is not supported, or when there lacks a new additional space for a new display object (e.g., the notification object and the execution icon 2211 for the application) as the number of display objects (e.g., images or icons) is increased, it is possible to support the output of the execution icon 2211 for the application and the touch input to the execution icon 2211 for the application.

According to various embodiments, the electronic device 2200 may output an execution icon 2233 for an application, which supports the output of detailed information of the notification object in response to the occurrence of the notification, to a bottom end 2230 of the display. For example, the electronic device 2200 may output the execution icon 2233 for the application to a region for a specified soft key 2231 (e.g., a home key) occupying a portion of the bottom end 2230 of the display. Alternatively, the electronic device 2200 may replace the image of the specified soft key 2231 with the execution icon 2233 for the application to be output. Accordingly, a user may select the execution icon 2233 for the application by selecting the soft key 2231 output in the bottom end of the display. For example, the user may select the execution icon 2233 for the application by his or her gripped hand while holding the electronic device 2200 with one hand, thereby enhancing the convenience. The electronic device 2200 performs the above-described function to perform a specified function of the soft key 2231 in response to a user input for selecting the soft key 2231 before the notification occurs, and to execute an application for supporting the output of the detailed information of the notification object in response to the user input for selecting the soft key 2231 after the notification occurs.

According to various embodiments, the electronic device 2200 may output, to the display, at least one notification object for providing a plurality of notifications in response to the occurrence of the notifications. According to one embodiment, the electronic device 2200 may sequentially output notification objects corresponding to the respective notifications to the display according to the priorities of the notifications. Referring to FIG. 22B, the electronic device 2200 may determine the priority of the notification through priority information 2201. For example, even if a first notification (e.g., a schedule alarm), a second notification (e.g., receiving of an e-mail), and a third notification (e.g., receiving of an e-mail) sequentially occur according to times 2203 that the notifications occur, the electronic device 2200 may output only the second notification, which has the highest priority, to the indicator bar according to the priorities of the notifications. Alternatively, the electronic device 2200 may sequentially output the second notification, the third notification, and the first notification from the left region to the right region of the indicator bar, according to the priorities for the notifications. For another example, the electronic device 2200 may analyze the type of notification, and may sequentially output notification objects corresponding to notifications from the left region to the right region of the indicator bar, based on the frequency that each type of notification occurs or the last occurrence time of the notification. The electronic device 2200 may preferentially output the notification of the most recently occurring notification or a notification having higher priority based on information of the user, to the left region of the indicator bar. Alternatively, the electronic device 2200 may output only a notification that the user wants to receive based on the setting information of the user. For example, the electronic device 2200 may output the execution icon 2233 for an application, which supports output of a notification having the higher priority based on the setting information of the user, to the region the specified soft key 2231. Alternatively, the electronic device 2200 may replace the image of the specified soft key 2231 with the execution icon 2233 for the application to be output.

According to various embodiments, the electronic device 2200 may output an object (e.g., the execution icon 2211 for the application), which corresponds to the notification, among the display objects output to the indicator bar, larger than an object corresponding to the state information of the electronic device 2200, as illustrated in FIG. 22C. The electronic device 2200 may display the execution icon 2211 for the application corresponding to the notification, larger than a first state icon 2213, a second state icon 2215, a third state icon 2217, and a fourth state icon 2219 corresponding to the state information of the electronic device 2200. In addition, the electronic device 2200 may apply an animation effect to the object corresponding to the notification (e.g., the execution icon 2211 for the application) or may differently output the background image, the background color, the boundary shape, or the boundary color of the object, such that a user may more easily recognize the occurrence of the notification. According to various embodiments, the electronic device 2200 may align and output some of the display objects output to the indicator bar, in a plurality of lines. For example, the electronic device 2200 may align and output objects (e.g., the first state icon 2213, the second state icon 2215, the third state icon 2217, and the fourth state icon 2219) which correspond to the state information of the electronic device 2200, among the display objects in two lines at the right region of the indicator bar. In this case, the electronic device 2200 may equally divide the right region of the indicator bar by the number of corresponding objects, output the objects one by one to the divided regions, and arrange the objects such that the objects are horizontally arranged.

According to various embodiments, the electronic device 2200 may receive a user input for the object corresponding to the notification in various manners. For example, the electronic device 2200 may receive a touch input, a double tap input, a force touch input (e.g., a touch input to apply a pressure having a specified intensity or more), a gesture input, a swipe input, or the like. Alternatively, the electronic device 2200 may differently handle a user input for the object based on the screen output state of the display (e.g., screen on/off state), whether an execution screen of the application has been output to the central region of the display, or the type of the application.

According to various embodiments, the electronic device 2200 may activate or deactivate a region that the execution icon 2211 for the application is output, based on the type of an application for supporting the output of the notification. In addition, the electronic device 2200 may activate or deactivate the region that the execution icon 2211 for the application is output, based on a functional state, such as an always on display (AOD) state, a lock state, a home screen state, or an in-app state, of the electronic device 2200. For example, as illustrated in FIG. 22D, the electronic device 2200 activates a region that an execution icon 2211*a* for an e-mail application is output in a first state 2271 that a new e-mail is received, and deactivate the region that an execution icon 2211*b* of a schedule application is output, in a second state 2273 that a schedule alarm occurs. In this case, the electronic device 2200 may support the user to select the execution icon 2211*a* for the e-mail application in the first state 2271, and may support the user not to select the execution icon 2211*b* of the schedule application in the second state 2273. The electronic device 2200 also activates the region that the execution icon 2211*a* for the e-mail application is output as in the first state 2271 and replaces the image of the specified soft key 2231 with an icon 2233*a*. However, the electronic device 2200 may not replace the image of the specified soft key 2231 with the execution icon 2211*b* of the schedule application set to be deactivated, as in the second state 2273.

According to various embodiments, the electronic device 2200 may output a notification object corresponding to the occurrence of a notification to the display even if the functional state of the electronic device 2200 is a lock state. For example, as illustrated in FIG. 22E, when a fingerprint recognition key 2231 is output as a soft key in the bottom end of a lock screen 2250, the electronic device 2200 may output an execution icon 2233 for application which supports the output of the detailed information of the notification object to the region for the fingerprint recognition key 2231. Alternatively, the electronic device 2200 may replace the image of the fingerprint recognition key 2231 with the execution icon 2233 for the application to be output. According to an embodiments, when a notification occurs in the state that a pattern input object 2251 is output at the central region of the lock screen 2250, the electronic device 2200 may output the notification object in response to the occurrence of the notification to the indicator bar when the notification occurs.

Figure 23:
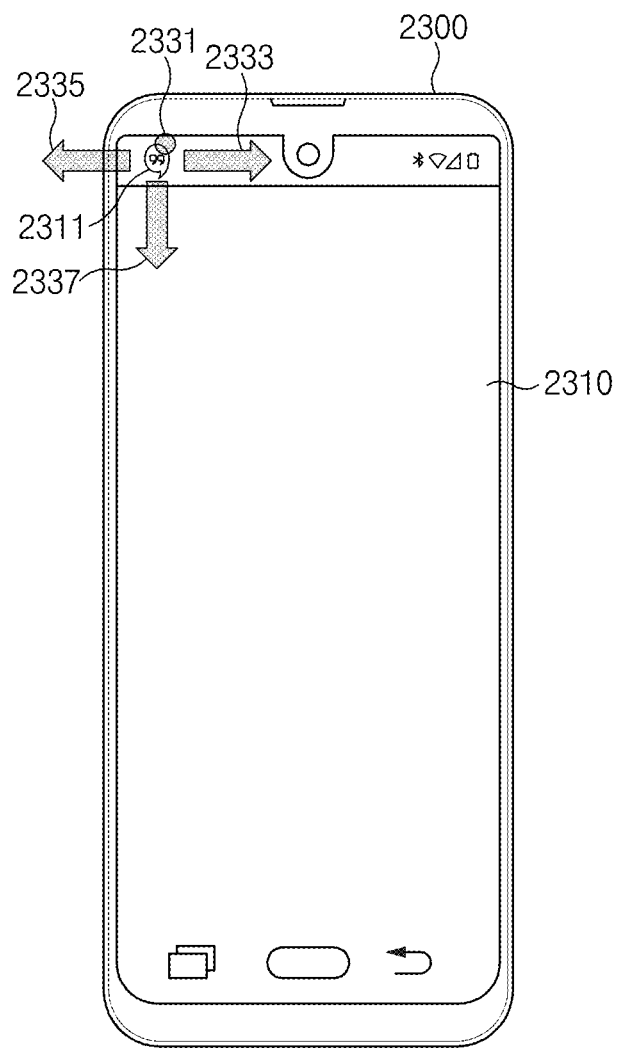
FIG. 23 is a view illustrating notification processing using an object output on a screen, according to an embodiment.

FIG. 23 is a view illustrating notification processing using an object output on a screen, according to an embodiment.

Referring to FIG. 23, according to an embodiment, an electronic device 2300 may output an execution icon 2311 for an application, which supports the output of the detailed information of a notification object for providing the notification to the top end (e.g., the indicator bar) of a display 2310 in response of the occurrence of the notification. The electronic device 2300 may perform a specified function for the notification when a specified user input for the execution icon 2311 for the application occurs.

According to one embodiment, when an input 2331 for selecting an execution icon 2311 for an application occurs, the electronic device 2300 may execute an application for supporting the output of detailed information of the notification object and may output an execution screen of the application including the detailed information of the notification object to a specific region (e.g., a central region) of the display 2310. In this case, the electronic device 2300 may terminate the output of the execution icon 2311 for the application.

According to one embodiment, when an input 2333 of swiping the execution icon 2311 for the application to the right occurs, the electronic device 2300 may terminate the output of the execution icon 2311 for the application and may provide the notification again when the confirmation of the notification is not completed for a specific time of period. In other words, after the output of the execution icon 2311 for the application is terminated, the electronic device 2300 may output the execution icon 2311 for the application again when the user does not confirm the notification for a specific time of period.

According to one embodiment, when an input 2335 of swiping the execution icon 2311 for the application to the left occurs, the electronic device 2300 terminates the output of the execution icon 2311 for the application. In this case, the electronic device 2300 may not provide the notification again, even if the confirmation of the notification is not completed for a specific time of period.

According to one embodiment, when an input 2337 for swiping the execution icon 2311 for the application downward occurs, the electronic device 2300 may output a display object (e.g., the pop-up object) including at least a portion of the detailed information of the notification object to a specific region (e.g., a central region) of the display 2310. For example, the electronic device 2300 may set the transparency of the pop-up object and may output the pop-up object to the specific region of the display 2310 such that the pop-up object is blurred. For another example, the electronic device 2300 may include an input field in the pop-up object to make a response to the notification. In other words, when a new e-mail is received, the electronic device 2300 may output the pop-up object including a text input field such that a text input in the pop-up object is possible.

Figure 24:
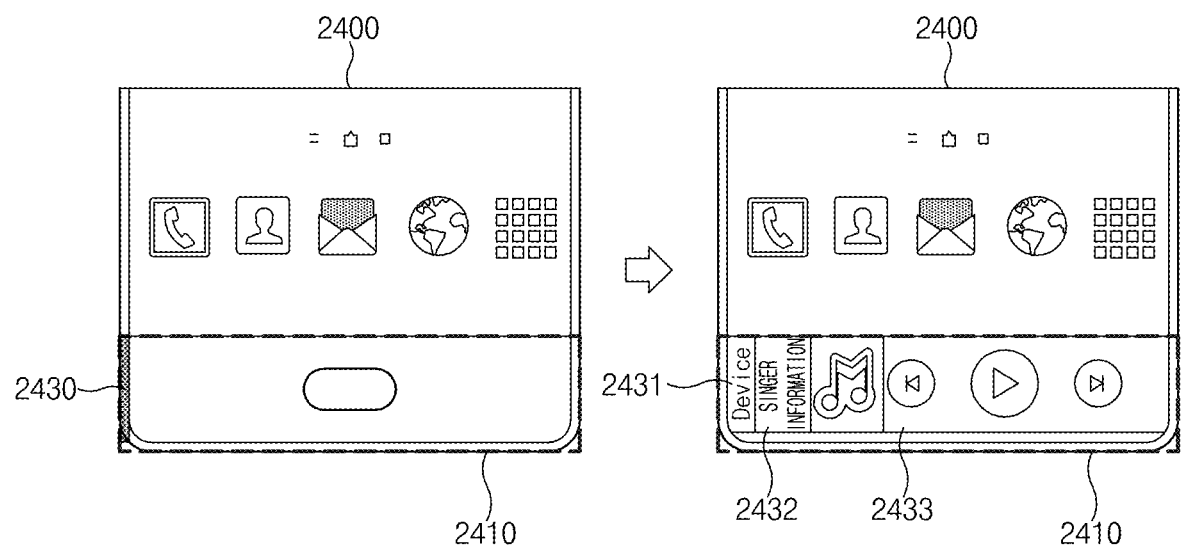
FIG. 24 is a view illustrating another form of providing a notification by using a soft key, according to an embodiment.

FIG. 24 is a view illustrating another form of providing a notification by using a soft key, according to an embodiment.

Referring to FIG. 24, according to an embodiment, an electronic device 2400 may support the irradiation of light to a bottom end 2410 of a display in response to the occurrence of the notification. The left part of the drawing illustrates that light is irradiated through a light emitting device 2430 disposed under a left edge of the bottom end 2410 of the display, in response to the notification. According to various embodiments, the electronic device 2400 may control the light emitting device 2430 to irradiate light in different color based on the number of notifications which occur.

According to one embodiment, when there occurs an input of selecting the region for the light emitting device 2430 in the bottom end 2410 of the display, the electronic device 2400 may output a notification object (e.g., a soft key) for providing the notification to the bottom end 2410 of the display. For another example, when a plurality of notifications occurs, the electronic device 2400 may sequentially output the identification information (e.g., index) of notification objects corresponding to the notifications, and may output the detailed information of the notification object corresponding to the notification which is lastly received. The right part of the drawing illustrates that the electronic device 2400 outputs identification information of a first notification object 2431, identification information of a second notification object 2432, identification information of a third notification object 2433, and the detailed information of the notification object 2433 to the bottom end 2410 of the display. For one example, the first notification object 2431 includes state change information of the electronic device 2400, the second notification object 2432 includes information of a singer of a song currently reproduced, and the third notification object 2433 may include control function information of the song currently reproduced.

Figure 25:
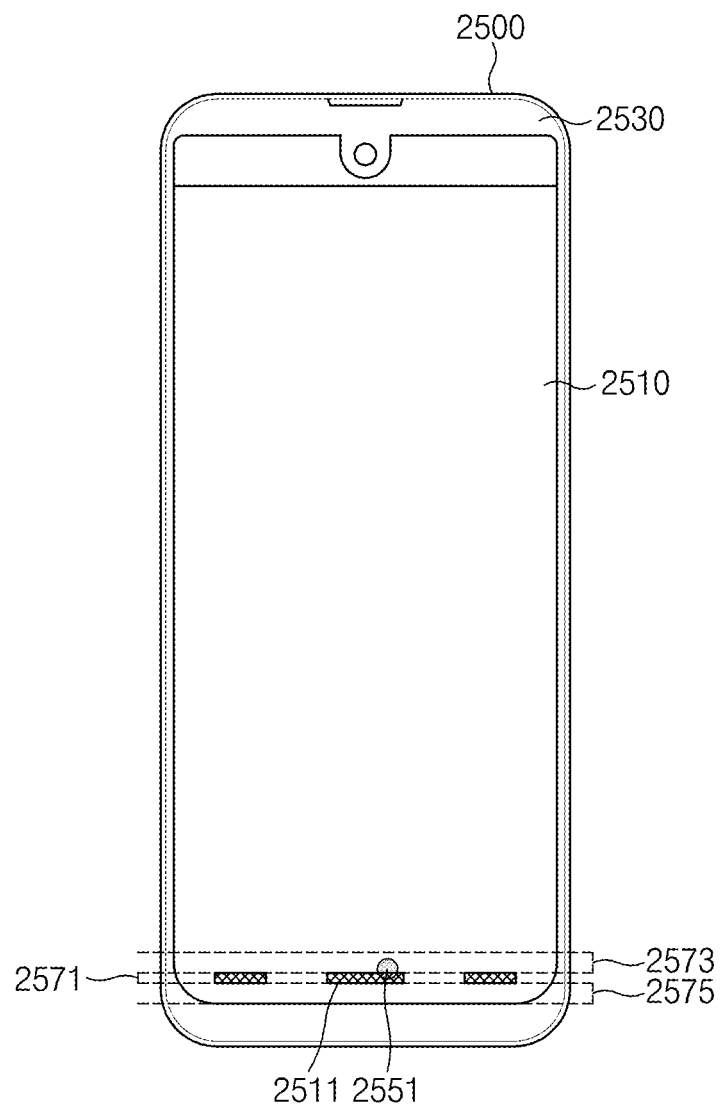
FIG. 25 is a view illustrating a user input region for a soft key, according to an embodiment.

FIG. 25 is a view for explaining a user input region for a soft key, according to an embodiment.

Referring to FIG. 25, according to an embodiment, an electronic device 2500 may include a display 2510, and a bezel region 2530 provided to surround the display 2510. The bezel region 2530 may form a part of the housing. The bezel region 2530 may be provided, for example, in the upper layer of the inactive region when referring to the above-described drawings.

According to one embodiment, the electronic device 2500 may output a soft key 2511 to a portion of an edge region of the display 2510. The drawing illustrates a state in which the electronic device 2500 outputs the soft key 2511 to the bottom end of a display 2510. The electronic device 2500 may perform at least one function included in the electronic device 2500 when a user input to the soft key 2511 occurs.

According to various embodiments, when outputting the soft key 2511 set to perform a specific function to the display 2510, the electronic device 2500 may output the soft key 2511 in smaller size such that the display of another display object output to the display 2510 is not restricted. Accordingly, an input 2551 for selecting the soft key 2511 may be out of the output region of the soft key 2511. When the user input 2551 is out of the output region of the soft key 2511, the electronic device 2500 may erroneously recognize the user input 2551 for the soft key 2511 as a touch input for a display object output to a region adjacent to an output region of the soft key 2511. To prevent this, the electronic device 2500 may set an output region of the soft key 2511 and a region adjacent to the output region of the soft key 2511 as a user input region for the soft key 2511.

For example, the electronic device 2500 may set the user input region to have the width wider than a width 2571 of a region for the soft key 2511. For example, the electronic device 2500 may set top and bottom ends of the user input region to be increased by a first width 2573 and a second width 2575 from a width 2571 of the soft key 2511. However, the user input region is not limited thereto. Although the drawing illustrates only the width of the user input region, the length of the user input region may be set to be longer than the length of the region for the soft key 2511.

Figure 26:
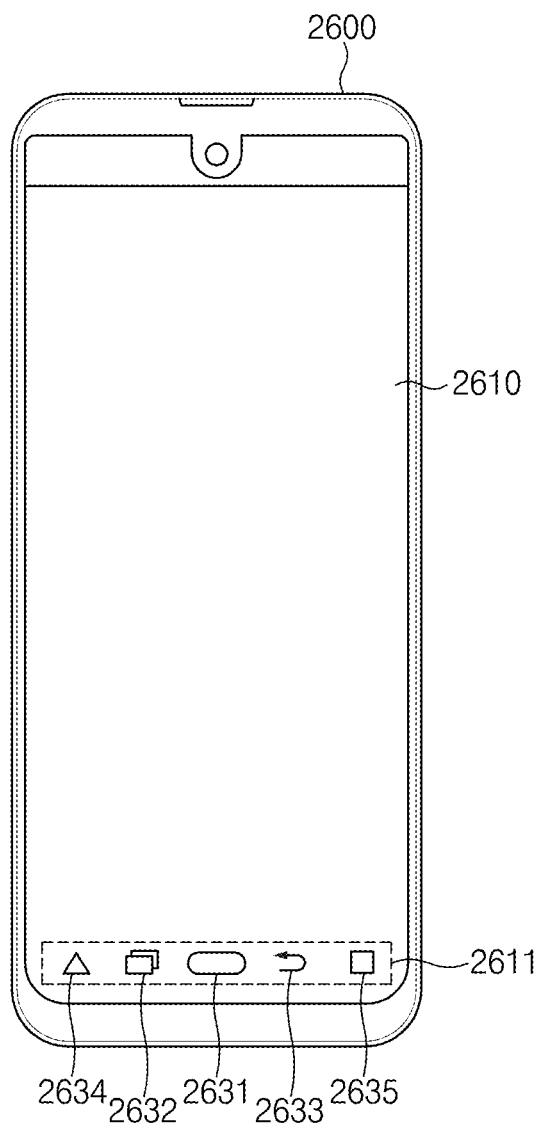
FIG. 26 is a view illustrating the addition of the soft key, according to an embodiment.

FIG. 26 is a view illustrating the addition of the soft key, according to an embodiment.

Referring to FIG. 26, according to an embodiment, an electronic device 2600 may output a soft key to a bottom end 2611 of a display 2610. For example, the electronic device 2600 outputs a home key 2631 to the center of the bottom end 2611 of the display 2610, outputs a menu key 2632 to the left side of the home key 2631, and outputs a cancellation key 2633 to the right side of the home key 2631.

According to various embodiments, the electronic device 2600 may further output an additional soft key to the bottom end 2611 of the display 2610, in response to user setting or the occurrence of a notification. For example, the electronic device 2600 may output a first additional soft key 2634 to the left side of the menu key 2632 and a second additional soft key 2635 to the right side of the cancellation key 2633. According to one embodiment, the electronic device 2600 may rearrange soft keys previously output to the bottom end 2611 of the display 2610, when outputting the additional soft keys. In other words, electronic device 2600 may reduce the spacing of the previously output soft keys to provide an output space for the additional soft key. For another example, the output of the additional soft key may be terminated by user setting or upon the confirmation of the notification. In this case, the electronic device 2600 may recover the interval of the previously output soft keys.

Figure 27:
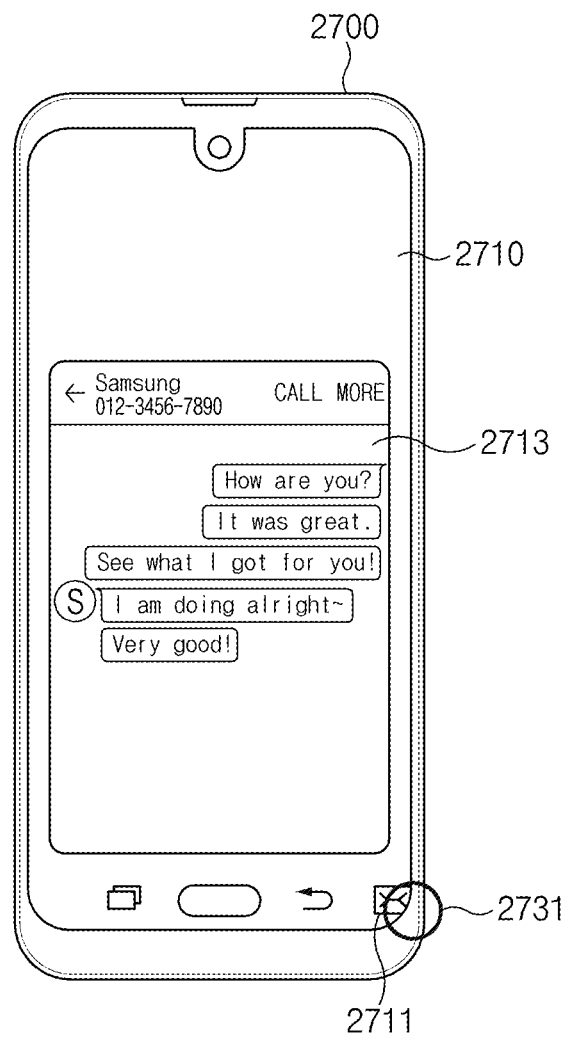
FIG. 27 is a view for explaining a method for confirming the execution state of an application using a soft key, according to an embodiment.

FIG. 27 is a view for explaining a method for confirming the execution state of an application using a soft key, according to an embodiment.

Referring to FIG. 27, according to an embodiment, an electronic device 2700 may output a soft key 2711 to a bottom end of a display 2710. For example, the electronic device 2700 may output an execution icon of an application specified to the soft key 2711. According to various embodiments, the electronic device 2700 may output the soft key 2711 to the bottom end of the display 2710, by the user setting or in response to the occurrence of the notification.

The drawing shows a state in which an execution icon of an application (e.g., a message application) frequently used by the electronic device 2700 is output to the right region of the bottom end of the display 2710 with the soft key 2711.

According to one embodiment, when an input 2731 for selecting the soft key 2711 occurs, the electronic device 2700 may determine the execution state of an application corresponding to the soft key 2711. When the application is not executed, the electronic device 2700 may execute the application and may output an execution screen 2713 of the application to a specific region (e.g., the central region) of the display 2710. Alternatively, when application is executed and activated (executed in foreground), the electronic device 2700 may ignore the user input 2731. Alternatively, when the application is executed and deactivated (executed in background), the electronic device 2700 may output the execution screen 2713 for the application for a specified time of period. According to an embodiment, the electronic device 2700 may output the execution screen 2713 for the application differently, depending on the intensity or the duration of the user input 2731. For example, the electronic device 2700 may activate the application when the duration of the user input 2731 exceeds a specified time of period (e.g., a long press input), and may output the execute screen 2713 for the application to a specific region of the display 2710. In this regard, the execution screen 2713 for the application may be an execution screen running in real time, instead of a screen obtained by capturing the last execution screen for the application or a preview screen.

Figure 28:
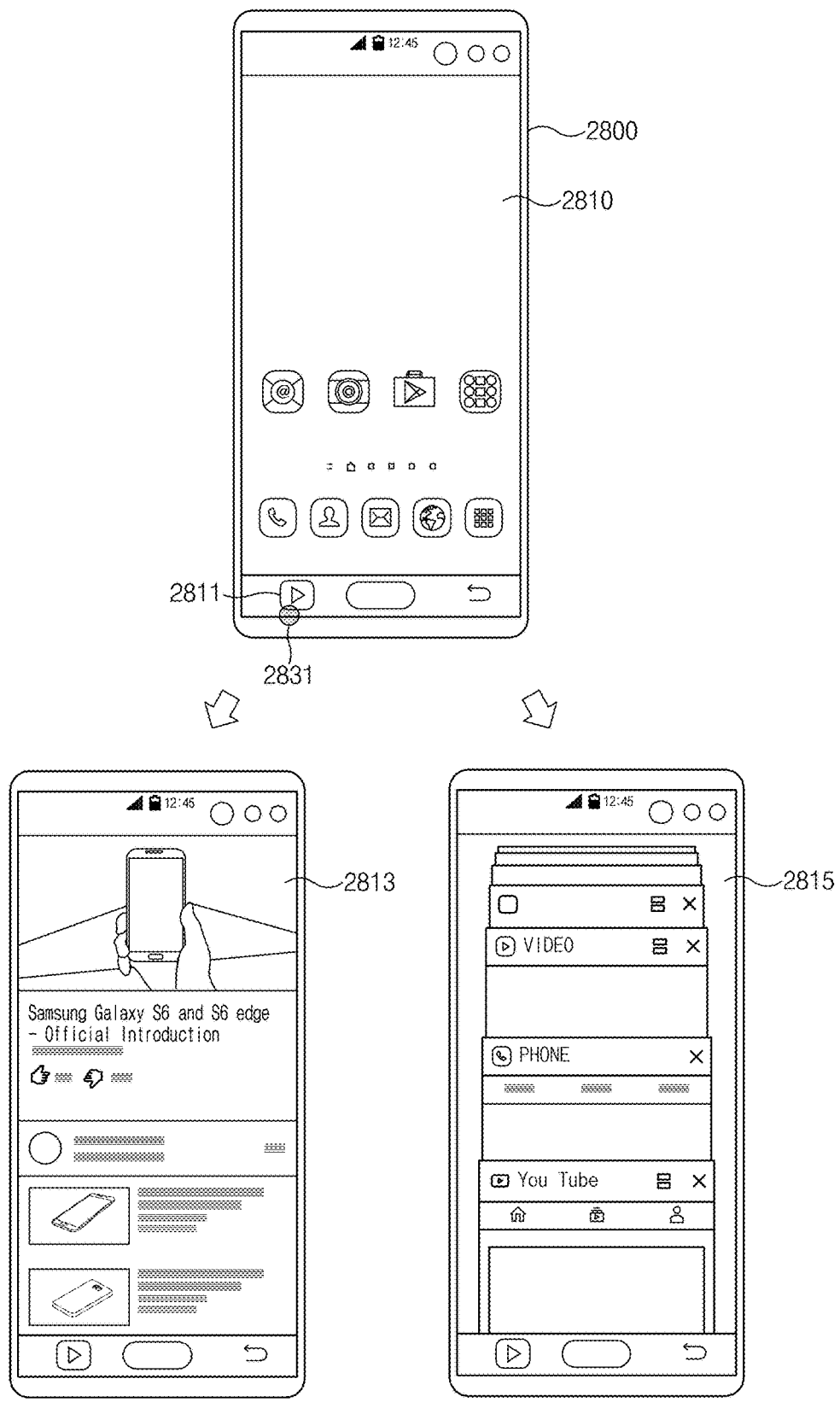
FIG. 28 is a view illustrating the execution of an application using a soft key, according to an embodiment.

FIG. 28 is a view illustrating execution of an application using a soft key, according to an embodiment.

Referring to FIG. 28, according to an embodiment, an electronic device 2800 may output a soft key 2811 to a bottom end of a display 2810. According to one embodiment, the electronic device 2800 may output the soft key 2811 in the bottom end of the display 2810 to support the rapid execution of a specified application.

According to various embodiments, the electronic device 2800 may execute an application corresponding to the soft key 2811 when a user input 2831 specified for the soft key 2811 occurs. For example, the electronic device 2800 may output an execution screen 2813 of the specified application to the display 2810 when the duration of the user input 2831 for selecting the soft key 2811 is equal to or less than a specific time (when a short press is input). In this case, the electronic device 2800 may execute the specified application when the specified application is not executed.

For another example, the electronic device 2800 may output the list 2815 of executable applications included in the electronic device 2800 to the display 2810 when the duration of the user input 2831 for selecting the soft key 2811 exceeds a specified time (e.g., when a long press is input). The electronic device 2800 may execute the selected application and output the execution screen of the executed application to the display 2810 when any one of the list 2815 of executable applications output on the display 2810 is selected.

Figure 29:
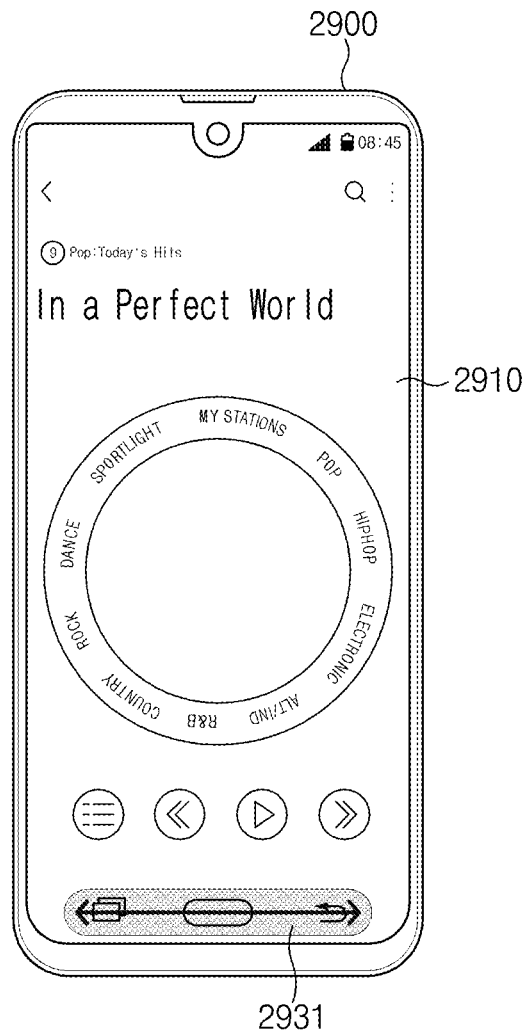
FIG. 29 is a view illustrating a gesture input to a soft key region, according to an embodiment.

FIG. 29 is a view illustrating a gesture input to a soft key region, according to an embodiment.

Referring to FIG. 29, according to an embodiment, an electronic device 2900 may process a user input specified for the bottom end of a display 2910. According to one embodiment, when a gesture input 2931 specified in the soft key region output in the bottom end of the display 2910 is generated, the electronic device 2900 may output an execution screen of any one application of the applications included in the electronic device 2900 to the display 2910.

For example, the electronic device 2900 may output an execution screen of the previously executed application when an input for swiping to the left in the soft key region occurs. For another example, the electronic device 2900 may output an execution screen of an application, which is earliest terminated, when an input for swiping to the right in the soft key region occurs.

Figure 30:
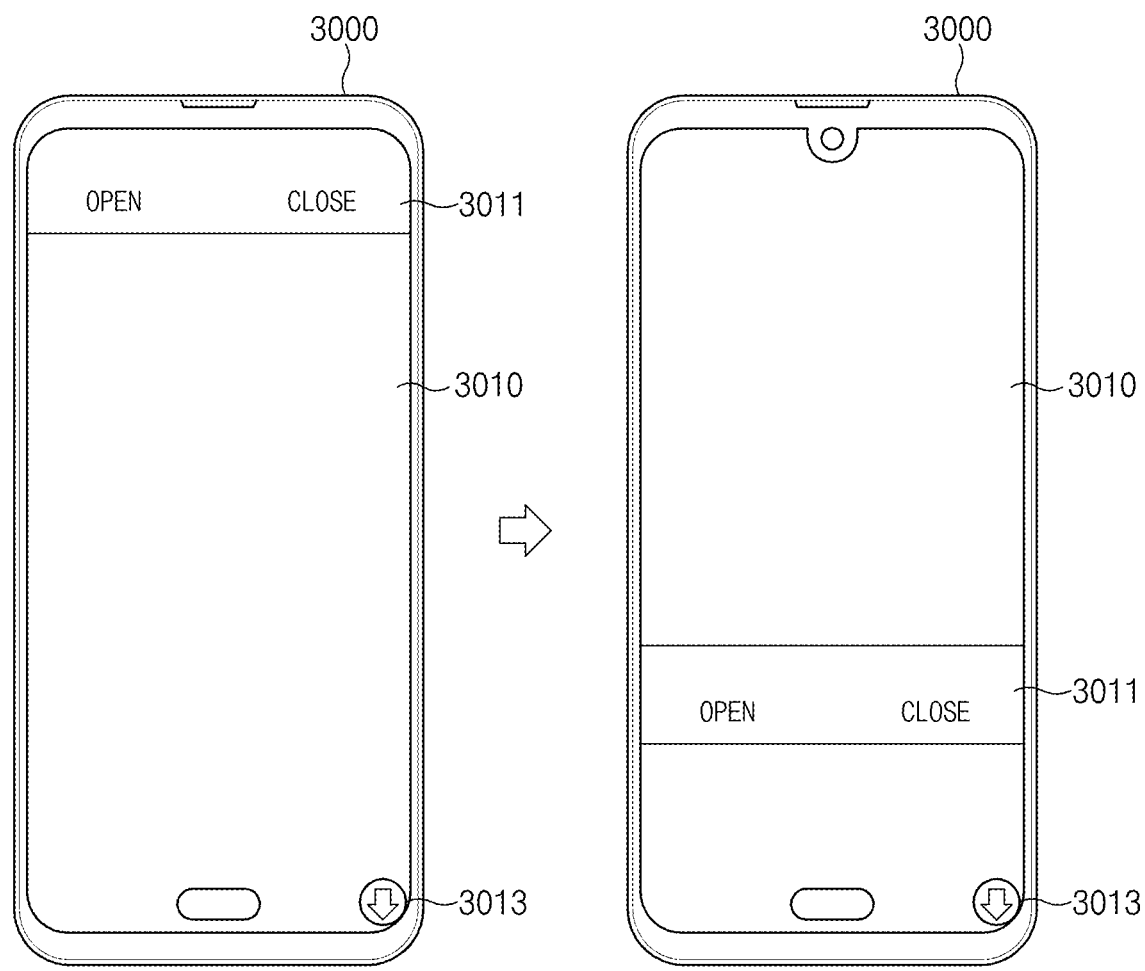
FIG. 30 is a view illustrating movement of an application object using a soft key, according to an embodiment.

FIG. 30 is a view illustrating the movement of an application object using a soft key, according to an embodiment.

Referring to FIG. 30, according to an embodiment, an electronic device 3000 may output a notification object 3011 (e.g., a pop-up object) to a top end (e.g., an indicator bar) of a display 3010, in response to the occurrence of the notification. According to an embodiment, the notification object 3011 may include a confirmation button for supporting a user to confirm the content of the notification, and an end button for supporting the user to terminate the notification object 3011.

According to an embodiment, the electronic device 3000 may output a soft key 3013 to a bottom end of the display 3010 to adjust the position of the notification object 3011. For example, when the soft key 3013 is selected, the electronic device 3000 may move the notification object 3011, which is output to the top end of the display 3010, to the bottom end of the display 3010 and may output the notification object 3011. Accordingly, the user may easily handle the electronic device 3000 with one hand. For example, when the notification object 3011 is output to the top end of the display 3010, it may be difficult for a user to select the confirmation button or the end button with a hand gripping the electronic device 3000 in the state that the user grips the electronic device 3000 with the hand. However, when the user selects the soft key 3013 output to the bottom end of the display 3010, since the notification object 3011 moves to the bottom end of the display 3010, the user may easily select the confirmation button or the end button included in the notification object 3011.

Figure 31:
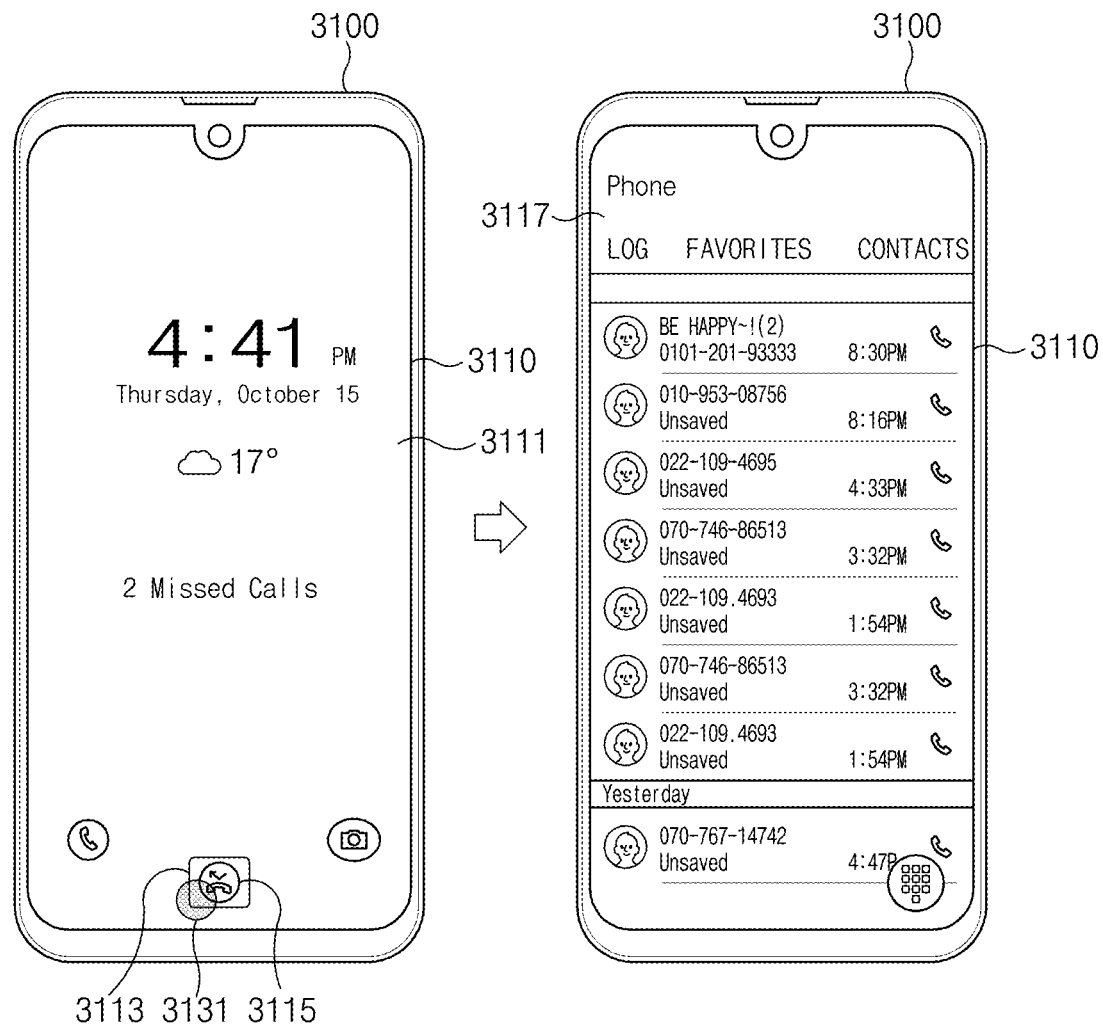
FIG. 31 is a view illustrating the execution of an application using a soft key in a lock screen, according to an embodiment.

FIG. 31 is a view illustrating the execution of an application using a soft key in a lock screen, according to an embodiment.

Referring to FIG. 31, according to an embodiment, an electronic device 3100 may output a lock screen 3111 to a display 3110. According to one embodiment, when the notification occurs in the state that the lock screen 3111 is output, the electronic device 3100 may output an execution icon 3115 for an application for supporting the output of the detailed information for providing the notification to a specified soft key 3113 included in the lock screen 3111. The drawing illustrates the state that the execution icon 3115 for the application is output to the soft key 3113 output at the center of the bottom end of the lock screen 3111.

According to an embodiment, the electronic device 3100 may terminate the output of the lock screen 3111 in response to the selection of the soft key 3113 and output an execution screen 3117 of the application to the display 3110. According to various embodiments, the electronic device 3100 may first determine if unlocking is possible when the soft key 3113 is selected (3131).

The electronic device 3100 may maintain the output of the lock screen 3111 corresponding to the selection (3131) of the soft key 3113 when the unlocking is difficult (e.g., when it is determined that a user is not authenticated).

Figure 32:
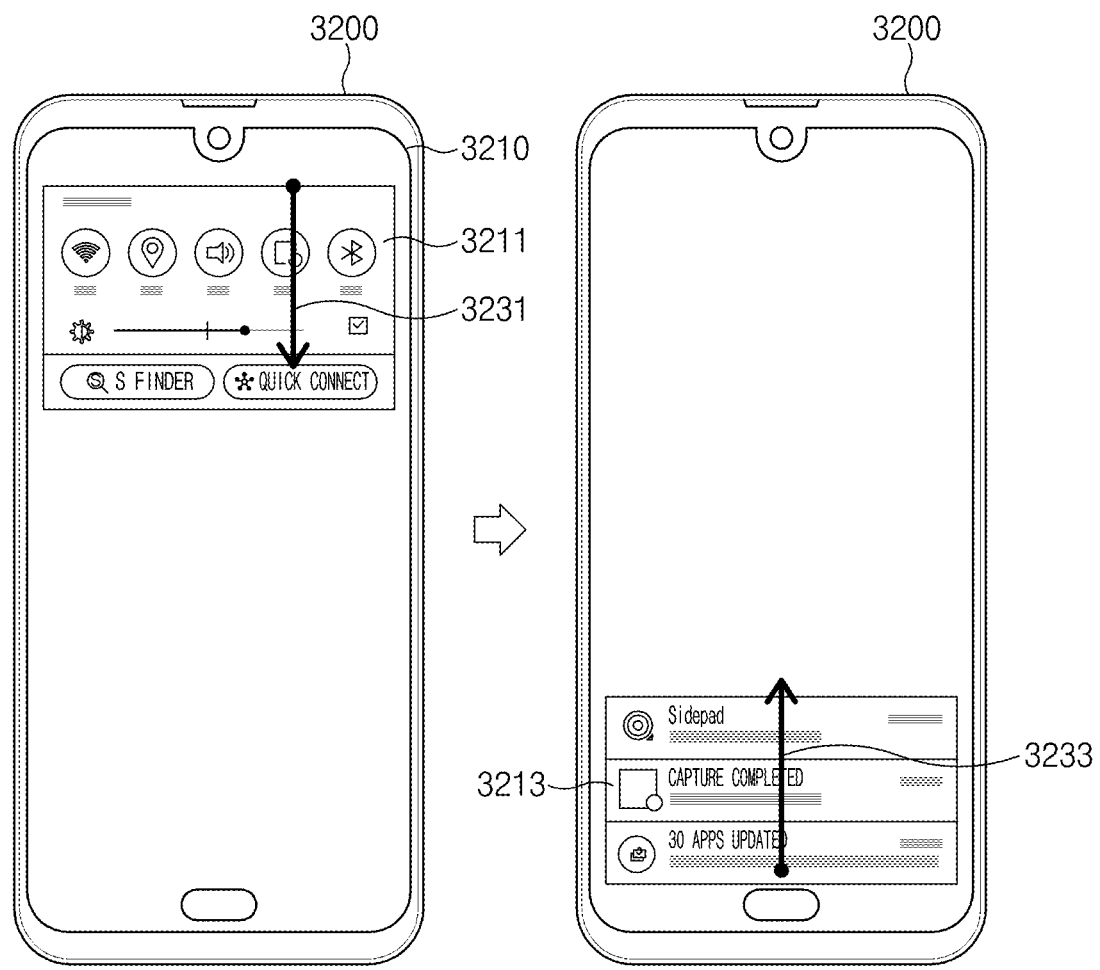
FIG. 32 is a view illustrating a gesture input to an object output region, according to an embodiment.

FIG. 32 is a view illustrating a gesture input to an object output region, according to an embodiment.

Referring to FIG. 32, according to an embodiment, an electronic device 3200 may process a user input (e.g., gesture input) specified for an object output region output to a display 3210. According to one embodiment, the electronic device 3200 may output a display object 3211 (e.g., a quick panel) supporting the change of the state or the setting of the electronic device 3200 to the top end of the display 3210 when the specified gesture input occurs in an indicator bar region output to the top end of the display 3210

According to one embodiment, the electronic device 3200 may output a list 3213 of at least one notification object for providing at least one notification to a bottom end of the display 3210 when the specified gesture input 3233 occurs in the soft key region output to the bottom end of the display 3210.

Figure 33:
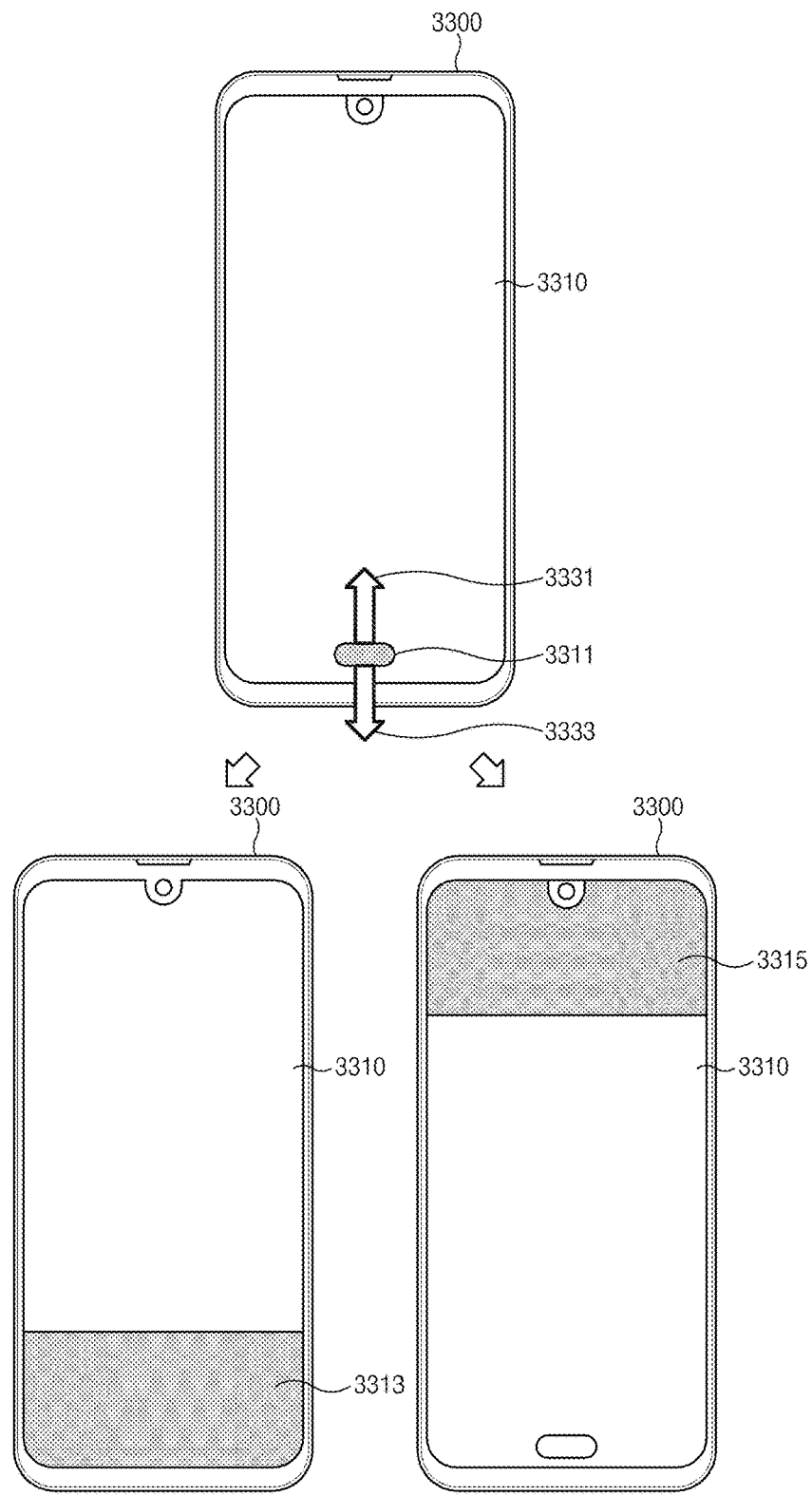
FIG. 33 is a view illustrating another gesture input to a soft key region, according to an embodiment.

FIG. 33 is a view illustrating another gesture input to a soft key region, according to an embodiment.

Referring to FIG. 33, according to an embodiment, an electronic device 3300 may output an execution icon for an application which supports the output of the detailed information of a notification object for providing the notification to a soft key 3311 output in the bottom end of a display 3310, in response to the occurrence of the notification. Accordingly, the electronic device 3300 may execute the application corresponding to the selection of the soft key 3311, and output the execution screen of the executed application to the display 3310.

According to various embodiments, the electronic device 3300 may process a user input (e.g., a gesture input) specified for the region for the soft key 3311 output to the bottom end of the display 3310. According to one embodiment, when an input 3331 for swiping in the upper direction of the display 3310 in the region of the soft key 3311, the electronic device 3300 may create a first additional screen region 3313 in the bottom end of the display 3310. The first additional screen region 3313 may be overlaid with the bottom end of the display 3310 or the screen region of the display 3310 may be moved upward by the output part of the first additional screen region 3313. When the screen region of the display 3310 is shifted upward and output, a portion of the top end of the screen region of the display 3310 may not be output, or the screen region of the display 3310 may be reduced proportionally.

According to one embodiment, when an input 3333 for swiping in the lower direction of the display 3310 in the region of the soft key 3311, the electronic device 3300 may create a second additional screen region 3315 in the top end of the display 3310. The second additional screen region 3315 may be overlaid with the top end of the display 3310 or the screen region of the display 3310 may be moved downward by the output part of the second additional screen region 3315. When the screen region of the display 3310 is shifted downward and output, a portion of the bottom end of the screen region of the display 3310 may not be output, or the screen region of the display 3310 may be reduced proportionally.

According to various embodiments, a display object for supporting the change of the status or setting of the electronic device 3300 is output to the first additional screen region 3313, and the list of at least one notification object for providing at least one notification may be output to the second additional screen region 3315. Alternatively, a list of at least one notification object for providing at least one notification may be output to the first additional screen region 3313, and the display object may be output to support the change of the state or the setting of the electronic device 3300 to the second additional screen region 3315.

As described above, according to various embodiments, a portable electronic device may include a housing including a first surface and a second surface facing a direction opposite to the first surface, a display including a touchscreen panel exposed through the first surface of the housing and having a substantially rectangular shape, wherein the display has a first side and a third side extending with a first length in a first direction, and a second side and a fourth side substantially perpendicular to the first direction and extending with a second length which is less than the first length, and wherein a ratio of the first length to the second length is x:9, in which the x is equal to or greater than 16, a wireless communication circuit included in the housing, a processor included in the housing and electrically connected with the display and the wireless communication circuit, and a memory included in the housing and electrically connected with the processor. The memory may store instructions that, when executed, cause the processor to display at least one first icon having a first size on a first region in contact with the second side or the fourth side of the display or adjacent to the second side or the fourth side while longitudinally extending, to display at least one second icon having a second size on the first region, based at least partially on an event occurring inside the electronic device or an event received through the wireless communication circuit, to receive a user input for selecting the at least one second icon through the first region of the display, and to perform a function associated with the event, based on the received user input.

According to various embodiments, the first size may be less than the second size.

According to various embodiments, the at least one second icon is disposed closer to the first side than the at least one first icon.

According to various embodiments, the at least one first icon may include a plurality of first icons, and the instructions may cause the processor to arrange and display the plurality of first icons in the first direction and/or the second direction on the first region.

According to various embodiments, the at least one first icon may be associated with at least one of a communication connection state, a current time, and a remaining battery level.

According to various embodiments, the at least one second icon may be associated with at least one of a schedule notification, a telephone reception notification, a message reception notification, an e-mail reception notification, and a data reception notification.

According to various embodiments, the display may further include a second region distinguished from the first region and having a rectangular shape having a ratio of 16:9 or less. The instructions may cause the processor to display at least one of the at least one first icon and the at least one second icon on the first region while displaying a user interface of an application program on the second region.

According to various embodiments, the instructions may cause the processor to display, when receiving the user input for selecting the at least one second icon in a state that the at least one second icon is displayed on the first region, an execution screen of a function associated with the event on the second region, based on the received user input.

According to various embodiments, the at least one first icon may be associated with at least one of home screen output, previous screen output, and menu screen output.

According to various embodiments, the instructions may cause the processor to output the at least one second icon on a region that the at least one first icon is displayed, based at least partially on the event.

As described above, according to various embodiments, a method for providing a user interface of an electronic device including a display may include outputting, to a top end of the display, an indicator bar including at least one first object corresponding to state information of the electronic device, creating at least one second object, based at least partially on an event occurring inside the electronic device or an event received through a wireless communication circuit included in the electronic device, outputting the at least one second object to the indicator bar, receiving a user input for selecting the second object through a region that the indicator bar is output, and performing a function associated with the event, based on the received user input.

According to various embodiments, a size of the at least one first object may be less than a size of the at least one second object.

According to various embodiments, the outputting of the at least one second object to the indicator bar may include disposing the at least one second object closer to a left edge of the display rather than the at least one first object.

According to various embodiments, the at least one first object may include a plurality of first objects, and the method for providing the user interface may further include arranging the plurality of first objects on an indicator bar in a widthwise direction and/or lengthwise direction.

According to various embodiments, the at least one first icon may be associated with at least one of a communication connection state, a current time, and a remaining battery level.

According to various embodiments, the at least one second icon may be associated with at least one of a schedule notification, a telephone reception notification, a message reception notification, an e-mail reception notification, and a data reception notification.

According to various embodiments, the method for providing the user interface may further include displaying a user interface of an application program on the central region of the display.

According to various embodiments, the method for providing the user interface may further include outputting an execution screen of a function associated with the event on the central region of the display.

According to various embodiments, the method for providing the user interface may further include outputting at least one soft key, which corresponds to a screen control function of the display, on a bottom end of the display, and the screen control function includes at least one of home screen output, previous screen output, and menu screen output.

According to various embodiments, the method for providing the user interface may further include outputting the at least one second object on a region that the at least one soft key is displayed, based at least partially on the event.

Figure 34:
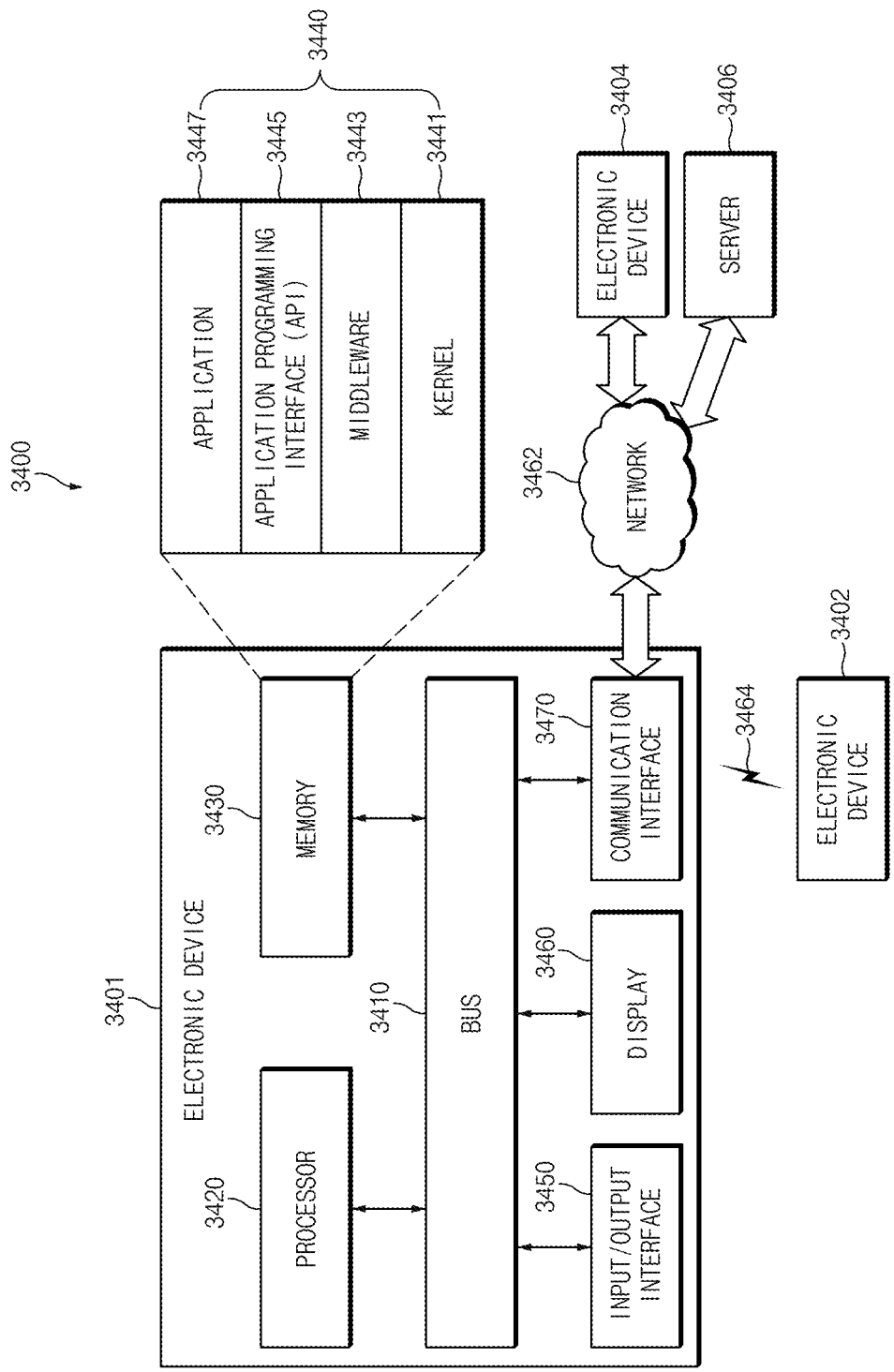
FIG. 34 illustrates an electronic device in a network environment, according to various embodiments.

FIG. 34 illustrates an electronic device 3401 in a network environment 3400 according to various embodiments.

Referring to FIG. 34, the electronic device 3401 may include a bus 3410, a processor 3420, a memory 3430, an input/output interface 3450, a display 3460, and a communication interface 3470. According to an embodiment, the electronic device 3401 may not include at least one of the above-described components or may further include other component(s). The bus 3410 may interconnect the above-described components 3410 to 3470 and may include a circuit for conveying communications (e.g., a control message and/or data) among the above-described components. The processor 3420 may include one or more of a central processing unit (CPU), an application processor (AP), or a communication processor (CP). For example, the processor 3420 may perform an arithmetic operation or data processing associated with control and/or communication of at least other components of the electronic device 3401.

The memory 3430 may include a volatile and/or nonvolatile memory. For example, the memory 3430 may store instructions or data associated with at least one other component(s) of the electronic device 3401. According to an embodiment, the memory 3430 may store software and/or a program 3440. The program 3440 may include, for example, a kernel 3441, a middleware 3443, an application programming interface (API) 3445, and/or an application program (or "an application") 3447. At least a part of the kernel 3441, the middleware 3443, or the API 3445 may be referred to as an "operating system (OS)". For example, the kernel 3441 may control or manage system resources (e.g., the bus 3410, the processor 3420, the memory 3430, and the like) that are used to execute operations or functions of other programs (e.g., the middleware 3443, the API 3445, and the application program 3447). Furthermore, the kernel 3441 may provide an interface that allows the middleware 3443, the API 3445, or the application program 3447 to access discrete components of the electronic device 3401 so as to control or manage system resources.

The middleware 3443 may perform, for example, a mediation role such that the API 3445 or the application program 3447 communicates with the kernel 3441 to exchange data. Furthermore, the middleware 3443 may process one or more task requests received from the application program 3447 according to a priority. For example, the middleware 3443 may assign the priority, which makes it possible to use a system resource (e.g., the bus 3410, the processor 3420, the memory 3430, or the like) of the electronic device 3401, to at least one of the application program 3447 and may process the one or more task requests. The API 3445 may be an interface through which the application program 3447 controls a function provided by the kernel 3441 or the middleware 3443, and may include, for example, at least one interface or function (e.g., an instruction) for a file control, a window control, image processing, a character control, or the like. The input/output interface 3450 may transmit an instruction or data input from a user or another external device, to other component(s) of the electronic device 3401 or may output an instruction or data, received from other component(s) of the electronic device 3401, to a user or another external device.

The display 3460 may include, for example, a liquid crystal display (LCD), a light-emitting diode (LED) display, an organic LED (OLED) display, a microelectromechanical systems (MEMS) display, or an electronic paper display. The display 3460 may display, for example, various contents (e.g., a text, an image, a video, an icon, a symbol, and the like) to a user. The display 3460 may include a touch screen and may receive, for example, a touch, gesture, proximity, or hovering input using an electronic pen or a part of a user's body. For example, the communication interface 3470 may establish communication between the electronic device 3401 and an external device (e.g., the first electronic device 3402, the second electronic device 3404, or the server 3406). For example, the communication interface 3470 may be connected to the network 3462 over wireless communication or wired communication to communicate with the external device (e.g., the second electronic device 3404 or the server 3406).

For example, the wireless communication may include cellular communication using at least one of long-term evolution (LTE), LTE Advanced (LTE-A), Code Division Multiple Access (CDMA), Wideband CDMA (WCDMA), Universal Mobile Telecommunications System (UNITS), Wireless Broadband (WiBro), Global System for Mobile Communications (GSM), or the like. The wireless communication may include at least one of wireless fidelity (Wi-Fi), Bluetooth, Bluetooth low energy (BLE), Zigbee, near field communication (NFC), magnetic stripe transmission (MST), radio frequency (RF), a body area network, or the like. According to an embodiment, the wireless communication may include GNSS. The GNSS may be one of, for example, a global positioning system (GPS), a global navigation satellite system (Glonass), a Beidou navigation satellite system (hereinafter referred to as "Beidou"), or an European global satellite-based navigation system (hereinafter referred to as "Galileo"). Hereinafter, in this disclosure, "GPS" and "GNSS" may be interchangeably used. The wired communication may include at least one of, for example, a universal serial bus (USB), a high definition multimedia interface (HDMI), a recommended standard-232 (RS-232), powerline communication, a plain old telephone service (POTS), or the like. The network 3462 may include at least one of telecommunications networks, for example, a computer network (e.g., LAN or WAN), an Internet, or a telephone network.

Each of the first and second external electronic devices 3402 and 3404 may be a device of which the type is different from or the same as that of the electronic device 3401. According to various embodiments, all or a portion of operations that the electronic device 3401 will perform may be executed by another or plural electronic devices (e.g., the first electronic device 3402, the second electronic device 3404 or the server 3406). According to an embodiment, in the case where the electronic device 3401 executes any function or service automatically or in response to a request, the electronic device 3401 may not perform the function or the service internally, but, alternatively additionally, it may request at least a portion of a function associated with the electronic device 3401 at other electronic device (e.g., the electronic device 3402 or 3404 or the server 3406). The other electronic device (e.g., the electronic device 3402 or 3404 or the server 3406) may execute the requested function or additional function and may transmit the execution result to the electronic device 3401. The electronic device 3401 may provide the requested function or service using the received result or may additionally process the received result to provide the requested function or service. To this end, for example, cloud computing, distributed computing, or client-server computing may be used.

Figure 35:
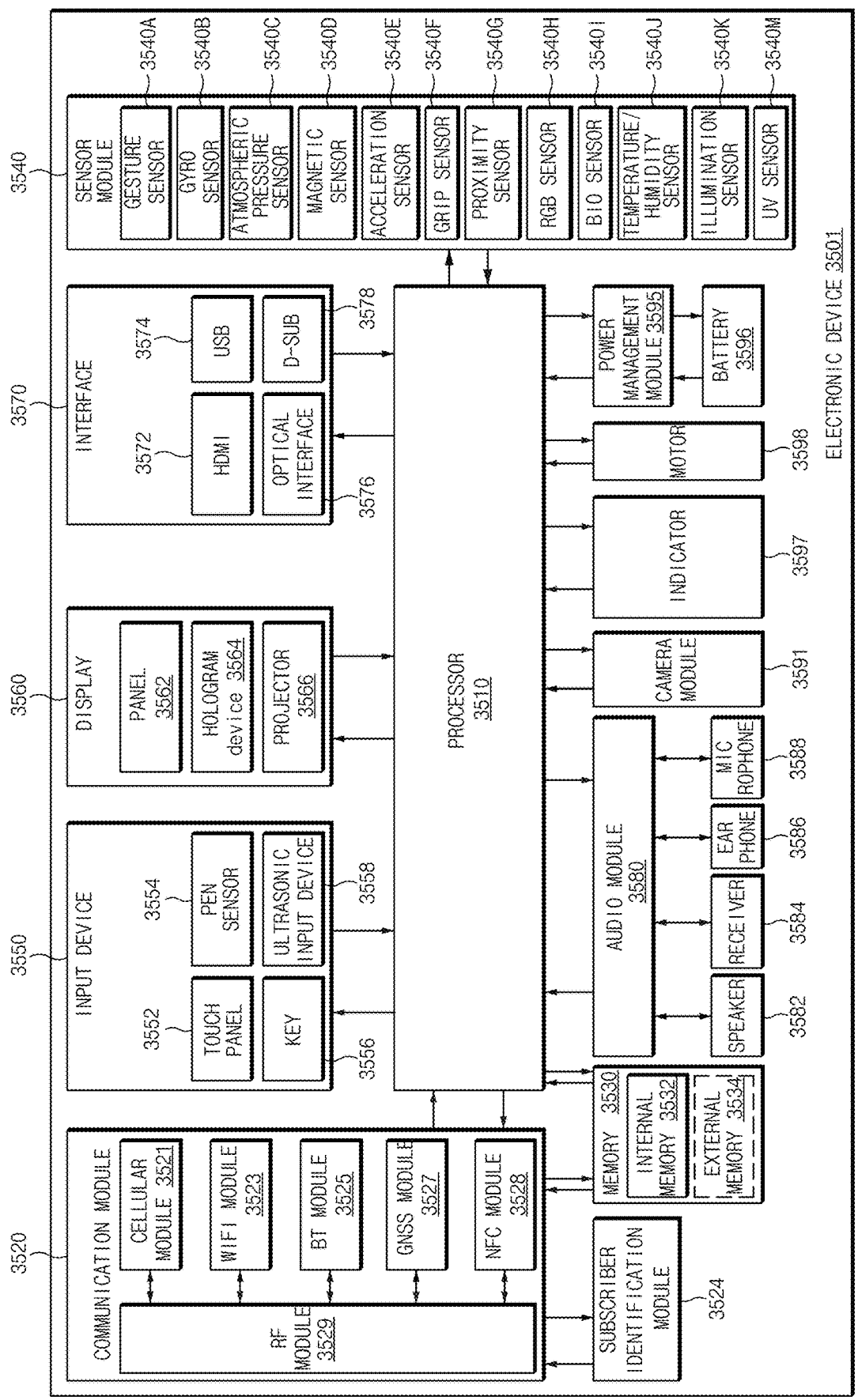
FIG. 35 is a block diagram of an electronic device, according to various embodiments.

FIG. 35 illustrates a block diagram of an electronic device 3501, according to various embodiments. An electronic device 3501 may include, for example, all or a part of the electronic device 3401 illustrated in FIG. 34.

Referring to FIG. 35, the electronic device 3501 may include one or more processors (e.g., an application processor (AP)) 3510, a communication module 3520, a subscriber identification module 3524, a memory 3530, a sensor module 3540, an input device 3550, a display 3560, an interface 3570, an audio module 3580, a camera module 3591, a power management module 3595, a battery 3596, an indicator 3597, and a motor 3598. The processor 3510 may drive, for example, an operating system (OS) or an application to control a plurality of hardware or software components connected to the processor 3510 and may process and compute a variety of data. For example, the processor 3510 may be implemented with a System on Chip (SoC). According to an embodiment, the processor 3510 may further include a graphic processing unit (GPU) and/or an image signal processor. The processor 3510 may include at least a part (e.g., a cellular module 3521) of components illustrated in FIG. 35. The processor 3510 may load a command or data, which is received from at least one of other components (e.g., a nonvolatile memory), into a volatile memory and process the loaded instruction or data. The processor 3510 may store result data in the nonvolatile memory.

The communication module 3520 may be configured the same as or similar to the communication interface 3470 of FIG. 34. The communication module 3520 may include the cellular module 3521, a Wi-Fi module 3523, a Bluetooth (BT) module 3525, a GNSS module 3527, a near field communication (NFC) module 3528, and a radio frequency (RF) module 3529. The cellular module 3521 may provide, for example, voice communication, video communication, a character service, an Internet service, or the like over a communication network. According to an embodiment, the cellular module 3521 may perform discrimination and authentication of the electronic device 3501 within a communication network by using the subscriber identification module (e.g., a SIM card) 3524. According to an embodiment, the cellular module 3521 may perform at least a portion of functions that the processor 3510 provides. According to an embodiment, the cellular module 3521 may include a communication processor (CP). According to an embodiment, at least a part (e.g., two or more) of the cellular module 3521, the Wi-Fi module 3523, the BT module 3525, the GNSS module 3527, or the NFC module 3528 may be included within one Integrated Circuit (IC) or an IC package. For example, the RF module 3529 may transmit and receive a communication signal (e.g., an RF signal). For example, the RF module 3529 may include a transceiver, a power amplifier module (PAM), a frequency filter, a low noise amplifier (LNA), an antenna, or the like. According to another embodiment, at least one of the cellular module 3521, the Wi-Fi module 3523, the BT module 3525, the GNSS module 3527, or the NFC module 3528 may transmit and receive an RF signal through a separate RF module. The subscriber identification module 3524 may include, for example, a card and/or embedded SIM that includes a subscriber identification module and may include unique identify information (e.g., integrated circuit card identifier (ICCID)) or subscriber information (e.g., international mobile subscriber identity (IMSI)).

The memory 3530 (e.g., the memory 3430) may include an internal memory 3532 or an external memory 3534. For example, the internal memory 3532 may include at least one of a volatile memory (e.g., a dynamic random access memory (DRAM), a static RAM (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory, a hard drive, or a solid state drive (SSD). The external memory 3534 may include a flash drive such as compact flash (CF), secure digital (SD), micro secure digital (Micro-SD), mini secure digital (Mini-SD), extreme digital (xD), a multimedia card (MMC), a memory stick, or the like. The external memory 3534 may be operatively and/or physically connected to the electronic device 3501 through various interfaces.

The sensor module 3540 may measure, for example, a physical quantity or may detect an operation state of the electronic device 3501. The sensor module 3540 may convert the measured or detected information to an electric signal. For example, the sensor module 3540 may include at least one of a gesture sensor 3540A, a gyro sensor 3540B, a barometric pressure sensor 3540C, a magnetic sensor 3540D, an acceleration sensor 3540E, a grip sensor 3540F, the proximity sensor 3540G, a color sensor 3540H (e.g., red, green, blue (RGB) sensor), a biometric sensor 3540I, a temperature/humidity sensor 3540J, an illuminance sensor 3540K, or an UV sensor 3540M. Although not illustrated, additionally or alternatively, the sensor module 3540 may further include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 3540 may further include a control circuit for controlling at least one or more sensors included therein. According to an embodiment, the electronic device 3501 may further include a processor that is a part of the processor 3510 or independent of the processor 3510 and is configured to control the sensor module 3540. The processor may control the sensor module 3540 while the processor 3510 remains at a sleep state.

The input device 3550 may include, for example, a touch panel 3552, a (digital) pen sensor 3554, a key 3556, or an ultrasonic input unit 3558. For example, the touch panel 3552 may use at least one of capacitive, resistive, infrared and ultrasonic detecting methods. Also, the touch panel 3552 may further include a control circuit. The touch panel 3552 may further include a tactile layer to provide a tactile reaction to a user. The (digital) pen sensor 3554 may be, for example, a part of a touch panel or may include an additional sheet for recognition. The key 3556 may include, for example, a physical button, an optical key, or a keypad. The ultrasonic input device 3558 may detect (or sense) an ultrasonic signal, which is generated from an input device, through a microphone (e.g., a microphone 3588) and may check data corresponding to the detected ultrasonic signal.

The display 3560 (e.g., the display 3460) may include a panel 3562, a hologram device 3564, a projector 3566, and/or a control circuit for controlling the panel 3562, the hologram device 3564, or the projector 3566. The panel 3562 may be implemented, for example, to be flexible, transparent or wearable. The panel 3562 and the touch panel 3552 may be integrated into a single module. According to an embodiment, the panel 3562 may include a pressure sensor (or force sensor) that measures the intensity of touch pressure by a user. The pressure sensor may be implemented integrally with the touch panel 3552, or may be implemented as at least one sensor separately from the touch panel 3552. The hologram device 3564 may display a stereoscopic image in a space using a light interference phenomenon. The projector 3566 may project light onto a screen so as to display an image. For example, the screen may be arranged in the inside or the outside of the electronic device 3501. The interface 3570 may include, for example, a high-definition multimedia interface (HDMI) 3572, a universal serial bus (USB) 3574, an optical interface 3576, or a D-subminiature (D-sub) 3578. The interface 3570 may be included, for example, in the communication interface 3470 illustrated in FIG. 34. Additionally or alternatively, the interface 3570 may include, for example, a mobile high definition link (MHL) interface, a SD card/multi-media card (MMC) interface, or an infrared data association (IrDA) standard interface.

The audio module 3580 may convert a sound and an electric signal in dual directions. At least a component of the audio module 3580 may be included, for example, in the input/output interface 3450 illustrated in FIG. 34. The audio module 3580 may process, for example, sound information that is input or output through a speaker 3582, a receiver 3584, an earphone 3586, or the microphone 3588. For example, the camera module 3591 may shoot a still image or a video. According to an embodiment, the camera module 3591 may include at least one or more image sensors (e.g., a front sensor or a rear sensor), a lens, an image signal processor (ISP), or a flash (e.g., an LED or a xenon lamp). The power management module 3595 may manage, for example, power of the electronic device 3501. According to an embodiment, a power management integrated circuit (PMIC), a charger IC, or a battery or fuel gauge may be included in the power management module 3595. The PMIC may have a wired charging method and/or a wireless charging method. The wireless charging method may include, for example, a magnetic resonance method, a magnetic induction method or an electromagnetic method and may further include an additional circuit, for example, a coil loop, a resonant circuit, a rectifier, or the like. The battery gauge may measure, for example, a remaining capacity of the battery 3596 and a voltage, current or temperature thereof while the battery is charged. The battery 3596 may include, for example, a rechargeable battery and/or a solar battery.

The indicator 3597 may display a specific state of the electronic device 3501 or a part thereof (e.g., the processor 3510), such as a booting state, a message state, a charging state, and the like. The motor 3598 may convert an electrical signal into a mechanical vibration and may generate the following effects:vibration, haptic, and the like. The electronic device 3501 may include a processing device (e.g., a GPU) for supporting a mobile TV. The processing device for supporting the mobile TV may process media data according to the standards of digital multimedia broadcasting (DMB), digital video broadcasting (DVB), MediaFLO™, or the like. Each of the above-mentioned components of the electronic device according to various embodiments of the present disclosure may be configured with one or more components, and the names of the components may be changed according to the type of the electronic device. In various embodiments, some components of the electronic device (e.g., the electronic device 3501) may be omitted or other additional components may be added. Furthermore, some of the components of the electronic device may be combined with each other so as to form one entity, so that the functions of the components may be performed in the same manner as before the combination.

Figure 36:
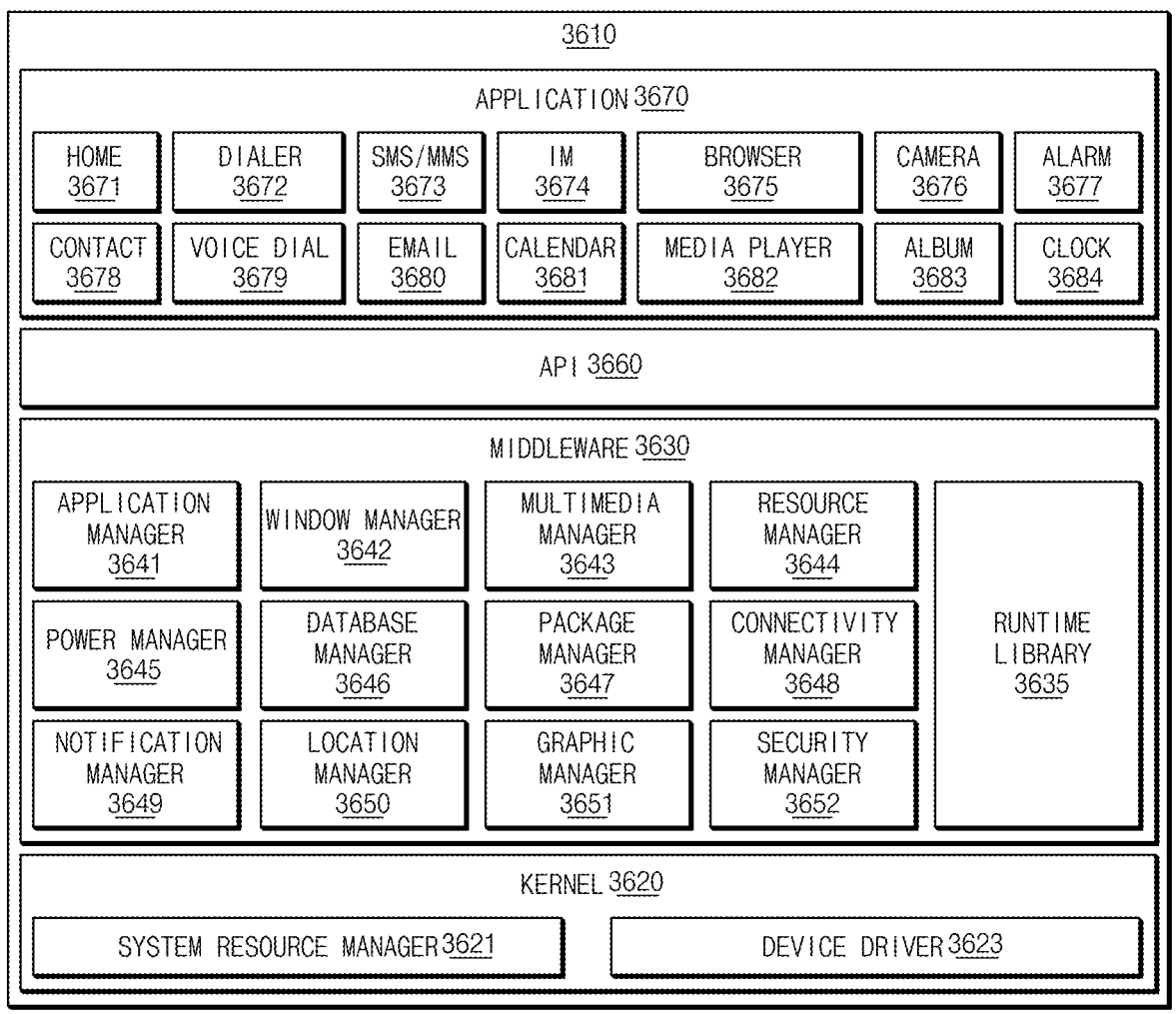
FIG. 36 is a block diagram of a program module, according to various embodiments.

FIG. 36 illustrates a block diagram of a program module, according to various embodiments.

According to an embodiment, a program module 3610 (e.g., the program 3440) may include an operating system (OS) to control resources associated with an electronic device (e.g., the electronic device 3401), and/or diverse applications (e.g., the application program 3447) driven on the OS. The OS may be, for example, Android™, iOS™, Windows™, Symbian™, Tizen™, or Bada™.

Referring to FIG. 36, the program module 3610 may include a kernel 3620 (e.g., the kernel 3441), a middleware 3630 (e.g., the middleware 3443), an application programming interface (API) 3660 (e.g., the API 3445), and/or an application 3670 (e.g., the application program 3447). At least a portion of the program module 3610 may be preloaded on an electronic device or may be downloadable from an external electronic device (e.g., the first electronic device 3402, the second electronic device 3404, the server 3406, or the like).

The kernel 3620 (e.g., the kernel 3441) may include, for example, a system resource manager 3621 or a device driver 3623. The system resource manager 3621 may control, allocate, or retrieve system resources. According to an embodiment, the system resource manager 3621 may include a process managing unit, a memory managing unit, a file system managing unit, or the like. The device driver 3623 may include, for example, a display driver, a camera driver, a Bluetooth driver, a shared memory driver, a USB driver, a keypad driver, a Wi-Fi driver, an audio driver, or an inter-process communication (IPC) driver. The middleware 3630 may provide, for example, a function that the application 3670 needs in common, or may provide diverse functions to the application 3670 through the API 3660 to allow the application 3670 to efficiently use limited system resources of the electronic device. According to an embodiment, the middleware 3630 may include at least one of a runtime library 3635, an application manager 3641, a window manager 3642, a multimedia manager 3643, a resource manager 3644, a power manager 3645, a database manager 3646, a package manager 3647, a connectivity manager 3648, a notification manager 3649, a location manager 3650, a graphic manager 3651, or a security manager 3652.

The runtime library 3635 may include, for example, a library module that is used by a compiler to add a new function through a programming language while the application 3670 is being executed. The runtime library 3635 may perform input/output management, memory management, or capacities about arithmetic functions. The application manager 3641 may manage, for example, a life cycle of at least one application of the application 3670. The window manager 3642 may manage a graphic user interface (GUI) resource that is used in a screen. The multimedia manager 3643 may identify a format necessary for playing diverse media files, and may perform encoding or decoding of media files by using a codec suitable for the format. The resource manager 3644 may manage resources such as a memory space or source code of the application 3670. The power manager 3645 may manage a battery or power, and may provide power information for an operation of an electronic device. According to an embodiment, the power manager 3645 may operate with a basic input/output system (BIOS). The database manager 3646 may generate, search for, or modify database that is to be used in the application 3670. The package manager 3647 may install or update an application that is distributed in the form of package file.

The connectivity manager 3648 may manage, for example, wireless connection. The notification manager 3649 may provide an event, for example, arrival message, appointment, or proximity notification to a user. For example, the location manager 3650 may manage location information about an electronic device. The graphic manager 3651 may manage a graphic effect that is provided to a user, or manage a user interface relevant thereto. The security manager 3652 may provide, for example, system security or user authentication. According to an embodiment, the middleware 3630 may include a telephony manager for managing a voice or video call function of the electronic device or a middleware module that combines diverse functions of the above-described components. According to an embodiment, the middleware 3630 may provide a module specialized to each OS kind to provide differentiated functions. Additionally, the middleware 3630 may dynamically remove a part of the preexisting components or may add new components thereto. The API 3660 may be, for example, a set of programming functions and may be provided with a configuration that is variable depending on an OS. For example, in the case where an OS is the android or the iOS, it may provide one API set per platform. In the case where an OS is the tizen, it may provide two or more API sets per platform.

The application 3670 may include, for example, applications such as a home 3671, a dialer 3672, an SMS/MMS 3673, an instant message (IM) 3674, a browser 3675, a camera 3676, an alarm 3677, a contact 3678, a voice dial 3679, an e-mail 3680, a calendar 3681, a media player 3682, an album 3683, a watch 3684, health care (e.g., measuring an exercise quantity, blood sugar, or the like) or offering of environment information (e.g., information of barometric pressure, humidity, temperature, or the like). According to an embodiment, the application 3670 may include an information exchanging application to support information exchange between an electronic device and an external electronic device. The information exchanging application may include, for example, a notification relay application for transmitting specific information to an external electronic device, or a device management application for managing the external electronic device. For example, the notification relay application may include a function of transmitting notification information, which arise from other applications, to an external electronic device or may receive, for example, notification information from an external electronic device and provide the notification information to a user. The device management application may install, delete, or update for example, a function (e.g., turn-on/turn-off of an external electronic device itself (or a part of components) or adjustment of brightness (or resolution) of a display) of the external electronic device which communicates with the electronic device, and an application running in the external electronic device. According to an embodiment, the application 3670 may include an application (e.g., a health care application of a mobile medical device) that is assigned in accordance with an attribute of an external electronic device. According to an embodiment, the application 3670 may include an application that is received from an external electronic device. At least a portion of the program module 3610 may be implemented by software, firmware, hardware (e.g., the processor 3510), or a combination (e.g., execution) of two or more thereof, and may include modules, programs, routines, sets of instructions, processes, or the like for performing one or more functions.

The term "module" used in this disclosure may include a unit composed of hardware, software and firmware and may be interchangeably used with the terms "unit", "logic", "logical block", "part" and "circuit". The "module" may be an integrated part or may be a minimum unit for performing one or more functions or a part thereof. The "module" may be implemented mechanically or electronically and may include at least one of an application-specific IC (ASIC) chip, a field-programmable gate array (FPGA), and a programmable-logic device for performing some operations, which are known or will be developed. At least a part of an apparatus (e.g., modules or functions thereof) or a method (e.g., operations) according to various embodiments may be, for example, implemented by instructions stored in computer-readable storage media (e.g., the memory 3430) in the form of a program module. The instruction, when executed by a processor (e.g., the processor 3420), may cause the processor to perform a function corresponding to the instruction. A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), and an internal memory. Also, the one or more instructions may contain a code made by a compiler or a code executable by an interpreter. A module or a program module according to various embodiments may include at least one of the above components, or a part of the above components may be omitted, or other components may be further included. Operations performed by a module, a program module, or other components according to various embodiments may be executed sequentially, in parallel, repeatedly, or in a heuristic method or some operations may be executed in different sequences or may be omitted. Alternatively, other operations may be added.

The invention claimed is:

1. A portable electronic device comprising:
 a housing including a first surface and a second surface facing a direction opposite to the first surface;
 a display including a touchscreen panel exposed through the first surface of the housing and having a substantially rectangular shape, wherein the display has a first side and a third side extending with a first length in a first direction, and a second side and a fourth side substantially perpendicular to the first direction and extending with a second length which is less than the first length, and wherein a ratio of the first length to the second length is x: 9, in which the x is equal to or greater than 16;
 a wireless communication circuit included in the housing;
 a processor included in the housing and electrically connected with the display and the wireless communication circuit; and
 a memory included in the housing and electrically connected with the processor,
 wherein the memory stores instructions that, when executed, cause the processor to:
 display at least one first icon having a first size on a first region in contact with the second side or the fourth side of the display or adjacent to the second side or the fourth side while longitudinally extending;
 display at least one second icon having a second size on the first region, based at least partially on an event occurring inside the electronic device or an event received through the wireless communication circuit;
 responsive to receiving a first user gesture input selecting the at least one second icon through the first region of the display, perform a first function associated with the event; and
 responsive to receiving a second user gesture input selecting the at least one second icon, perform a second function associated with the event.

2. The portable electronic device of claim 1, wherein the first size is less than the second size.

3. The portable electronic device of claim 1, wherein the at least one second icon is disposed closer to the first side than the at least one first icon.

4. The portable electronic device of claim 1, wherein the at least one first icon includes a plurality of first icons, and wherein the instructions cause the processor to:
 arrange and display the plurality of first icons in the first direction and/or the second direction on the first region.

5. The portable electronic device of claim 1, wherein the at least one first icon is associated with at least one of a communication connection state, a current time, and a remaining battery level.

6. The portable electronic device of claim 1, wherein the at least one second icon is associated with at least one of a schedule notification, a telephone reception notification, a message reception notification, an e-mail reception notification, and a data reception notification.

7. The portable electronic device of claim 1, wherein the display further include:
 a second region distinguished from the first region and having a rectangular shape having a ratio of 16:9 or less, and
 wherein the instructions cause the processor to:
 display at least one of the at least one first icon and the at least one second icon on the first region while displaying a user interface of an application program on the second region.

8. The portable electronic device of claim 7, wherein the instructions cause the processor to:
 display, when receiving the first user gesture input, an execution screen of the first function on the second region;
 display, when receiving the second user gesture input, an execution screen of the second function on the second region.

9. The portable electronic device of claim 1, wherein the at least one first icon is associated with at least one of home screen output, previous screen output, and menu screen output.

10. The portable electronic device of claim 9, wherein the instructions cause the processor to:
 output the at least one second icon on a region that the at least one first icon is displayed, based at least partially on the event.

11. A method for providing a user interface of an electronic device including a display, the method comprising:
 outputting, to a top end of the display, an indicator bar including at least one first object corresponding to state information of the electronic device;
 creating at least one second object, based at least partially on an event occurring inside the electronic device or an event received through a wireless communication circuit included in the electronic device;
 outputting the at least one second object to the indicator bar;
 responsive to receiving a first user gesture input selecting the at least one second icon through the first region of the display, performing a first function associated with the event; and
 responsive to receiving a second user gesture input selecting the at least one second icon, performing a second function associated with the event.

12. The method of claim 11, wherein a size of the at least one first object is less than a size of the at least one second object.

13. The method of claim 11, wherein the outputting of the at least one second object to the indicator bar includes:
 disposing the at least one second object closer to a left edge of the display.

14. The method of claim 11, further comprising:
 outputting at least one soft key, which corresponds to a screen control function of the display, on a bottom end of the display,
 wherein the screen control function includes at least one of home screen output, previous screen output, and menu screen output.

15. The method of claim 14, further comprising:
 outputting the at least one second object on a region that the at least one soft key is displayed, based at least partially on the event.

* * * * *